US012674774B2

(12) United States Patent
Compton et al.

(10) Patent No.: US 12,674,774 B2
(45) Date of Patent: Jul. 7, 2026

(54) REFERENCE ELECTRODE

(71) Applicant: OXFORD UNIVERSITY INNOVATION LIMITED, Oxford (GB)

(72) Inventors: Richard Guy Compton, Oxford (GB); Lifu Chen, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 1193 days.

(21) Appl. No.: 17/615,215

(22) PCT Filed: May 29, 2020

(86) PCT No.: PCT/GB2020/051303
§ 371 (c)(1),
(2) Date: Nov. 30, 2021

(87) PCT Pub. No.: WO2020/240196
PCT Pub. Date: Dec. 3, 2020

(65) Prior Publication Data

US 2022/0229008 A1 Jul. 21, 2022

(30) Foreign Application Priority Data

May 31, 2019 (GB) ..................................... 1907791

(51) Int. Cl.
*G01N 27/30* (2006.01)
*G01N 27/327* (2006.01)
*G01N 27/48* (2006.01)

(52) U.S. Cl.
CPC ......... *G01N 27/301* (2013.01); *G01N 27/302* (2013.01); *G01N 27/3277* (2013.01); *G01N 27/48* (2013.01)

(58) Field of Classification Search
CPC .................................................... G01N 27/301
See application file for complete search history.

(56) References Cited

U.S. PATENT DOCUMENTS 2,058,761 A 10/1936 Beckman et al.

FOREIGN PATENT DOCUMENTS

WO 2009148848 A1 12/2009
WO 2014047483 A1 3/2014
WO 2019077367 A1 4/2019

OTHER PUBLICATIONS

Wei et al ("Label free electrochemiluminescence protocol for sensitive DNA detection with a tris(2,20-bipyridyl)ruthenium(II) modified electrode based on nucleic acid oxidation", Electrochemistry Communications, 9, 2007, pp. 1474-1479). (Year: 2007).*

(Continued)

*Primary Examiner* — Alexander W Keeling
(74) *Attorney, Agent, or Firm* — Bookoff McAndrews, PLLC

(57) ABSTRACT

The present disclosure provides for a coated, substrate for use as an electrode, the coated substrate comprising a substrate that is at least partially coated with a layer comprising a polymer and a redox active substance, wherein the polymer is a cation exchange polymer, and wherein the redox active substance is present in both an oxidised and reduced state. A method for making the isolated coated substrate, and an electrochemical apparatus using the electrode as a reference electrode, is also discussed herein.

14 Claims, 21 Drawing Sheets

(56) References Cited

OTHER PUBLICATIONS

Bertoncello et al ("One-step formation of ultra-thin chemically functionalized redox-active Langmuir-Schaefer Nafion films", Soft Matter, 2007, 3, 1300-1307) (Year: 2007).*
Khamrov et al ("Electrogenerated Chemiluminescence of Tris(2,2'-bipyridyl)ruthenium(II) Ion-Exchanged in Nafion-Silica Composite Films", Anal. Chem. 2000, 72, 2943-2948) (Year: 2000).*
Zheng et al ("Electrochemiluminescent Reaction between Ru(bpy)3 2+ and Oxygen in Nafion Film", J. Phys. Chem. C, 2009, 113, 20316-20321 (Year: 2009).*
Komura et al (Incorporation of 1,1'-dibenzyl-4,4'-bipyridinium cation into Nafion films and charge transport in loaded film electrodes, Electrochimica Acta, 46 (2001) 3579-3588) (Year: 2001).*
International Search Report for PCT/GB2020/051303, dated Oct. 21, 2020 (7 pages).
Gao et al., "Proximity hybridization-regulated electrogenerated chemiluminescence bioassay of α-fetoprotein via target-induced quenching mechanism", Biosensors and Bioelectronics, vol. 98, Jun. 21, 2017, pp. 62-67.
Hao, T. et al., "Ultrasensitive detection of carcinoembryonic antigen based on electrochemiluminescence quenching of Ru(bpy)32+ by quantum dots", Sensors and Actuators B: Chemical, vol. 171, Jun. 1, 2012, pp. 803-809.
Wei et al: "Label free electrochemiluminescence protocol for sensitive DNA detection with a tris(2,2'-bipyridyl) ruthenium(II) modified electrode based on nucleic acid oxidation", Electrochemistry Communications, vol. 9, No. 7, Jun. 15, 2007, pp. 1474-1479.
Litong et al., "Determination of dissolved oxygen by catalytic reduction on Nafion-methyl viologen chemically modified electrode", TALANTA, vol. 39, No. 2, Feb. 1, 1992, pp. 145-147.
Rubinstein et al., "Polymer films on electrodes. 4. Nafion-coated electrodes and electrogenerated chemiluminescence of surface-attached tris(2,2'-bipyridine)ruthenium(2+)11", Journal of the American Chemical Society, vol. 102, No. 21, Oct. 1, 1980, pp. 6641-6642.
Sicilia DB, "Arnold O. Beckman: One Hundred Years of Excellence. By Arnold Thackray and Minor Myers Jr. Philadelphia: Chemical Heritage Foundation, 2000." Business History Review, 2004, vol. 78, No. 2, pp. 319-321.
Jonte et al., "The Solubility of Silver Chloride and the Formation of Complexes in Chloride Solution" Journal of the American Chemical Society, vol. 74, No. 8, Apr. 1, 1952, pp. 2052-2054.
Seward, T. M., "The stability of chloride complexes of silver in hydrothermal solutions up to 350°", Geochimica et Cosmochimica Acta, vol. 40, 1976, pp. 1329-1341.
Yang et al., "Immobilised Electrocatalysts: Nafion Particles Doped with Ruthenium (II) Tris(2,2'-bipyridyl)", Chemistry—a European Journal, vol. 23, Oct. 2017, pp. 17605-17611.
Chen et al., "Single entity electrocatalysis: oxygen reduction mediated via methyl viologen doped Nafion nanoparticles", Physical Chemistry Chemical Physics, vol. 20, 2018, pp. 15795-15806.
Chen et al., "Electrochemical characterisation and comparison of transport in Nafion films and particles†", Physical Chemistry Chemical Physics, vol. 21, 2019, pp. 607-616.
Buttry et al., "Effects of Electron Exchange and Single-File Diffusion on Charge Propagation in Nafion Films Containing Redox Couples", Journal of the American Chemical Society, vol. 105, No. 4, Feb. 23, 1983, pp. 685-689.
Sheppard et al., "Electrochemical and microscopic characterisation of platinum-coated perfluorosulfonic acid (Nafion 117) materials", The Analyst, vol. 123, Jan. 1, 1998, pp. 1923-1929.
Momma et al., "Electrochemical Redox Properties of Polypyrrole/Nafion Composite Film in a Solid Polymer Electrolyte Battery", Journal of the Electrochemical Society, vol. 142, No. 6, Jun. 1995, pp. 1766-1769.
Krtil et al., "Kinetics of Water Sorption in NafionThin Films—Quartz Crystal Microbalance Study", The Journal of Physical Chemistry, vol. 105, No. 33, Jul. 27, 2001, pp. 7979-7983.
Wang et al., "Measurement of the diffusion coefficients of [Ru(NH3)6]3+ and [Ru(NH3)6]2+ in aqueous solution using microelectrode double potential step chronoamperometry", Journal of Electroanalytical Chemistry, vol. 652, 2011, pp. 3-17.
Borup et al., "Scientific Aspects of Polymer Electrolyte Fuel Cell Durability and Degradation", Chemical Reviews, vol. 107, No. 10, 2007, pp. 3904-3951.
Rodgers et al., "Fuel Cell Perfluorinated Sulfonic Acid Membrane Degradation Correlating Accelerated Stress Testing and Lifetime", J. M. Chemical Reviews, vol. 112, 2012, pp. 6075-6103.
Mauritz et al., "State of Understanding of Nafion", Chemical Reviews, vol. 104, Sep. 21, 2004, pp. 4535-4586.
Kim et al., "Fuel Cell Membrane Characterizations", Polymer Reviews, vol. 55, No. 2, May 7, 2015, pp. 330-370.
Kusoglu et al., "New Insights into Perfluorinated Sulfonic-Acid Ionomers", Chemical Reviews, vol. 117, 2017, pp. 987-1104.
Liu et al., "Development of Thin, Reinforced PEMFC Membranes through Understanding of Structure-Property-Performance Relationships", ECS Transactions, vol. 50, No. 2, 2013, pp. 51-64.
Rubinstein et al., "Polymer Films on Electrodes. 5. Electrochemistry and Chemiluminescence at Nafion-Coated Electrodes", Journal of the American Chemical Society, vol. 103, 1981, pp. 5007-5013.
Gebel et al., "Neutron and X-ray Scattering: Suitable Tools for Studying Ionomer Membranes", Fuel Cells, vol. 5, No. 2, 2005, pp. 261-276.
Hickner et al., "The Chemical and Structural Nature of Proton Exchange Membrane Fuel Cell Properties", Fuel Cells, vol. 5, No. 2, 2005, pp. 213-229.
Duncan et al., "Beyond Nafion: Charged Macromolecules Tailored for Performance as Ionic Polymer Transducers", Macromolecules, vol. 41, No. 21, Nov. 11, 2008, pp. 7765-7775.
Kim et al., "Origin of Toughness in Dispersion-Cast Nafion Membranes", Macromolecules, vol. 48, Mar. 23, 2015, pp. 2161-2172.
Moore et al., "Chemical and Morphological Properties of Solution-Cast Perfluorosulfonate Ionomers", Macromolecules, vol. 21, No. 5, 1988, pp. 1334-1339.
D'Urso et al., "Towards fuel cell membranes with improved lifetime: Aquivion® Perfluorosulfonic Acid membranes containing immobilized radical scavengers", Journal of Power Sources, vol. 272, 2014, pp. 753-758.
Laberty-Robert et al., "Design and properties of functional hybrid organic-inorganic membranes for fuel cells", Chemical Society Reviews, vol. 40, 2011, pp. 961-1005.
Gebel et al., "Structure and Related Properties of Solution-Cast Perfluorosulfonated Ionomer Films", Macromolecules, vol. 20, 1987, pp. 1425-1428.
Alberti et al., "Evolution of Permanent Deformations (orMemory) in Nafion 117Membranes with Changes in Temperature, Relative Humidity and Time, and Its Importance in the Development of Medium Temperature PEMFCs", Fuel Cells, vol. 9, No. 4, 2009, pp. 410-420.
Collette et al., "Hygrothermal aging of Nafion®", Journal of Membrane Science, vol. 330, 2009, pp. 21-29.
Takamatsu et al., "Densities and Expansion Coefficients of Nafion Polymers" Journal of Applied Polymer Science, vol. 24, 1979, pp. 2221-2235.
Kumar et al. "Enzyme-less and selective electrochemical sensing of catechol and dopamine using ferrocene bound Nafion membrance modified electrode", Analytical Methods, vol. 2, Dec. 2010, pp. 1962-1968.
Partial Search Report and Written Opinion for PCT Application No. PCT/GB2020/051303, Aug. 26, 2020, 16 pages.

* cited by examiner

REFERENCE ELECTRODE

CROSS-REFERENCE TO RELATED APPLICATIONS

This application is the U.S. national phase entry under 35 U.S.C. § 371 of International Application No. PCT/GB2020/051303, filed on May 29, 2020, which claims the benefit of priority to GB Application No. 1907791.6, filed on May 31, 2019.

FIELD OF THE INVENTION

This present invention relates to a coated substrate for use as a reference electrode.

BACKGROUND

The reference electrode is an essential component of both potentiometric and amperometric experiments, and for many chemical sensors, for example, for pH, gas-sensing and glucose, all which require a stable, reproducible reference electrode. The stability and robustness of the reference electrode often ultimately dictates the sensitivity and longevity of the sensor and hence its usefulness and range of applicability. A frequently made electrochemical sensing measurement is that of pH since the pioneering work of Beckman in the 1920s. As in many other electrochemical sensors, the preferred reference electrode for pH has been the silver/silver chloride electrode based on the half-cell reaction $$AgCl(s) + e^- \rightarrow Ag(s) + Cl^-(aq) \qquad \text{(Equation 1)}$$

for which the Nernst equation is $$E = E^0 - \frac{RT}{F}\ln a_{Cl^-} \qquad \text{(Equation 2)}$$

where E and $E^0$ are the electrode potential and standard electrode potential (and measured against a common reference electrode, conventionally a standard hydrogen electrode), R is the gas constant, T is the absolute temperature and F is the Faraday constant. The term $a_{cl^-}$ is the activity of the chloride ion.

$$a_{cl^-} = \gamma[Cl^-] \qquad \text{(Equation 3)}$$

where $\gamma$ is the corresponding activity coefficient.

Equations (1)-(3) emphasize that a fixed chloride concentration is mandatory if a reproducible and stable electrode potential is to be established on the reference electrode. This is usually realized by bathing a Ag/AgCl wire or foil in a solution of potassium chloride of a fixed molality, sometimes controlled by having solid KCl present to saturate the solution. At the same time it is essential to maintain some solid silver chloride at the surface of the silver electrode so as to sustain equilibrium (Equation 1). However, these two requirements can prove problematic. This is especially problematic in applications where the reference electrode is required to be miniaturized for small volume measurements such as for use in scanning electrochemical microscopy (SECM) and scanning probe microscopy (SPM), or for use in flowing solutions/microfluidics. Maintaining the presence of a zone of aqueous chloride solution close to the electrode adds to the size whilst exposure of the bare Ag/AgCl electrode to chloride containing solution can result in the loss of AgCl from the surface, for example in the form of $AgCl_n^{(n-1)-}$ complexes of which $AgCl_2^-$ is well-characterized (Jonte et al; *J. Am. Chem. Soc.* 1952, 74, 2052-2054 and Seward et al; *Geochimica et Cosmochimica Acta,* 1976, 40, 1329-1341). Thus the deployment of the $Ag/AgCl/Cl^-$ electrode is often challenging, and these challenges apply to the closely related calomel electrode, $Hg/Hg_2Cl_2/Cl^-$. As a result, there is a need for improved reference electrode systems which do not suffer from rapid deterioration of the response due to loss of key chemical components in the potential determining equilibrium.

SUMMARY OF INVENTION

In a first aspect, there is provided a coated, isolated substrate for use as an electrode, the coated isolated substrate comprising a substrate that is at least partially coated with a layer comprising a polymer and a redox active substance,

- wherein the polymer is a cation exchange polymer, and
- wherein the redox active substance is present in both an oxidised and reduced state.

In a second aspect, there is provided a method of forming a coated, isolated substrate for use as an electrode, comprising:

- coating a substrate, at least partially, with a layer comprising a polymer and a redox active substance, wherein the polymer is a cation-exchange polymer,
- partially oxidising or reducing the redox active substance under oxidising or reducing conditions, such that the redox active substance is present in the layer in both an oxidised and reduced state and
- removing the substrate from oxidising or reducing conditions to form an isolated coated substrate, wherein the redox active substance is present in both an oxidised and reduced state.

In a third aspect, there is provided an electrochemical apparatus comprising a sensing electrode and a reference electrode,

- wherein the reference electrode comprises a polymer and a redox active substance,
- wherein the polymer a cation exchange polymer, and
- wherein the redox active substance is present in both an oxidised and reduced state.

In a fourth aspect, there is provided the use of a substance comprising a polymer and a redox active substance as, or as part of, a reference electrode,

- wherein the substrate comprises or is at least partially coated with a layer comprising a polymer and a redox active substance,
- wherein the polymer is a cation exchange polymer, and
- wherein the redox active substance is present in both an oxidised and reduced state.

In a fifth aspect, there is provided a coated substrate according to the first aspect, or an electrochemical apparatus according to the third aspect, for use in electrochemical measurements, optionally as part of an electrochemical sensor. The measurements may be amperometric or potentiometric.

In a sixth aspect, there is provided a coated substrate according to the first aspect or an electrochemical apparatus according to the third aspect, for use in microscopy.

In a seventh aspect, there is provided a coated substrate according to the first aspect or an electrochemical apparatus according to the third aspect, for use in microfluidics.

In an eighth aspect, there is provided an isolated coated substrate according to the first aspect, producible by the methods according to the second aspect.

In a ninth aspect, there is provided an electrochemical apparatus according to the third aspect comprising the coated substrate of the first aspect.

The present inventors have developed a coated substrate for use as a reference electrode. The substrate is at least partially coated with i) a cation exchange polymer (e.g. a perfluorosulfonic acid polymer, such as the polymer with tradename Nafion®) and ii) a redox active substance. The redox active substance is present in both an oxidised and reduced state. In other words, the substrate is partially coated with a layer comprising both components of a redox couple, which may be dispersed throughout the polymer.

In comparison with standard reference electrodes used in the art, (e.g. Ag/AgCl electrodes or calomel electrodes), the coated substrate herein may be used as a reference electrode with the following advantages.

i) The coated substrates/electrodes described herein are solid-state liquid-free reference electrodes. As a result, unlike standard reference electrodes, the electrodes herein do not suffer from rapid deterioration of the response due to loss of key chemical components in the potential determining equilibrium.
ii) The coated substrate/electrodes herein can be miniaturised for application in analytical devices at nanoscales (e.g. microscopy).
iii) The coated substrate/electrodes discussed herein are simple to fabricate. The polymer and redox active substrate can, for example, be coated onto cheap substrates, such as glassy carbon/graphite rods, using methods such as dropcasting.
iv) The methods and coated substrate/electrodes used herein are highly reproducible. A consistent potential is observed for three distinct fabricated electrodes.
v) The reference electrodes discussed herein are stable. They show no significant drift over large amounts of time (e.g. 10 days) or with repeated use (e.g. 1000 cycles).
vi) The redox active substance present in the coated substrates/reference electrodes herein can be carefully selected such that they demonstrate minimal initial potential drift upon fabrication. It was discovered, for example, that initial potential drift can be essentially eliminated if the reduced or oxidised redox active substance is insoluble in water (e.g. ferrocene). Additionally or alternatively, the potential can be stabilised more quickly after fabrication if the reduced or oxidised redox active substance has a high rate of diffusion.

BRIEF DESCRIPTION OF FIGURES

The Figures illustrate results from the Examples or items discussed herein.

μm) reference electrodes recorded over two hours (uniform film surface square data points; rough film surface, circle data points).

Figure 12:
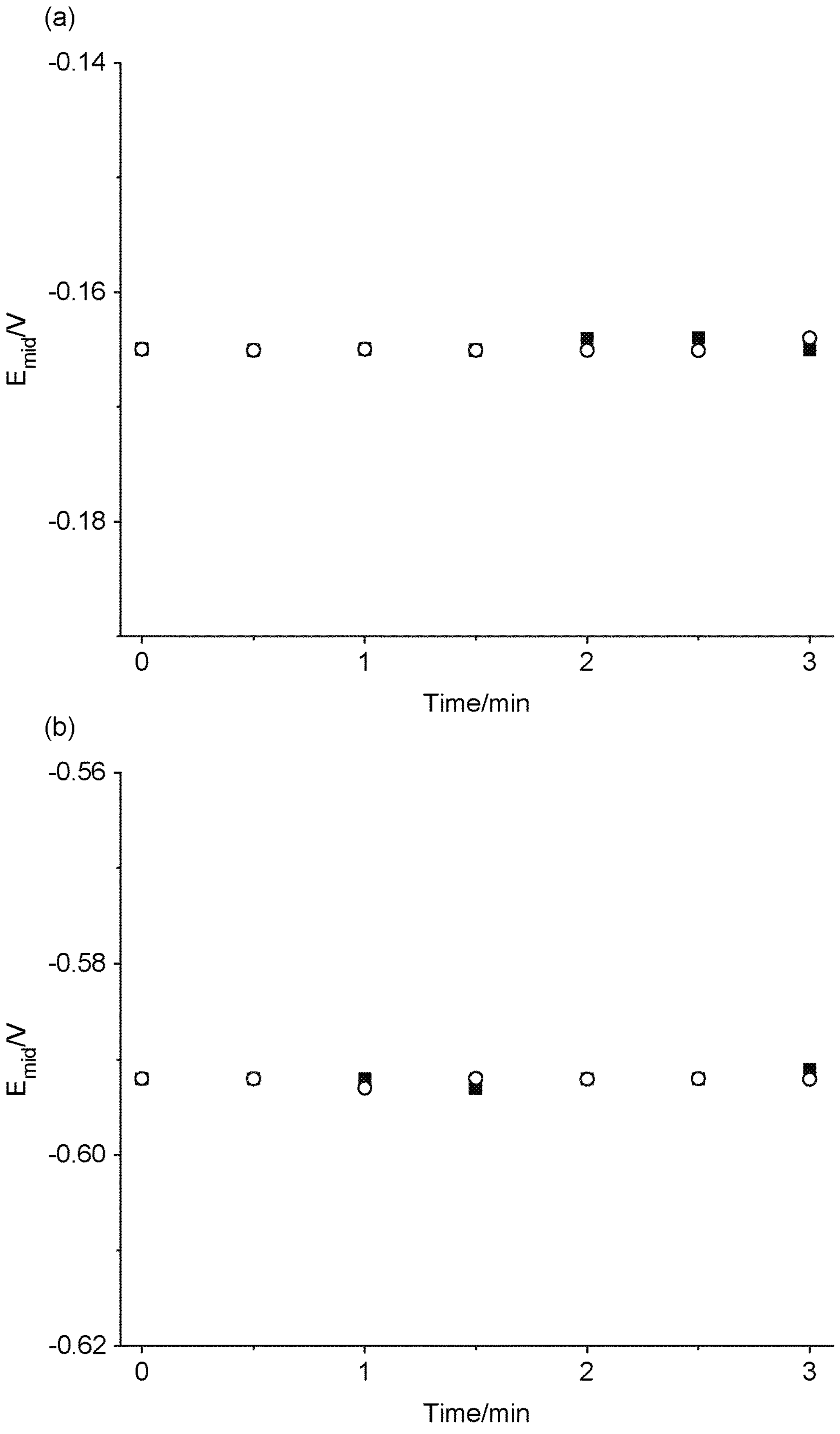

FIG. 12 shows. (a) The midpoint potential, $E_{mid}$, of $[Ru(NH_3)_6]^{3+}$ reduction vs. $MV^{2+}/MV^+$ Nafion film (with a doping ratio of 1:30 and film thickness of 35 μm) reference recorded after the electrodes being fabricated and left in in air without any protection (uniform film surface, square data points; rough film surface, circle data points). (b) $E_{mid}$ of $[Ru(NH_3)_6]^{3+}$ reduction vs. $Ru(bpy)_3^{2+}/Ru(bpy)_3^{3+}$ Nafion film (with a doping ratio of 1:30 and film thickness of 35 μm) reference electrodes recorded after the electrodes being fabricated and left in in air without any protection (uniform film surface, square data points; rough film surface, circle data points).

Figure 13:
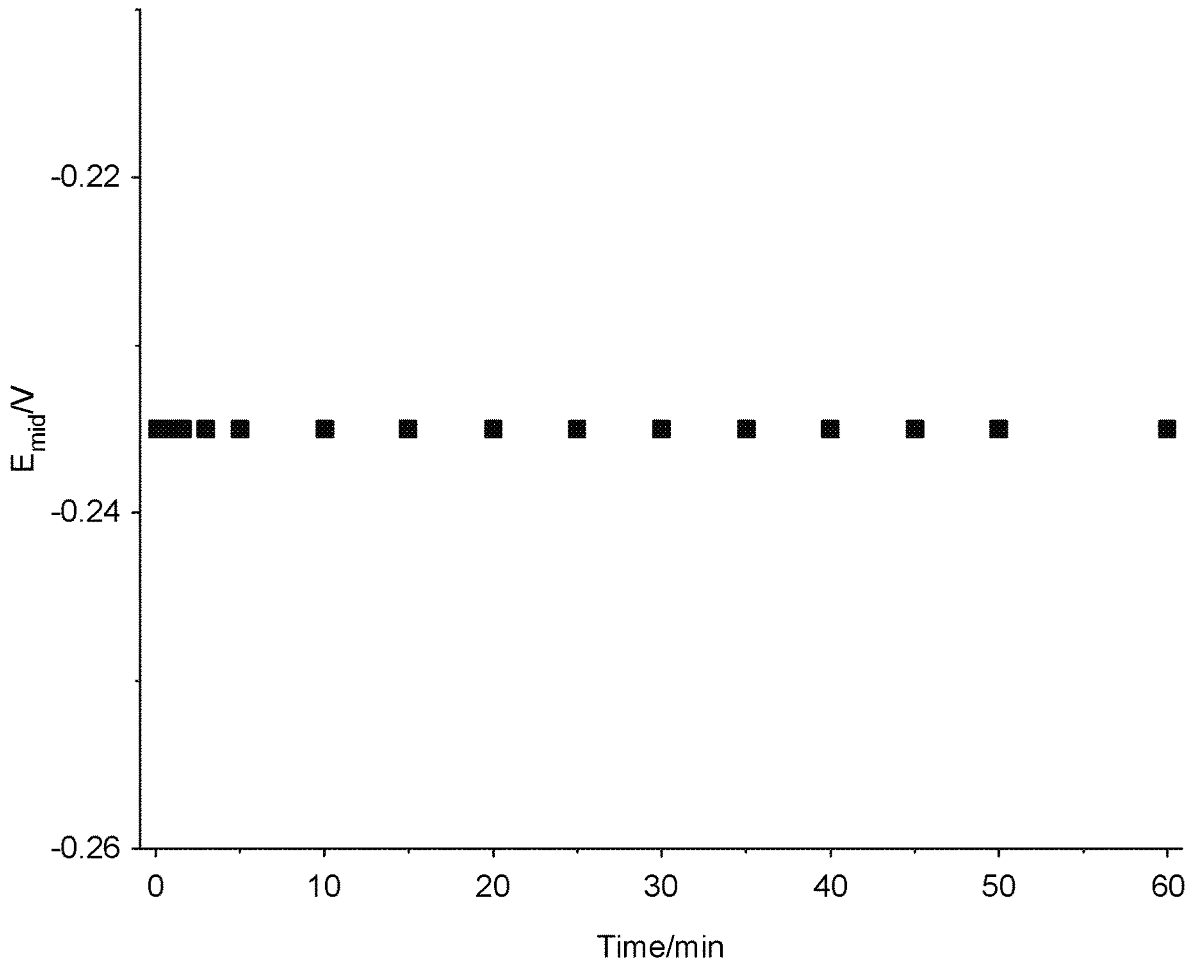

FIG. 13 shows the midpoint potential, $E_{mid}$, of $[Ru(NH_3)_6]^{3+}$ reduction vs. $Fc/Fc^+$ Nafion film (with a doping ratio of 1:30 and film thickness of 35 μm) reference electrodes recorded over the first hour after being fabricated.

Figure 14:
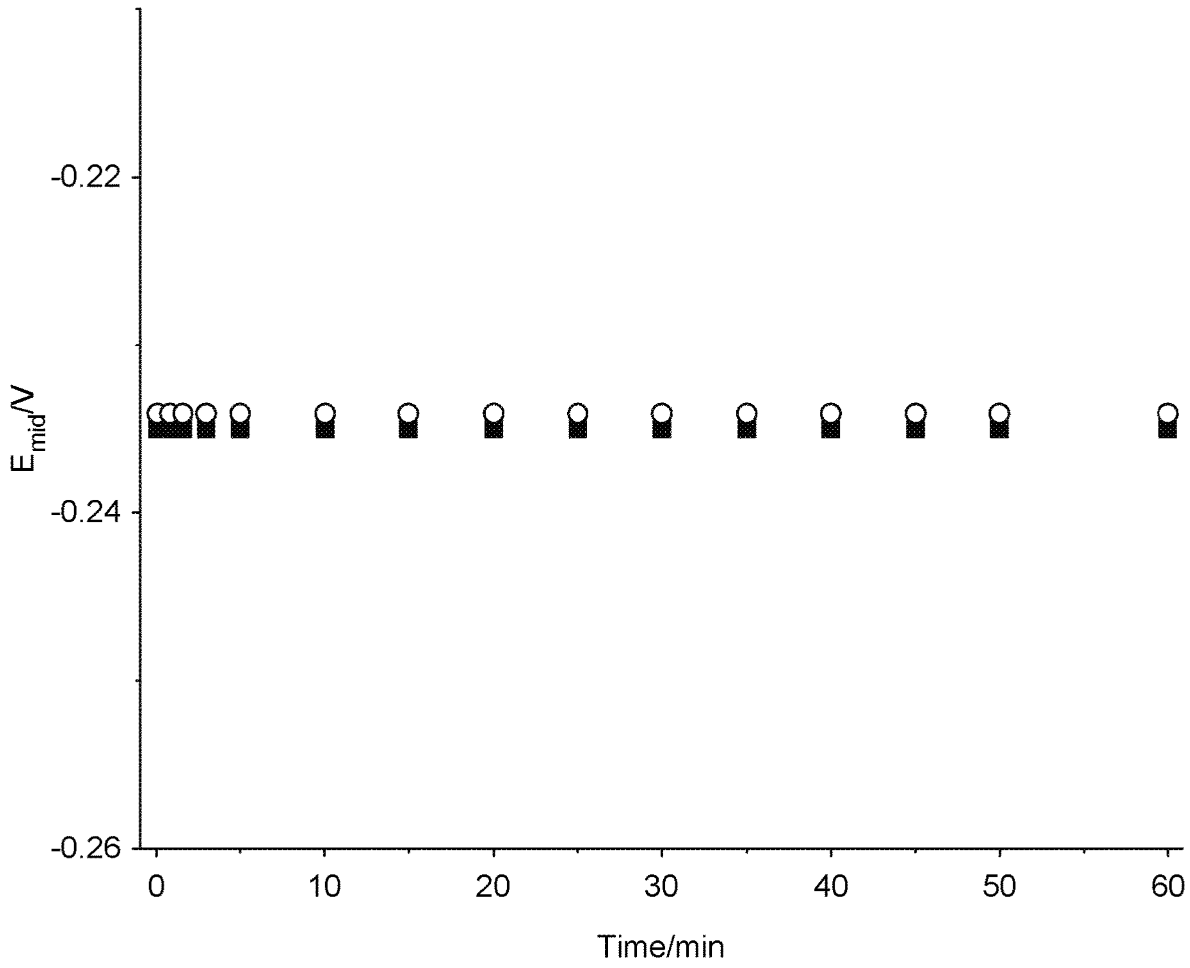

FIG. 14 shows the midpoint potential, $E_{mid}$, of $[Ru(NH_3)_6]^{3+}$ reduction vs. $Fc/Fc^+$ Nafion film (with a doping ratio of 1:30 and film thickness of 35 μm) reference electrodes recorded over one hour (uniform film surface, square data points; rough film surface, circle data points).

Figure 15:
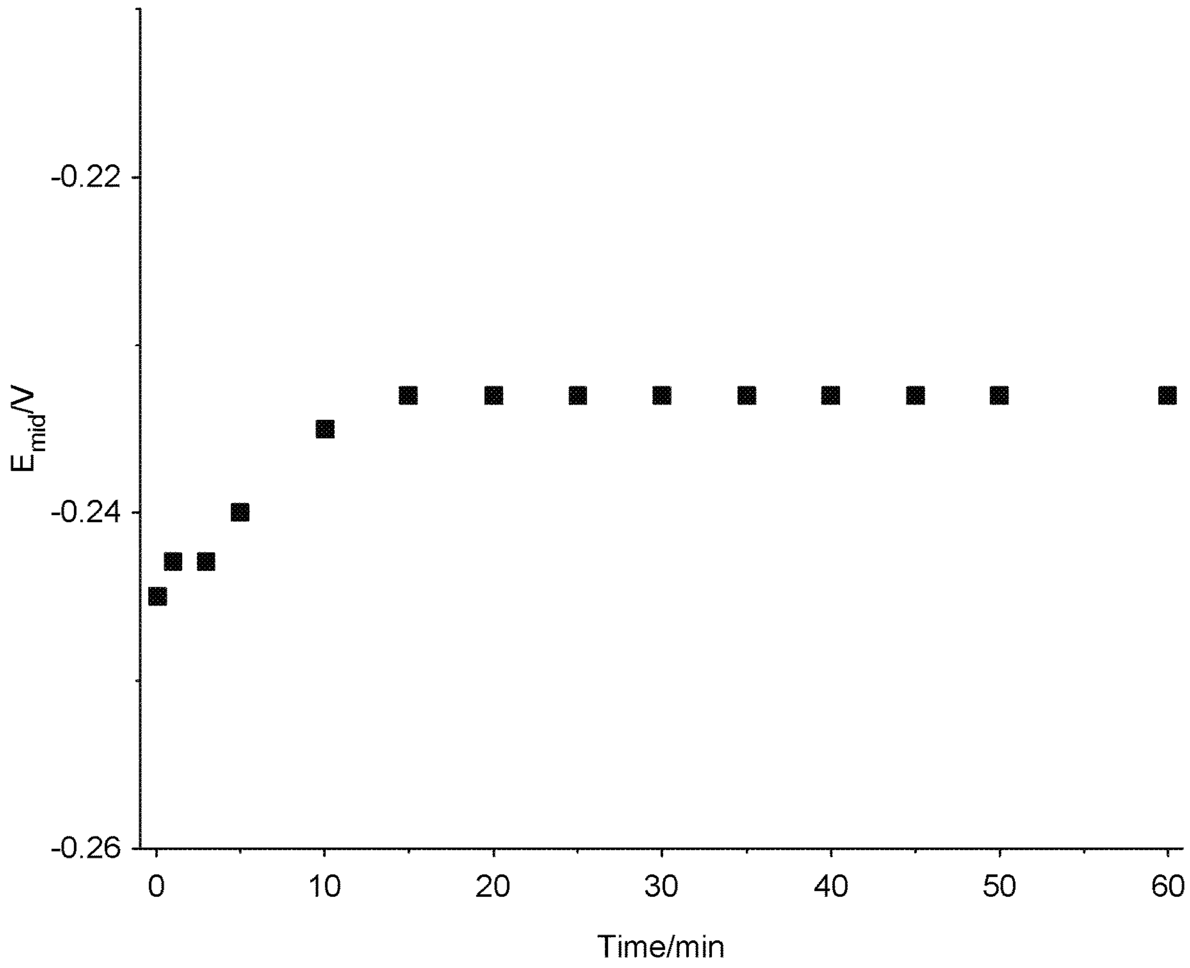

FIG. 15 shows the midpoint potential, $E_{mid}$, of $[Ru(NH_3)_6]^{3+}$ reduction vs. $PVFc/PVFc^+$ Nafion film (with a doping ratio of 1:30, film thickness of 35.1 μm and uniform surface) reference electrodes recorded over one hour.

Figure 16:
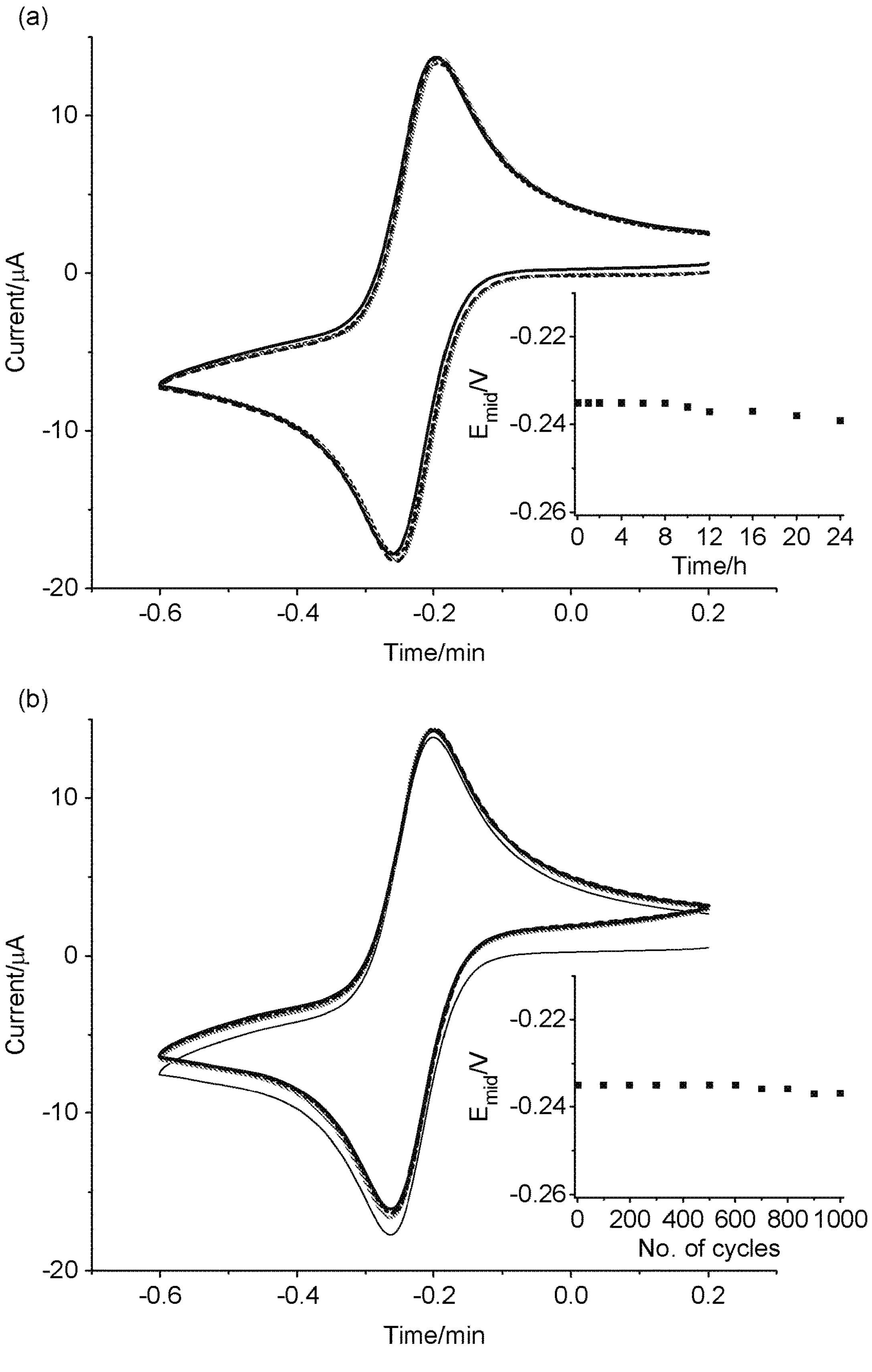

FIG. 16 shows (a) Voltammograms of a glassy carbon sensing/working electrode with a $Fc/Fc^+$ Nafion film reference electrode in 0.1 M KCl aqueous solution containing 1 mM $[Ru(NH_3)_6]Cl_3$ at a scan rate of 0.1 V $s^{-1}$ recorded after the electrodes are immersed in solution (voltammograms correspond to the electrode fresh (i.e. 0 h); after 2 h; after 6 h; after 12 h; and after 24 h). Inset shows the midpoint potential, $E_{mid}$, over time. (b) Voltammograms recorded over 1000 successive scans (voltammograms correspond to the $1^{st}$ scan at the electrode; the $100^{th}$ scan; the $200^{th}$ scan; the $600^{th}$ scan; and the $1000^{th}$ scan). Inset shows the midpoint potential, $E_{mid}$, over the number of scans. Raw data of the insets has been tableted in Tables 1&2.

Figure 17:
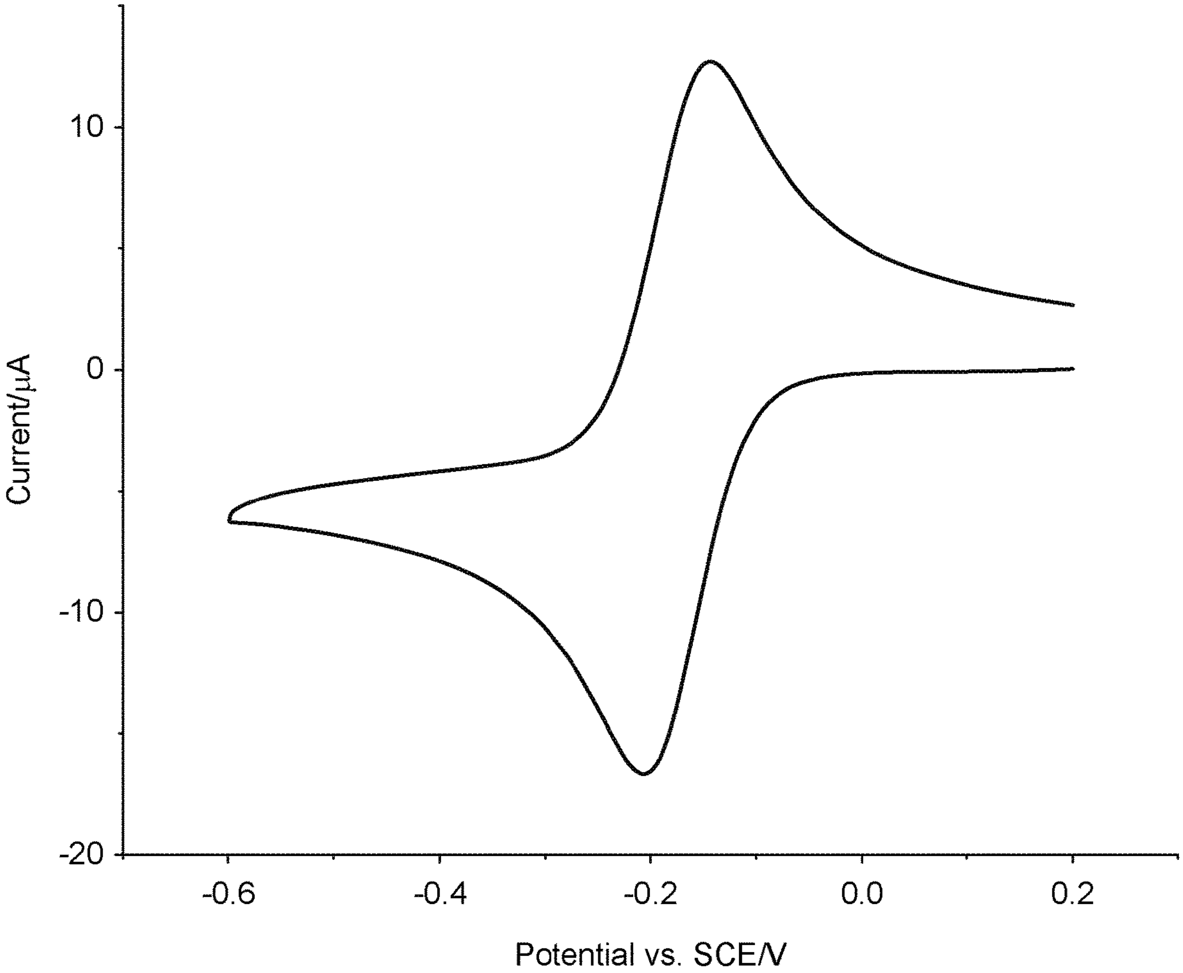

FIG. 17 shows voltammograms of a glassy carbon sensing/working electrode with a saturated calomel electrode (SCE) reference electrode in 0.1 M KCl aqueous solution containing 1 mM $[Ru(NH_3)_6]Cl_3$ at a scan rate of 0.1 V $s^{-1}$.

Figure 18:
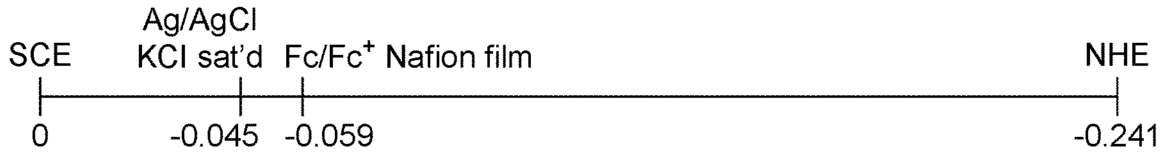

FIG. 18 shows the potential of $Fc/Fc^+$ Nafion film reference electrode in aqueous solution.

Figure 19:
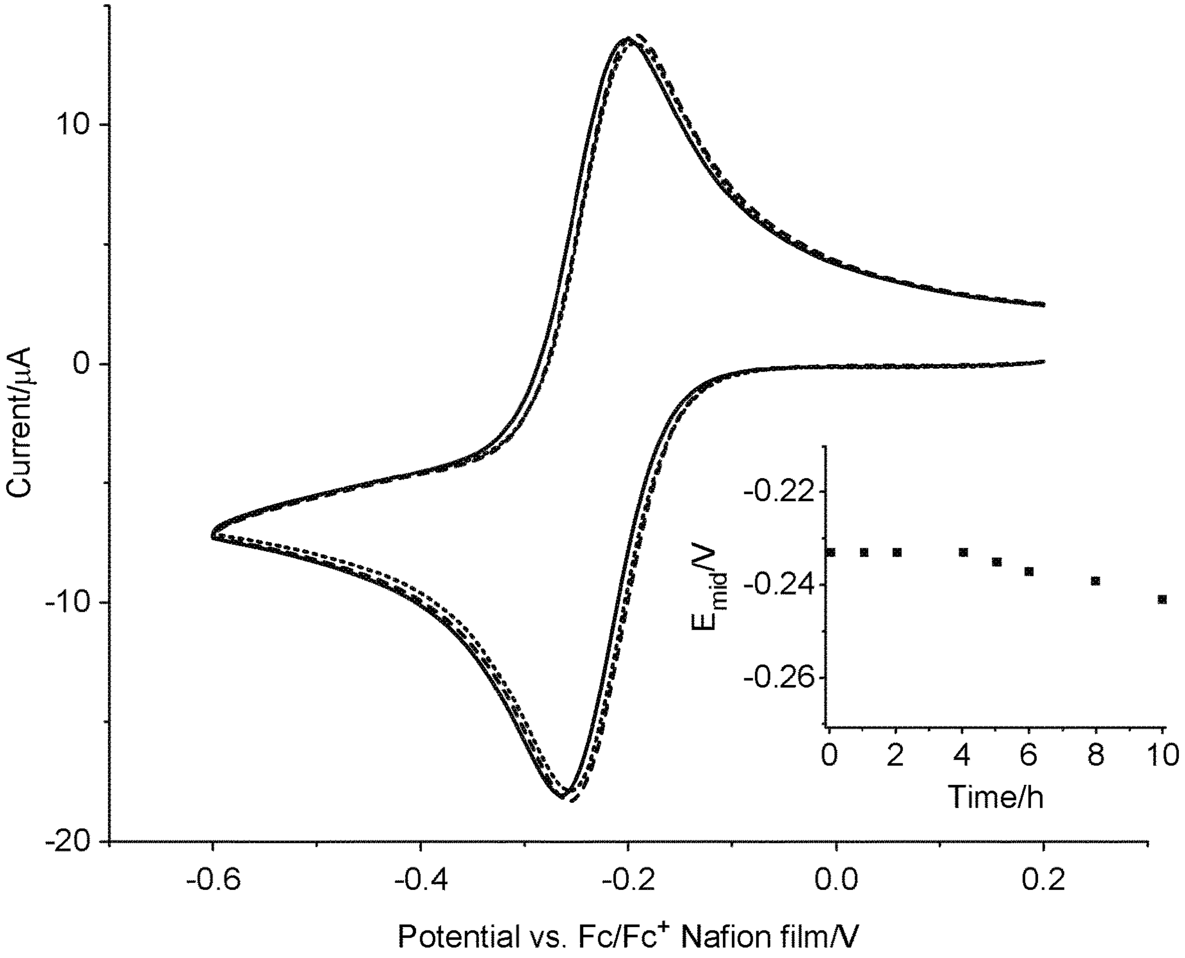

FIG. 19 shows voltammograms of a glassy carbon sensing/working electrode with the same $Fc/Fc^+$ Nafion film reference electrode in 0.1 M KCl aqueous solution containing 1 mM $[Ru(NH_3)_6]Cl_3$ at a scan rate of 0.1 V $s^{-1}$ recorded after the electrodes being fabricated and left in in air without any protection (voltammograms correspond to the electrode fresh (i.e. after 0 h); 4 days kept in air; and 10 days kept in air). Inset shows the midpoint potential, $E_{mid}$, over the time.

Figure 20:
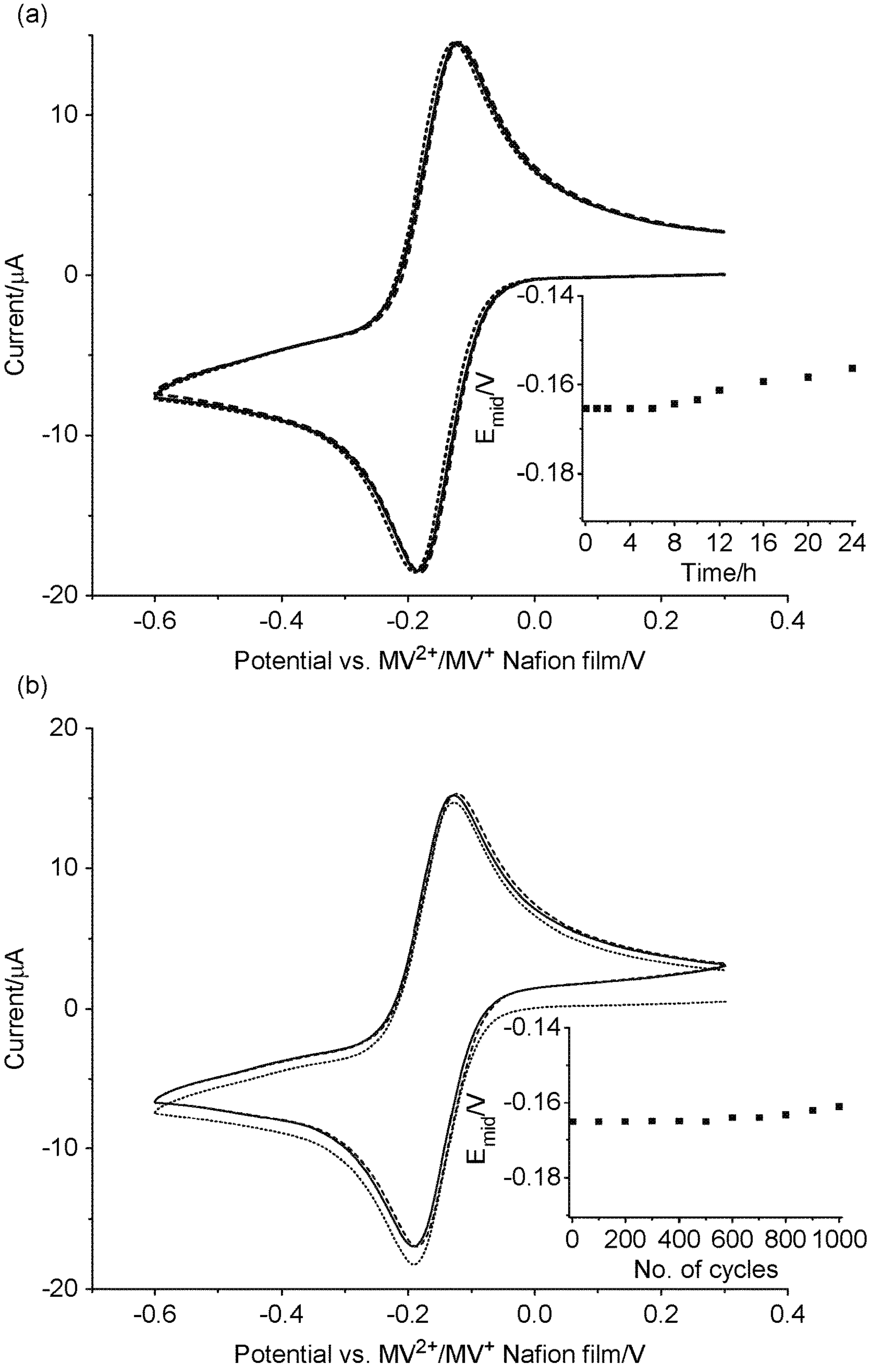

FIG. 20 shows (a) Voltammograms of a glassy carbon sensing/working electrode with a $MV^{2+}/MV^+$ Nafion film reference electrode in 0.1 M KCl aqueous solution containing 1 mM $[Ru(NH_3)_6]Cl_3$ at a scan rate of 0.1 V $s^{-1}$ recorded after the electrodes are immersed in solution (voltammograms correspond to the electrode fresh (i.e. 0 h), after 2 h; after 12 h; and after 24 h). Inset shows the midpoint potential, $E_{mid}$, over the time. (b) Voltammograms recorded over 1000 successive scans (voltammograms correspond to the $1^{st}$ scan; the $100^{th}$ scan; the $200^{th}$ scan; the $600^{th}$ scan; and the $1000^{th}$ scan). Inset shows the midpoint potential, $E_{mid}$, over the number of scans.

Figure 21:
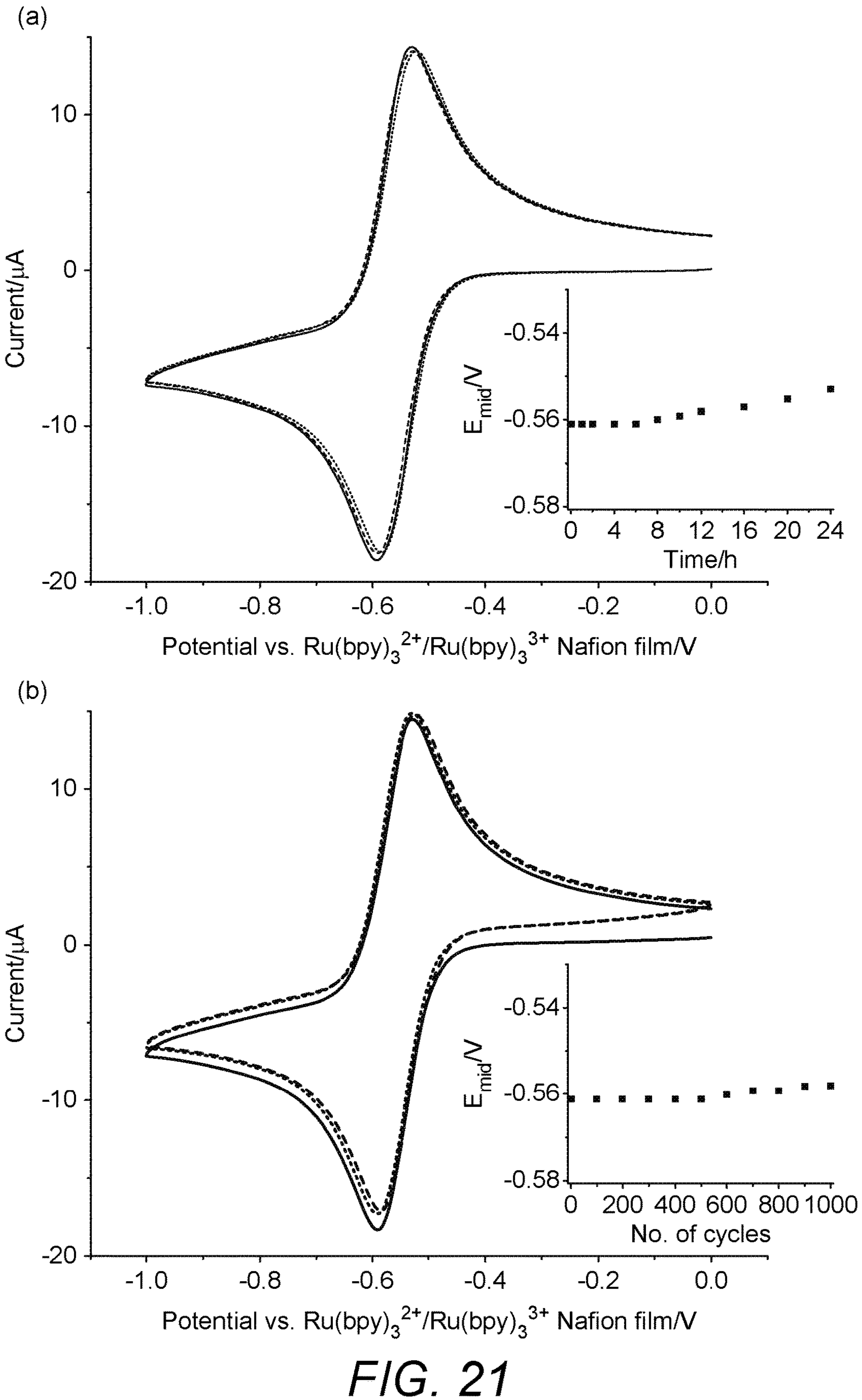

FIG. 21 shows (a) Voltammograms of a glassy carbon sensing/working electrode with a $Ru(bpy)_3^{2+}/Ru(bpy)_3^{3+}$ Nafion film reference electrode in 0.1 M KCl aqueous solution containing 1 mM $[Ru(NH_3)_6]Cl_3$ at a scan rate of 0.1 V $s^{-1}$ recorded after the electrodes are immersed in solution (voltammograms correspond to the electrode fresh (i.e. 0 h); after 2 h; after 12 h; and after 24 h). Inset shows the midpoint potential, $E_{mid}$, over the time. (b) Voltammograms recorded over 1000 successive scans (voltammograms correspond to the $1^{st}$ scan; the $100^{th}$ scan; the $200^{th}$ scan; the $600^{th}$ scan; and the $1000^{th}$ scan). Inset shows the midpoint potential, $E_{mid}$, over the number of scans.

Figure 22:
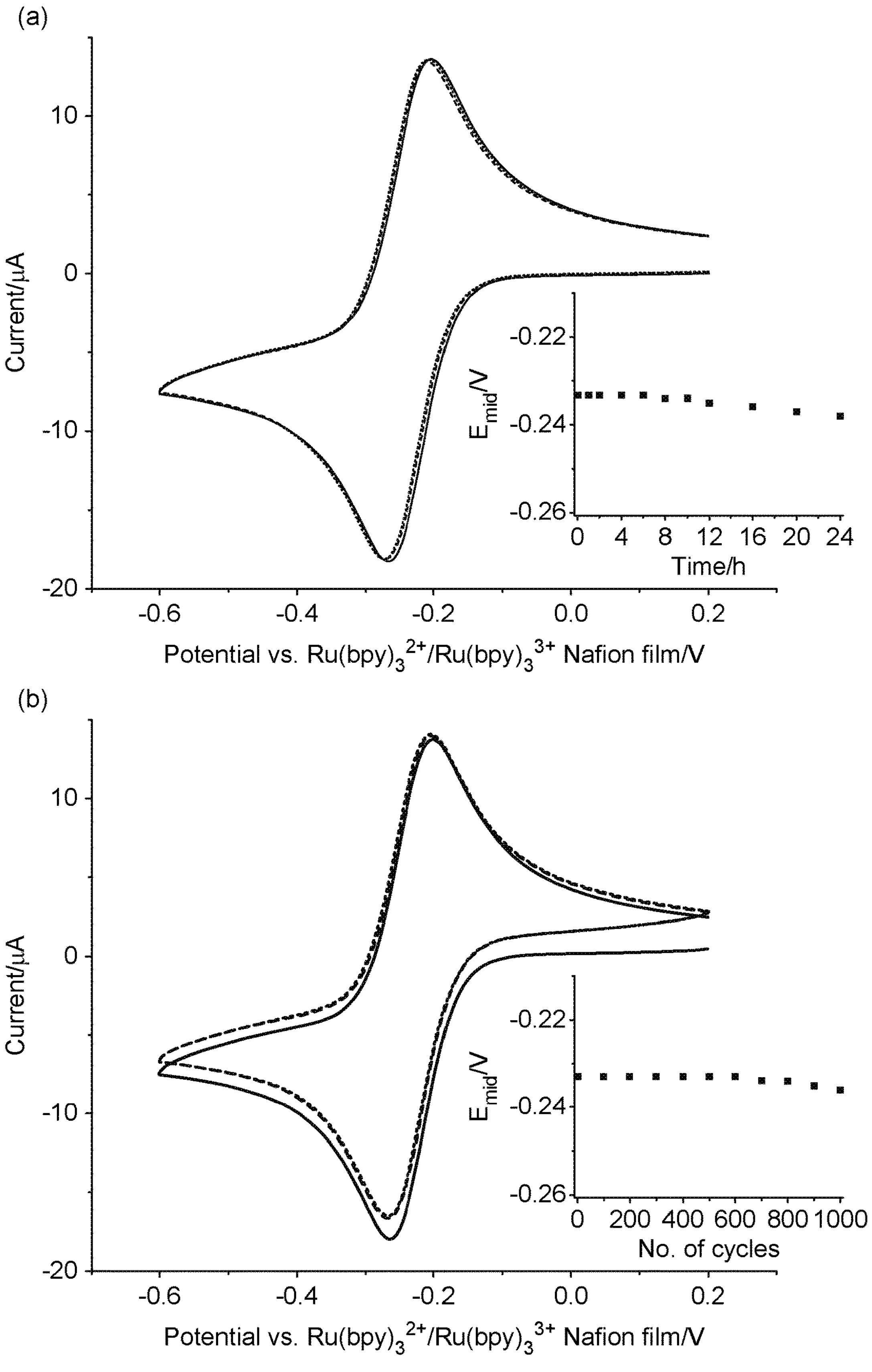

FIG. 22 shows (a) Voltammograms of a glassy carbon sensing/working electrode with a $PVFc/PVFc^+$ Nafion film reference electrode in 0.1 M KCl aqueous solution containing 1 mM $[Ru(NH_3)_6]Cl_3$ at a scan rate of 0.1 V $s^{-1}$ recorded after the electrodes immersing in solution (voltammograms correspond to the electrode fresh (i.e. 0 h); after 2 h; after 12 h; and after 24 h). Inset shows the midpoint potential, $E_{mid}$, over the time. (b) Voltammograms recorded over 1000 successive scans (voltammograms correspond to the $1^{st}$ scan; the $100^{th}$ scan; the $200^{th}$ scan; the $600^{th}$ scan; and the $1000^{th}$ scan). Inset shows the midpoint potential, $E_{mid}$, over the number of scans.

DETAILED DESCRIPTION

Aspects of the present invention have been described above. Optional and preferred features are described below. Unless otherwise stated, any optional or preferred feature can be combined with any other optional or preferred feature, and with any of the aspects or embodiments of the invention mentioned herein.

All measurements herein are measured under standard conditions unless stated otherwise. All averages referred to herein refer to the mean average, unless stated otherwise.

An isolated coated substrate described herein may refer to a coated substrate which is not part of an electrochemical circuit (i.e. isolated from an electrochemical circuit) and/or which is isolated from oxidising or reducing conditions (i.e. isolated from the conditions sufficient to oxidise or reduce the redox active substance).

The reference electrode referred to herein is the electrode with a stable (i.e. invariant) potential under the conditions prevailing in an electrochemical measurement, which enables observation, measurement or control of the sensing/working electrode. A stable potential may be defined herein as any potential with a standard deviation of less than 5 mV between 2 or more measurements, optionally less than 1 mV between 2 or more measurements, optionally less than 0.5 mV between 2 or more measurements, optionally less than 0.1 mV between 2 or more measurements, optionally less than 0.05 mV between 2 or more measurements. The reference electrode demonstrates a stable and invariant potential despite changing concentrations of chemical species in the sample and/or test solution.

The sensing electrode referred to herein is the electrode in which the reaction of interest is occurring (i.e. the electrode at which the potential and/or current is measured with respect to the reference electrode). The sensing electrode may be used interchangeably with the term working electrode.

A counter electrode referred to herein is an inert electrode which provides a pathway for current to flow in an electrochemical cell.

A 2-electrode system, typically comprises a sensing/working electrode and a joint reference/counter electrode. A 3-electrode system typically comprises a sensing/working electrode, a reference electrode, and a counter electrode. In a three-electrode system (i.e. which comprises a reference electrode, a counter electrode and a sensing/working electrode), the counter electrode provides a pathway for current to flow, therefore no or substantially no current passes through the reference electrode (i.e. with respect to the working and/or counter electrodes).

A redox active substance described herein refers to any electroactive substance that has both an oxidised and reduced state. The redox active substance in its oxidised state may be referred to as the oxidised redox active substance herein. The redox active substance in its reduced state may be referred to as the reduced redox active substance herein. If the oxidised redox active substance has a charge of p, the reduced redox active substance has a charge of (p−1), or optionally a charge of (p−2) or most generally (p−n) wherein n is an integer. A redox couple referred to herein corresponds to both the oxidised redox active substance and the reduced redox active substance.

A polymer described herein refers to any molecule formed of repeating subunits (i.e repeating monomers). The definition of polymer herein is taken to include copolymer, that is, molecules formed from more than one monomer.

A monomer described herein is any molecule that is capable of polymerisation.

A perfluorinated monomer described herein refers to any monomer that contains only carbon-fluorine bonds, carbon-carbon bonds and carbon-heteroatom bonds (e.g. C—O, C—S, C—N, C—Cl)

An organometallic described herein refers to a metal atom which is bonded to an organic group or groups, and may be optionally taken to exclude cyanometallates.

A metallocene described herein refers to a compound comprising at least one cyclopentadienyl anion bound to a metal centre.

Amperometric measurements described herein refer to measurements in which a current is measured between electrodes in response to an applied potential.

Potentiometric measurements described herein refer to measurements in which the potential is measured between electrodes.

Log P referred to herein is the log of the partition coefficient (P). The partition coefficient is defined as the ratio of solute concentrations in a biphasic system of 1-octanol and water (i.e. P=concentration of solute in 1-octanol/concentration of solute in water).

The oxidation or oxidative potential referred to herein refers to the potential at the electrode, as measured by voltammetry, when oxidation occurs. This is determined by the peak potential when the potential is scanned in a positive (anodic) direction.

The reduction or reductive potential referred to herein refers to the potential at the electrode, as measured by voltammetry, when reduction occurs. This is determined by the peak potential when the potential is scanned in a negative (cathodic) direction.

The midpoint potential described herein is taken to be the average (mean) of the oxidative and reductive peak potentials.

Potential drift referred to herein refers to any deviation in measured electrode potential between two or more scans. Initial potential drift refers to any deviation of measured electrode potential measured after fabrication of the electrode. Potential drift referred to herein may refer to any drift which is greater than 0.1 mV, optionally greater than 0.2 mV, optionally greater than 0.4 mV, optionally greater than 0.5 mV, optionally greater than 1 mV, optionally greater than 2 mV, optionally greater than 3 mV, optionally greater than 4 mV, optionally greater than 5 mV over a specified period of time. The specified period of time may optionally be 30 seconds, optionally 1 minute, optionally 5 minutes, optionally 10 minutes, optionally 20 minutes, optionally 30 minutes, optionally 45 minutes, optionally 1 hour, optionally 3 hours, optionally 6 hours.

Equivalent weight of the polymer described herein refers to the mass of the polymer (in grams) per mole of cation exchange sites in their acidic form (i.e. anionic groups in acid form), optionally wherein the cation exchange sites are sulfonate groups in their acid form.

A cation exchange polymer as referred to herein is any polymer containing anionic groups which enables the transportation of cations. A cation exchange polymer referred to herein may be taken to exclude polymers which allow for the transportation of anions.

The aspects herein comprise a coated substrate, wherein the substrate or electrode is at least partially coated with a layer comprising a polymer and a redox active substance.

The layer herein may have any particular form. In an embodiment, the layer comprises a film of the polymer with the redox active substance dispersed in the polymer. The film of the polymer may be considered a continuous layer of the polymer, which may be formable by dropcasting a solution comprising the polymer and evaporating the solvent from the solution (i.e. substantially lacking any particles of the polymer). In an embodiment, the layer comprises a precipitate comprising the polymer with the redox active substance dispersed in the polymer. In an embodiment, the layer comprises a plurality of particles which comprise the polymer and the redox active substance. The particles may have any suitable size. In an embodiment, the particles may have an average diameter of less than 1000 μm, optionally less than 500 μm, optionally less than 300 μm, optionally less than 100 μm, optionally less than 50 μm, optionally less than 20 μm, optionally less than 10 μm, optionally less than 5 μm, optionally less than 2 μm, optionally less than 1 μm. The particles may have an average diameter of at least 0.1 μm, optionally at least 0.2 μm, optionally at least 0.3 μm. The particles may have an average diameter of from 0.1 μm to 2 μm, optionally from 0.1 μm to 1.5 μm, optionally from 0.1 μm to 1 μm, optionally from 0.1 μm to 0.7 μm, optionally from 0.2 μm to 0.7 μm, optionally from 0.2 μm to 0.6 μm. The diameter of one particle may be measured by any suitable technique, such as a scanning electron microscopy (SEM). The diameter may be the largest measurement across the particle. The mean diameter of a plurality of particles may be measured, for example, by taking a scanning electron micrograph of a sample from the composition, the electron micrograph showing at least 50, optionally at least 100 particles, and then measuring the mean diameter from the sample by dividing the sum of the diameter of n particles by n, wherein n is at least 50, optionally at least 100. The particles described herein may be substantially spherical. In an embodiment, the particles may have an aspect ratio, as measured using a scanning electron microscope, of 1.5 or less, optionally 1.4 or less, optionally 1.3 or less. Optionally, at least 50%, by number, of the particles have an aspect ratio 1.5 or less, optionally 1.4 or less, optionally 1.3 or less. The aspect ratio may be defined at the ratio of the largest dimension of a particle, as determined by SEM, divided by the smallest dimension of the particle, determined by SEM. The particles herein may be produced by any method, for example, the re-precipitation method. The present inventors found that substrates at least partially coated with a layer comprising a plurality of particles (i.e. comprising the polymer and redox active substance) showed faster potential stabilisation (i.e. less initial potential drift) than a layer of film comprising the polymer and redox active substance with a similar thickness.

In an embodiment, the redox active substance is dispersed in the polymer. In an embodiment, both the reduced redox active substance and the oxidised redox active substance are distributed homogenously in the polymer. In an embodiment, the redox active substance is immobilised on or within the polymer.

The substrate herein may additionally comprise additives which may serve to stabilise the coating layer or, in some embodiments, to improve the polymer film chemistry. The additives may be selected from anti-oxidants (i.e. primary and/or secondary antioxidants), heat stabilizers, free-radical scavengers, fillers, acid scavengers or a combination thereof. In an embodiment, the additives are present within the layer comprising the polymer and the redox active substance. In an embodiment, the additives are immobilised within the polymer.

In an embodiment, the additives may comprise cerium (e.g. a cerium ion or a cerium oxide), which may prevent radical formation. In an embodiment, the additives may comprise hydroxycinnamate. In an embodiment, the additives may comprise a hydrotalcite. In an embodiment, the additives may be selected from silica, zirconium oxide, zirconium phosphide, zirconium phosphates, titanium dioxide, carbon nanotubes, heteropolyacids (e.g. an acid comprising oxygen; acidic hydrogen atoms; a p-block element, optionally wherein the p-block element is Si, P or As, and a metal, optionally wherein the metal is W, Mo or Va) or a zeolite (e.g. aluminosilicates). These additives may improve the stability and optionally improve the water retention capacity of the polymer. The substrate herein may additionally comprise a second polymer, different to the cation-exchange polymer described herein. The cation-exchange polymer may be reinforced with the second polymer, for example, wherein the second polymer is an expanded polytetrafluroroethene polymer. This may improve mechanical properties and dimensional stability in response to humidity changes. The cation-exchange polymer may be blended with the second polymer using electrospinning.

The layer of polymer and redox active substance may have any suitable thickness. In an embodiment, the thickness of the layer may be from 0.2 μm to 500 μm, optionally from 2 μm and 200 μm, optionally from 3 μm to 100 μm, optionally from 5 μm to 75 μm, optionally from 6 μm to 60 μm, or optionally from 7 μm to 55 μm. In an embodiment, the thickness of the layer may be greater than 2 μm, optionally greater than 3 μm, optionally greater than 5 μm, optionally greater than 7 μm, optionally greater than 10 μm, optionally greater than 15 μm, optionally greater than 20 μm, optionally greater than 22 μm, optionally greater than 25 μm, optionally greater than 28 μm, optionally greater than 30 μm, optionally greater than 32 μm, optionally greater than about 35 μm, or optionally greater than 50 μm. In an embodiment, the thickness of the layer may be less than 200 μm, optionally less than 100 μm, optionally less than 75 μm, or optionally less than 50 μm. The thickness of the layer referred to herein may be measured by any suitable method, for example, as measured by atomic force microscopy (AFM). Layer coatings of greater thickness were found to be more stable, yet had an increased tendency to show initial potential drift.

The aspects herein employ any suitable cation-exchange polymer. The cation exchange polymer herein may comprise any suitable anionic groups which facilitate the transportation of cations. In other words, the cation-exchange polymer is formed from monomers which comprise anionic groups. The cation-exchange polymer may comprise a sulfonate group, a carboxylate group or a phosphonate group. In other words, the cation-exchange polymer may be formed from monomers comprising a sulfonate group, monomers having a carboxylate group, monomers having a phosphonate group (i.e. $PO_3^{2-}$ or $PO_3H^-$) or combinations thereof. In an embodiment, the cation-exchange polymer may be a perfluorosulfonic acid polymer or a perfluorocarboxylic acid polymer. In an embodiment, the cation exchange polymer is a sulfonated polyurethane, a carboxylated polyurethane or a phosphonated polyurethane. In an embodiment, the cation-exchange polymer may be a sulfonated polyetherketone or a carboxylated polyetherketone. In an embodiment, the cation-exchange polymer may be a sulfonated hydrocarbon polymer, a carboxylated hydrocarbon polymer, or a phosphonated hydrocarbon polymer. The hydrocarbon polymer may be, for example, selected from polyimides, poly(phenylene)s, poly(arylenes), or poly(phosphazenes). In an example, the cation-exchange polymer is a perfluorosulfonic acid polymer.

In an embodiment, the monomer having a sulfonate group or carboxylate group may be of the formula $CFR^1{=}CF_2$, wherein $R^1$ is a group of the formula $-L-SO_3M$ or L-COOM, and wherein L is a linker group and M is selected from H and a Group I metal, which may be selected from Li, Na, K and Rb. L may be a linker group comprising perfluorinated carbons and, optionally, oxygen atoms, which may form ether linkages between the carbon atoms. The polymer herein may comprise one monomer of the formula $CFR^1{=}CF_2$ (i.e. wherein $R^1$ is a group of the formula $-L-SO_3M$, L-COOM), or may comprise more than one polymer of formula $CFR^1{=}CF_2$ (i.e. wherein $R^1$ is a group of the formula $-L-SO_3M$ or L-COOM). In an embodiment, L has a length of 1 atom of greater, optionally 2 atoms or greater, optionally 3 atoms or greater, or optionally 4 atoms or greater. In an embodiment, L has a length of between 2 to 5 atoms, optionally between 3 to 5 atoms, optionally 5 atoms. In an embodiment, $-L-SO_3M$ may have the formula

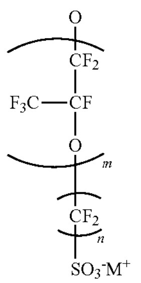

wherein m is optionally selected from 0, 1, 2, 3 or 4, and n is optionally selected from 1, 2, 3, 4, 5, 6, and M is optionally hydrogen. In an embodiment, m=1 or ≥1, n=2 and M=H. In an embodiment m=0, n=2 and M=H. In an embodiment, m=0, n=4 and M=H. In an embodiment m=0 or 1, optionally to give an average value m value of 0.1 in the polymer, n is selected from 1, 2, 3, 4 or 5 and M=H. In an embodiment, m=0 or 1, optionally to give an average value m value of 0.3 in the polymer, n is selected from 2, 3, 4 or 5 and M=H.

In an embodiment, the cation-exchange polymer comprises at least one fluorine atom. In other words, the cation-exchange polymer may be formed from fluorinated monomers, which may be selected from tetrafluoroethylene, hexafluoropropylene, 1,1-difluoroethylene, fluorovinylether, trifluorostyrene, substituted trifluorostyrenes or combinations thereof. In an embodiment, the cation-exchange polymer may be formed from a fluorinated monomer and a non-fluorinated monomer. In an embodiment, the cation-exchange polymer may be formed entirely from fluorinated monomers, optionally perfluorinated monomers. In an embodiment, the perfluorinated monomer is a perfluorinated alkene, which may comprise 2 carbons, 3 carbons, 4 carbons, 5 carbons, 6 carbons or more than 6 carbons. In an embodiment, the perfluorinated monomer may consist entirely of carbon and fluorine. The cation-exchange polymer herein may comprise one perfluorinated monomer, or may comprise more than one perfluorinated monomer.

In an embodiment, the cation-exchange polymer may be formed from a perfluorinated monomer and a monomer having a sulfonate group (e.g. any monomer having a sulfonate group described herein). In an embodiment, the polymer may be formed from a perfluorinated monomer and a monomer having a carboxylic acid group (e.g. any monomer having a carboxylic group described herein). In an example, the perfluorinated monomer is tetrafluoroethylene.

The cation-exchange polymer herein may have any suitable equivalent weight (i.e. grams of polymer per mole of cation exchange sites in acid form, optionally sulfonate groups in acid form). In an embodiment, the equivalent weight of the cation-exchange polymer is from 350 to 1600, optionally from 500 to 1500, optionally from 600 to 1400, optionally from 700 to 1300, optionally from 900 to 1250, optionally from 950 to 1200, optionally from 1000 to 1150, or optionally about 1100. In an embodiment, the equivalent weight of the cation-exchange polymer is greater than 700, optionally greater than 800, optionally greater than 900, optionally greater than 1000. In an embodiment, the equivalent weight of the cation-exchange polymer is less than 1500, optionally less than 1250. Suitable examples of the cation-exchange polymer include those sold under the tradename Nafion® by DuPont or those sold under the tradename Aquivion®, Flemion (AGC), Acipex (Asahi Chemical), GORE, Gore-Select, FKL Cation exchanging membrane or 3M™.

The cation-exchange polymer may have any suitable conductivity, as measured at 25° C. and 100% relative humidity. In an embodiment, the polymer has a conductivity of 0.005 $Scm^{-1}$ or greater, optionally 0.01 $Scm^{-1}$ or greater, optionally 0.02 $Scm^{-1}$ or greater, optionally 0.03 $Scm^{-1}$ or greater, optionally 0.04 $Scm^{-1}$ or greater, optionally 0.05 $Scm^{-1}$ or greater, optionally 0.06 $Scm^{-1}$ or greater, optionally 0.07 $Scm^{-1}$ or greater, or optionally 0.1 $Scm^{-1}$ or greater.

In all aspects described herein, there may be any suitable molar ratio of redox active substance to cation-exchange polymer. The ratio of redox active substance to the cation-exchange polymer defined herein is defined as the molar ratio of cation exchange sites (i.e. anionic groups) in the polymer to the redox active substance. In an embodiment, the molar ratio of cation exchange sites (i.e. anionic groups) in the polymer to the redox active substance is from 10:1 to 150:1, optionally from 15:1 to 125:1, optionally from 20:1 to 100:1, optionally from 30:1 to 100:1, or optionally from 30:1 to 50:1. In an embodiment, the molar ratio of cation exchange sites (i.e. anionic groups) in the polymer to the redox active substance is greater than 10:1, optionally greater than 20:1, optionally greater than 25:1, or optionally about 30:1. In an embodiment, the molar ratio of cation exchange sites (i.e. anionic groups) in the polymer to the redox active substance is less than 150:1, optionally less than 125:1, optionally about 100:1, optionally less than 75:1, or optionally less than 55:1. In an example, the cation exchange sites are sulfonate groups. At high ratios of sulfonate groups to redox active substance (e.g. 4:1), the substrate/electrode demonstrated higher potential drift, while at lower ratios (i.e. 200:1), the substrate/electrode was more likely to have a fluctuating $E_{mid}$ potential.

According to all aspects herein, the coated substrate comprises a redox active substance present in both an oxidised and reduced state. In other words, the substrate is at least partially coated with a layer comprising a cation-exchange polymer and both components of a redox couple. In an embodiment, the molar ratio of the oxidised redox active substance to the reduced redox active substance is from 1:5000 to 5000:1, optionally from 1:2500 to 1:2500, optionally from 1:1500 to 1500:1, optionally from 1:1250 to 1250:1, optionally from 1:1000 to 1000:1, optionally from 1:600 to 600:1. In an embodiment, the molar ratio of the oxidised redox active substance to the reduced redox active substance is from 1:1500 to 1:50 and/or from 1500:1 to 50:1, optionally from 1:1250 to 1:75 and/or from 75:1 to 1250:1, optionally from 1:1000 to 1:100 and/or from 1000:1 to 100:1.

In an embodiment, the oxidised redox active substance has been partially reduced to form the reduced redox active substance, such that the molar ratio of oxidised redox active substance to the reduced redox active substance is from 2500:1 to 25:1, optionally from 1500:1 to 50:1, optionally from 1250:1 to 75:1, optionally from 1000:1 to 100:1. In an embodiment, the reduced redox active substance has been partially oxidised to form the oxidised redox active substance, such that the molar ratio of oxidised redox active substance to the reduced redox active substance is from 1:25 to 1:2500, optionally from 1:50 to 1:1500, optionally from 1:75 to 1:1250, optionally from 1:10 to 1:1000. The redox active substance may be partially oxidised by applying a potential scan at the electrically conductive substrate in a positive (anodic) direction. The redox active substance may be partially reduced by applying a potential scan at the coated substrate in a negative (cathodic) direction.

In an embodiment, the standard electrode potential (in all cases relative to the SCE and in aqueous solution) for oxidising the reduced state to the oxidised state, and/or for reducing the oxidised state to the reduced state, is from −2V to 2V, vs SCE. In an embodiment, the standard electrode potential for oxidising the reduced state to the oxidised state is between −2 V to 1.5V vs SCE, optionally from −1.0V to 1.2V vs SCE, optionally from −0.5V to 0.5V vs SCE, optionally from −0.3V to 0.2V vs SCE, optionally from −0.1V to 0V vs SCE, optionally about −0.059 V vs SCE (e.g. when the reduced redox active substance is ferrocene, and the oxidised redox active substance is $Fc^{+}$). In an embodiment, the standard electrode potential for reducing the oxidised state to the reduced state is from −2V to 0V vs SCE, optionally from −1.8 V to 0 V vs SCE, optionally from −1.6 V to 0 V vs SCE, optionally from −1.5 V to 0 V vs SCE, optionally from −1.8 V to −0.1 V vs SCE, optionally from −1.8 V to −0.2 V vs SCE, optionally from −1.8 V to −0.4 V vs SCE, optionally from −1.8 V to −0.5 V vs SCE, optionally from −1.8 V to −0.6 V vs SCE, optionally from −1.6 V to −0.8 V vs SCE, optionally from −1.4 V to −0.6 V vs SCE. In an embodiment, the standard electrode potential for reducing the oxidised state to the reduced state is from 0 V to 2V vs SCE, optionally from 0 V to 1.8 V vs SCE, optionally from 0 V to 1.6 V vs SCE, optionally from to 0

V to 1.5 V vs SCE, optionally from 0.1 V to 1.8 V vs SCE, optionally from 0.2 V to 1.8 V vs SCE, optionally from 0.5 V to 1.8 V vs SCE, optionally from 0.8 V to 1.8 V vs SCE to, optionally from 0.8 V to 1.6 V vs SCE. In an embodiment, the standard electrode potential for reducing the oxidised state to the reduced state is from −1V to 1V, vs SCE. In an embodiment, the standard electrode potential for reducing the oxidised state to the reduced state is from −1V to 0 vs SCE. In an embodiment, the standard electrode potential for reducing the oxidised state to the reduced state is from 0 to −1V vs SCE.

According to all aspects herein, the oxidised and/or reduced redox active substance may be selected such that it favourably interacts with the cation-exchange polymer. In an embodiment, the oxidised redox active substance, and optionally the reduced redox active substance, is positively charged (i.e. any substance with a charge greater than 0, optionally greater than 1). A positively charged redox active substance can interact with the polymer electrostatically. In an embodiment, the reduced redox active substance and/or the oxidised redox active substance is hydrophobic. A hydrophobic substance may refer to any substance which has a water contact angle of 90 degrees or greater. A hydrophobic substance referred to herein may alternatively be any substance with a log P greater than 0, optionally greater than 1, optionally greater than 2. A hydrophobic redox active substance can interact with the backbone of the polymer via hydrophobic interaction. In an example, the cation-exchange polymer is formed from perfluorinated monomers, and the redox active substance can interact with the perfluorinated backbone of the polymer via hydrophobic interaction.

According to all aspects herein, the oxidised and/or reduced redox active substance may have low solubility or be insoluble in water or aqueous conditions. In an embodiment, the reduced and/or oxidised redox active substance may have a solubility of less than 1 g per litre of water at 25° C., optionally less than 0.5 g per litre of water at 25° C., optionally less than 0.1 g per litre of water at 25° C., optionally less than 0.01 g per litre of water at 25° C., optionally less than 0.0001 g per litre of water at 25° C. In an embodiment, the reduced redox active substance is insoluble in water, and the molar ratio of the reduced redox active substance to the oxidised redox active substance is from 1:50 to 1:1500, optionally from 1:75 to 1:1250, optionally from 1:100 to 1:1000. In an embodiment, the oxidised redox active substance is insoluble in water, and the molar ratio of the reduced redox active substance to the oxidised redox active substance is from 1500:1 to 50:1, optionally from 1250:1 to 75:1, optionally from 1000:1 to 100:1. In an embodiment, an insoluble reduced redox active substance has been generated by partial reduction of the oxidised redox active substance. In an embodiment, an insoluble oxidised redox active substance has been generated by partial oxidation of the reduced redox active substance. In an example, the oxidised redox active substance Fe is partially reduced to form Fc, wherein Fc is insoluble in water. This was found to reduce initial potential drift. Without wishing to be bound by theory, it is believed that inhomogeneous distribution of a substance generated by partial oxidation and reduction is eliminated if the substance is insoluble.

According to all aspects herein, the redox active substance referred to herein (i.e. the reduced redox active substance and/or the oxidised redox active substance) may have any suitable diffusion coefficient in the polymer. In an embodiment the oxidised and/or reduced redox active substance has a diffusion coefficient in the polymer greater than $1\times10^{-10}$ $cm^2$ $s^{-1}$, optionally greater than $5\times10^{-10}$ $cm^2$ $s^{-1}$, optionally greater than $1\times10^{-9}$ $cm^2$ $s^{-1}$. The present inventors found that a redox active substance with a higher diffusion coefficient allowed for faster initial potential stabilisation after fabrication. In an embodiment, the oxidised redox active substance is generated by partial oxidation of the reduced redox active substance, and the oxidised redox active substance has a diffusion coefficient greater than $1\times10^{-10}$ $cm^2$ $s^{-1}$, optionally greater than $5\times10^{-10}$ $cm^2$ $s^{-1}$, optionally greater than $1\times10^{-9}$ $cm^2$ $s^{-1}$. In an embodiment, the reduced redox active substance is generated by partial reduction of the oxidised redox active substance, and the reduced redox active substance has a diffusion coefficient greater than $1\times10^{-10}$ $cm^2$ $s^{-1}$, optionally greater than $5\times10^{-10}$ $cm^2$ $s^{-1}$, optionally greater than $1\times10^{-9}$ $cm^2$ $s^{-1}$.

In an embodiment, the redox active substance is a metal complex. In an embodiment, the metal complex comprises a species comprising a metal ion and one or a plurality of ligands, coordinated to the metal ion. A metal complex may be defined as a moiety comprising a metal, which is coordinated to a ligand. The ligand may be coordinated by a heteroatom, i.e. a non-carbon atom, such as oxygen or nitrogen, or the ligand may be a cyano group. M may be selected from any of Group of the Period table, e.g. selected from Group 1, 2, 3, 4, 5, 6, 7, 8, 9, 10, 11, 12 and 13 of the Periodic Table. M may be selected from any transition metal, including, but not limited to Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au and Hg. The metal complex may comprise the metal and one or a plurality of ligands, wherein the metal complex comprises a species of the formula $[M(L)_n]^{m+}$, wherein M is a metal, L is a ligand (optionally, where n is greater than 1, wherein a plurality of different ligands may be present, i.e. $(L)_n$ does not necessarily denote n ligands of the same type in the complex, simply that there is more than one ligand), and wherein n is an integer from 1 to 6, or n is an integer of at least 1, optionally at least 2, optionally at least 3, optionally at least 4, optionally at least 5, optionally at least 6, optionally 1 to 3, optionally 1, 2 or 3. In an embodiment, M has an oxidation state of +2 in its reduced state and M has an oxidation state of +3 in its oxidised state.

In an embodiment, the ligand may optionally comprise one or more nitrogen-containing groups (i.e. which coordinate with the metal). The nitrogen-containing groups may be nitrogen-containing heterocycles. In an embodiment, the ligand may optionally contain one or more aryl or heteroaryl groups, optionally a species comprising one or more heterocycles, e.g. one or more heteroaryl groups. The one or more heterocycles or heteroaryl groups may be or comprise one or more nitrogen-containing heteroaryl groups and/or may be selected from 5- or 6-membered heteroaryl groups, optionally selected from pyridine and pyrrole. M may be selected from group 8 or 9 of the periodic table, optionally wherein M is Co, Ru or Os wherein the metal has an oxidation state of +2 in its reduced state and an oxidation state of +3 in its oxidised state, and/or wherein the one or more heterocycles are nitrogen-containing heterocycles selected from pyridine and pyrrole, optionally wherein the heterocycle is a polyheterocycle. In an embodiment, L may be an optionally substituted bipyridinium compound, optionally an optionally substituted 2,2'-bipyridinium compound, optionally 2,2'-bipyridine (also termed bpy). Optionally $M(L)_n$ is $M(bpy)_3$, wherein M has an oxidation state of +2 in its reduced state, and an oxidation state of +3 in its oxidised state. Optionally the reduced redox active substance comprises or is $Ru(bpy)_3^{2+}$ and the oxidised redox active substance comprises or is $Ru(bpy)_3^{3+}$. Since $M(L)_n$ is a charged species, any counterions such as halide counterions may be present. The halide ions may be selected from fluoride, chloride, bromide and iodide.

In another embodiment, the ligand may comprise or is a cyano group. In an embodiment, M has an oxidation state of +2 in its reduced state and M has an oxidation state of +3 in its oxidised state. In an embodiment, the redox active substance comprises or is a hexacyanoferrate (i.e. wherein M is Fe, L is cyano and n=6), which comprises $Fe^{III}(CN)_6^{3-}$ in its oxidised state, and $Fe^{II}(CN)_6^{4-}$ in its reduced state. Since hexacyanoferrate is negatively charged, any suitable counterions may be present, including metal ions such as Co, Fe, Cu, Ag, In or Ni.

In an embodiment, the redox active substance is a molecular cationic species, optionally an organic cation. The molecular cationic species is positively charged in both its oxidised and reduced state. In other words, the molecular cationic species has a charge of at least 1 in its reduced state, and a charge of at least 2 in its oxidised state. A molecular cationic species would typically exclude a cation that is a metal ion, e.g. an iron cation, in an inorganic salt, such as $Fe_2O_3$ The covalently bonded moiety may be an organic species, i.e. a species containing carbon, which is covalently bonded to at least one other atom. The molecular cationic species may be defined as a species in cationic form that comprises a covalently bonded moiety. The covalently bonded moiety may be an organic species, i.e. a species containing carbon, which is covalently bonded to at least one other atom. The covalently bonded moiety may be an organic cation, i.e. a cation containing carbon, which is covalently bonded to at least one other atom, and optionally the charge is borne by a non-metal atom in the organic cation, e.g. carbon or nitrogen. The organic cation may lack a metal ion. Optionally, the organic cation is a heterocyclic cation, i.e. a cation comprising a heterocyclic ring, optionally a poly heterocyclic cation, i.e. a cation comprising a plurality of heterocyclic rings, and optionally one or more atoms of the heterocyclic ring or rings, or groups directly or indirectly covalently bonded to the heterocyclic ring or rings, bears a positive charge. Optionally, the redox active substance comprises the organic cation and one or more counterions. Optionally, the organic cation comprises a heteroaryl cation and optionally one or more counterions are associated with the cation. Optionally, the organic cation is a heteroaryl cation, optionally comprising a plurality of heteroaryl rings. Optionally, the organic cation comprises one or more nitrogen-containing heteroaryl groups, which may be 5- or 6-membered heterocyclic rings, optionally selected from pyridine and pyrrole. Optionally, one or more counterions such as halide counterions may be present with the organic cation, and e.g. the halide ions may be selected from fluoride, chloride, bromide and iodide. Optionally, the organic cation comprises or is an bipyridinium compound, which is optionally substituted, for example, an optionally substituted 4,4'-bipyridinium compound, optionally an alkyl substituted 4,4'-bipyridinium compound, optionally a 1,1-dialkyl substituted 4,4'-bipyridinium compound, optionally an 1',1-di$C_1$-$C_{10}$alkyl substituted 4,4'-bipyridinium compound, optionally a 1, 1'-dimethyl-4, 4'-bipyridinium. The bipyridinium compound may have a charge of +2 in its oxidised state, and a charge of +1 in its reduced state. In an example, the oxidised redox active substance is 1, 1'-dimethyl-4, 4'-bipyridinium species with a charge of +2 ($MV^{2+}$) and the reduced redox active substance is 1, 1'-dimethyl-4, 4'-bipyridinium species with a charge of +1 ($MV^{+}$.). Since such bipyridinium cations are charged any counterions such as halide counterions may be present. The halide ions may be selected from fluoride, chloride, bromide and iodide. Optionally, the redox active substance in its oxidised state is 1, 1'-dimethyl-4, 4'-bipyridinium dichloride, which is sometimes termed paraquat dichloride.

In an embodiment, the redox active substance may comprise an organometallic, that is, any species comprising a metal carbon bond. The metal of the organometallic may be selected from any of Group of the Period table, e.g. selected from Group 1, 2, 3, 4, 5, 6, 7, 8, 9, 10, 11, 12 and 13 of the Periodic Table. The metal may be any transition metal, for example, selected from Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au and Hg. In an embodiment, the organometallic may comprise one or more aryl moieties, such as a cyclopentadienyl ring or a benzene ring. In an embodiment, the organometallic may comprise or is a metallocene. In an embodiment, the metallocene may have a charge of 0 in its reduced state and a charge of +1 in its oxidised state. In an embodiment, the metallocene may have a charge of −1 in its reduced state and a charge of 0 in its oxidised state. In an embodiment, the metallocene with a charge of +1 in its reduced state and a charge of +2 in its oxidised state. Optionally one or more counterions may be present with any positively charged organometallic species, e.g. a hexafluorophosphate anion, or a halide. In an embodiment, the metallocene may comprise a compound with formula ($[M(C_5R_5)_xL_y]$) in its reduced state and ($[M(C_5R_5)_xL_y]$)$^+$ in its oxidised state, wherein x may be 1 or more, 2, or 2 or more; y may be 0, 1, 2, 3, 4 or 5 and R may be selected from H, alkyl, alkenyl, alkynyl, phenyl, aryl, heteroaryl, arylalkyl, alkylaryl, heteroarylalkyl, alkylheteroaryl, alkoxy, aryloxy, arylalkoxy, acyl, aroyl, amino, amido, nitro, cyano, carboxy, alkoxycarbonyl, aryloxycarbonyl, arylalkoxycarbonyl, alkylsulfonyl, arylsulfonyl, heteroarylsulfonyl, hydroxyl, halo (i.e. fluorine, chloride, bromine or iodo), amino alkyl, halo alkyl, dialkyl-amino, a thio-containing group, such as thiol or a thioether, or a polymer. In an embodiment, the metallocene has the formula ($[M(C_5R_5)_2]$)$^+$ in its oxidised state, and ($[M(C_5R_5)_2]$) in its reduced state, wherein M is selected from Fe, Co, Rh, Ru, Mn, Cr, V or Ni, optionally Fe or Co, and R is selected from H, alkyl (e.g. methyl), alkenyl, alkynyl, phenyl, aryl, heteroaryl, arylalkyl, alkylaryl, heteroarylalkyl, alkylheteroaryl, alkoxy, aryloxy, arylalkoxy, acyl (e.g. formyl or acetyl), aroyl, amino, amido, nitro, cyano, carboxy, alkoxycarbonyl, aryloxycarbonyl, arylalkoxycarbonyl, alkylsulfonyl, arylsulfonyl, heteroarylsulfonyl, hydroxyl, halo (i.e. fluorine, chloride, bromine or iodo), amino alkyl, halo alkyl, dialkyl-amino, a thio-containing group, such as thiol or a thioether, a polymer or combinations thereof. In an embodiment M is Fe, and R may be selected from H and a methyl group, or a combination thereof. In an example, the oxidised redox active substance comprises or is the ferrocenium ion (i.e. $[Fe(C_5H_5)_2]$)$^+$ or $Fc^+$) and the reduced redox active substance comprises or is ferrocene (i.e ($[Fe(C_5H_5)_2]$ or Fe).

In an embodiment, the organometallic may be an organometallic polymer, which may optionally be formed from monomers which comprise a metallocene. In an embodiment, the monomers comprise ferrocene or a ferrocene derivative, for example, vinylferrocene (vFc), ferrocenylmethyl methacrylate (FMMA), (2-methacryloyloxy)ethyl ferrocene carboxylate (FcMA), 1-(acryloyloxy)ethyl ferrocenecarboxylate (AeFC), ferrocenyl glycidyl ether (FcGE) and vinyl ferrocenyl glycidyl ether (VFcGE). In an example, redox active substance is polyvinylferrocene (PvFc) in its reduced state and $PvFc^+$ in its oxidised state. In an embodiment, the organometallic polymer has a number average molecular weight from 10000 to 10000, optionally from 20000 to 80000, optionally from 30000 to 70000, optionally from 40000 to 60000, optionally about 50000.

In an embodiment, the organometallic may comprise a compound with formula ($[M(C_6R_6)_xL_y]$) in its reduced state and ($[M(C_6R_6)_xL_y]$)$^+$ in its oxidised state, wherein x may be 1 or 2; y may be 0, 1, 2 or 3, and R may be selected from H, alkyl, alkenyl, alkynyl, phenyl, aryl, heteroaryl, arylalkyl, alkylaryl, heteroarylalkyl, alkylheteroaryl, alkoxy, aryloxy, arylalkoxy, acyl, aroyl, amino, amido, nitro, cyano, carboxy, alkoxycarbonyl, aryloxycarbonyl, arylalkoxycarbonyl, alkylsulfonyl, arylsulfonyl, heteroarylsulfonyl, hydroxyl, halo (i.e. fluorine, chloride, bromine or iodo), amino alkyl, halo alkyl, dialkyl-amino, a thio-containing group, such as thiol or a thioether, or a polymer. M may be any transition metal, for example, selected from Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au and Hg, optionally selected from Cr and V.

In an embodiment, the redox active substance may comprise a metal cation. The metal cation has a charge of at least +1 its reduced state and a charge of at least +2 in its oxidised state. A metal cation referred to herein is any metal cation which is uncoordinated or free of covalently bound ligands. The metal may comprise any metal selected from any of Group of the Period table, e.g. selected from Group 1, 2, 3, 4, 5, 6, 7, 8, 9, 10, 11, 12 and 13 of the Periodic Table. The metal may be any transition metal, for example, selected from Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au and Hg.

The coated substrate may have any suitable size. In an embodiment, the coated substrate may have a maximum dimension of less than 5 mm, optionally a maximum dimension of less than 1 mm, optionally a maximum dimension of less than 0.5 mm, optionally a maximum dimension of less than 100 μm, optionally a maximum dimension of less than 50 μm, optionally a maximum dimension of less than 10 μm, optionally a maximum dimension of less than 5 μm, optionally a maximum dimension of less than 1 μm, optionally a maximum dimension of less than 500 nm, optionally a maximum dimension of less than 100 nm, optionally a maximum dimension of less than 50 nm, optionally a maximum dimension of less than 10 nm. The maximum dimension is defined as the longest dimension of the substrate which may be termed the length of the substrate (i.e. since the width and thickness of the substrate is typically considered less than the length). In an embodiment, the coated substrate may have a surface area of less than 1 $mm^2$, optionally less than 100 $\mu m^2$, optionally less than 10 $\mu m^2$ optionally less than 1 $\mu m^2$, optionally less than 100 $nm^2$. The size and/or surface area of the electrode may be measured using microscopy imaging, e.g. atomic force microscopy The coated substrate herein is suitable for use as a reference electrode. The coated substrate used may comprise an electrically conductive or semi-conductive substance. The coated substance may, for example, comprise a metal or carbon-containing material. The metal may comprise a transition metal, for example a transition metal selected from any of groups 9 to 11 of the Periodic Table. The coated substance may comprise a material selected from rhenium, iridium, palladium, platinum, copper, indium, rubidium, silver, gold and boron doped diamond. In an embodiment, the carbon containing material may be selected from glassy carbon, edge plane pyrolytic graphite, basal plane pyrolytic graphite, boron doped diamond, highly ordered pyrolytic graphite, carbon powder and carbon nanotubes. In an embodiment, the electrically conductive substance comprises indium tin oxide. In an embodiment, the electrically conductive substance comprises a conductive polymer. In an example, the substrate comprises glass carbon or graphite rods.

The coated substrate is suitably stable for use as a reference electrode. In an embodiment, the midpoint potential (i.e. $E_{mid}$) of the electrode has an average standard deviation of less than 5 mV after 1000 scans, optionally less than 4 mV after 1000 scans, optionally less than 3 mV after 1000 scans, optionally within 2 mV after 1000 scans. In an embodiment, the midpoint potential of the electrode has an average standard deviation of less than 10 mV after 10 days in atmospheric conditions, optionally less than 5 mV after 10 days in atmospheric conditions, optionally within 4 mV after 10 days in atmospheric conditions.

The coated isolated substrate may be producible by any suitable method. In an embodiment, the substrate is producible by a method according to the second aspect.

In an alternative embodiment, the coated isolated substrate is formed by a method comprising coating a substrate, at least partially, with a layer comprising a polymer and a redox active substance, wherein in the coating step, the redox active substance is present in both an oxidised and reduced state. The substrate may be coated by contacting the substrate with a solution comprising i) the polymer and ii) the redox active substance present in both an oxidised and reduced state; and depositing from the solution the polymer and redox active substance, such that the substrate is at least partially coated with a layer comprising the polymer and the redox active substance present in both an oxidised and reduced state, and removing the substrate from the solution to form a coated isolated substrate. The coated isolated substrate may be coated using the dropcasting method.

The Method

In a second aspect, there is provided a method of forming a coated, isolated substrate for use as an electrode, comprising:

- coating a substrate, at least partially, with a layer comprising a polymer and a redox active substance, wherein the polymer is a cation exchange polymer;
- partially oxidising or reducing the redox active substance under oxidising or reducing conditions, such that the redox active substance is present in the layer in both an oxidised and reduced state and
- removing the substrate from oxidising or reducing conditions to form an isolated coated substrate,
- wherein the redox active substance is present in both an oxidised and reduced state.

The method according to the second aspect can be used to produce the coated substrates according to the first aspect.

In the coating step, the redox active substance may be present in an oxidised state and/or reduced state. The layer may additionally comprise one or more of the additives described herein. In examples of the coating step, the redox active substance is $Fc^+$, $MV^{2+}$, PvFc or $Ru(bpy)^{2+}$.

The substrate may be coated using any suitable method. In an embodiment of the coating step, the substrate may be coated using a method selected from dropcasting, dropcoating, spincoating, dipcoating, spray-coating, abrasive immobilisation or mechanical immobilisation. In an example, the substrate is coated using a dropcasting method.

In an embodiment of the coating step, the substrate may be coated by a) providing a solution comprising i) the polymer and ii) the redox active substrate, and iii) optionally one or more of the additives described herein b) contacting the substrate with the solution and c) depositing from the solution the polymer and redox active substance, such that the substrate is at least partially coated with a layer comprising the polymer and the redox active substance. The substrate may be coated once, or may be coated more than once, for example, more than twice, more than three times, more than four times, more than five times or more than ten times. It was found that coating the substrate more than once (e.g. by dropcasting), led to increased surface roughness of the coated layer, as judged microscopically. Any suitable volume of solution may be used for coating the substrate. In an embodiment, the solution has a volume greater than 2 μl, optionally greater than 5 μl, optionally greater or equal to 10 μl.

The coating step may be carried out at any suitable temperature, for example from 15° C. to 25° C. Alternatively, the coating step may be carried out at a temperature greater than 25° C., optionally greater than 50° C., optionally greater than 75° C., optionally greater than 100° C., optionally greater than 125° C., optionally greater than 150° C. Prior to the coating step, the method may optionally comprise an additional mixing step, wherein the polymer and the redox active substance are mixed in the solution.

The cation-exchange polymer and/or the redox active substance in solution may be provided in any suitable solvent. In an embodiment, the polymer and/or redox active substance is provided in a solution of water, alcohol and/or aprotic solvent. The alcohol may be selected from methanol, ethanol, 1-propanol, propan-2-ol, 1,4-butanediol, 1,5-pentanediol, ethylene glycol, 1,2-propanediol, 1,3-propanediol, 1,2-butanediol, 2,3-butanediol, 1,4-butanediol, 1,2-pentanediol, 2,4-pentanediol, 1,2-hexanediol, glycerol, 1,2,4-butanetriol, 2-ethoxyethanol or combinations thereof. The aprotic solvent may be selected from NMF, DMSO, NMP, DMF, DMAc, triethylphosphate or combinations thereof. In an embodiment, the polymer is provided in a solution comprising from 1-10% polymer by weight of the solution, optionally from 2-8% polymer by weight of the solution, optionally 3-7% polymer by weight of the solution, optionally from 4.5-6% polymer by weight of the solution. In an embodiment, the polymer is provided in a solution with a water content of 10-60% by weight of the solution, optionally 20-55% by weight of the solution, optionally 40-50% by weight of the solution. The solvent may have any suitable boiling point. In an embodiment, the solvent has a boiling point from 50 and 180° C., optionally from 55 to 120° C., optionally from 60° C. to 100° C., optionally from 65° C. to 95° C., optionally from 70° C. to 90° C., optionally from 75° C. to 85° C., optionally from 80° C. to 85° C. In an embodiment, the solvent comprises water and an alcohol selected from ethanol, 1-propanol, methanol, 2-propanol and combinations thereof, and wherein the water and alcohol are present in a molar ratio of from 1:2 and 2:1, optionally from 1:1.5 to 1.5:1, optionally from 1:1.2 to 1.2:1. Adjusting the boiling point of the solvent can alter the gelation properties and toughness of the polymer once coated on the substrate.

In an embodiment of the coating step, the substrate is coated such that the layer of polymer and redox active substance, after removal of the solvent, has a thickness of between 0.2 to 500 μm, optionally between 2 and 200 μm, optionally between 3 and 100 μm, optionally between 5 and 75 μm, optionally between 7 and 55 μm. In an embodiment, the substrate is coated such that the layer of polymer and redox active substance has a thickness greater than 2 μm, optionally greater than 3 μm, optionally greater than 5 μm, optionally greater than 7 μm, optionally greater than 10 μm, optionally greater than 15 μm, optionally greater than 20 μm, optionally greater than 25 μm, optionally greater than 30 μm, optionally greater than about 35 μm, optionally greater than 50 μm. In an embodiment, the substrate is coated such that the layer of polymer and redox active substance has a thickness of less than 200 μm, optionally less than 100 μm. The thickness of the coating referred to herein may be measured using any suitable method, for example, measured by atomic force (AFM) microscopy (AFM).

Prior to the partial oxidation or reduction step, the redox active substance may be in an oxidised state or a reduced state. If the redox active substance is coated in an oxidised state, the redox active substance is partially reduced under reducing conditions such that the redox active substance is present in the layer in both an oxidised and reduced state. If the redox active substance is coated in a reduced state, the redox active substance is partially oxidised under oxidising conditions such that the redox active substance is present in the layer in both an oxidised and reduced state. In an embodiment, the redox active substance in a reduced state is partially oxidised such that the molar ratio of the oxidised redox active substance to the reduced redox active substance is from 1:1500 to 1500:1, optionally from 1:1250 to 1250:1, optionally from 1:1000 to 1:1000, optionally from 1:50 to 1:1500, optionally from 1:75 to 1:1250, optionally from 1:100 to 1:1500. In an embodiment, the redox active substance in an oxidised state is partially reduced such that the molar ratio of the oxidised redox active substance to the reduced redox active substance is from 1:1500 to 1500:1, optionally from 1:1250 to 1250:1, optionally from 1:1000 to 1:1000, optionally from 50:1 to 1500:1, optionally from 75:1 to 1250:1, optionally from 100:1 to 1500:1.

The redox active substrate may be partially oxidised or reduced using any suitable conditions. In an embodiment, the redox active substrate is partially oxidised or reduced by applying a potential scan at the coated substrate (i.e. which may be referred to as a 'partial potential scan' herein). In an embodiment, the redox active substrate is partially oxidised by applying a potential scan at the substrate in a positive (anodic) direction (i.e. from a first smaller value to a larger second value). In an embodiment, the redox active substrate is partially reduced by applying a potential scan at the substrate in a negative (cathodic) direction (i.e. from a larger second value to a first smaller value). Relative to the potential of a saturated calomel electrode (SCE), the first value in the potential scan may be −2.5 V of more, optionally −2.0 V or more, optionally −1.5 V or more, optionally −1.25 or more, optionally −1.0 V or more, optionally −0.75V or more, optionally −0.5 V or more, optionally −0.2V or more, optionally −0.1V or more, optionally 0.0V or more, optionally 0.5 or more. In an embodiment, the first value in the potential scan may be the reductive peak potential of the redox active substance. In an embodiment, relative to the potential of a saturated calomel electrode, the second value in any potential scan may be +2.5 V or less, optionally +2.0 V or less, optionally +1.5 V or less, optionally +1.25 or less, optionally −+1.0 V or less, optionally +0.75 V or less, optionally +0.5 V or less, optionally +0.2 V or less, optionally +0.1 V or less, optionally 0.0V or less, optionally 0.5 V or less. In an embodiment, the second value in the potential scan may be the oxidative peak potential of the redox active substance.

In an embodiment, when partially oxidising the redox active substance, the potential scan in the positive (anodic) direction is stopped at or before the oxidative peak potential of the redox active substance, in other words, the potential scan is stopped after a certain amount of charge is transferred. In an embodiment, the potential scan is stopped at least 0.001 V before the oxidative peak potential (i.e. at a lower (more negative) value than the oxidative peak potential), optionally stopped at least 0.005 V before the oxidative peak potential, optionally stopped at least 0.01 V before the oxidative peak potential, optionally stopped at least 0.05V before the oxidative peak potential. In other words, in an embodiment, when partially oxidising the redox active substance, the potential scan in the positive (anodic) direction is scanned from a first smaller value, to a value at or lower than the oxidative peak potential. This can be used to generate a redox active substance that is partially oxidised. In an example, PvFc is partially oxidised by applying a potential scan in the positive (anodic) direction from −0.2 to +0.51 vs SCE.

In an embodiment, the potential scan in the negative cathodic direction is stopped at or before the reductive peak potential of the redox active substance, in other words, the potential scan is stopped after a certain amount of charge is transferred. In an embodiment, the potential scan is optionally stopped at least 0.001 V before the reductive peak potential (i.e, the potential scan is stopped at a potential higher (more positive) than the reductive peak potential), optionally stopped at a potential at least 0.005V before the reductive peak potential, optionally stopped at a potential at least 0.01V before the reductive peak potential, optionally stopped at a potential at least 0.05V before the reductive peak potential. In other words, in an embodiment, when partially reducing the redox active substance, the potential scan in the negative (cathodic) direction is scanned from a second larger value, to a value at or higher than the reductive peak potential. This can be used to generate a redox active substance that is partially reduced. In an example, $Fc^+$ is partially reduced by applying a potential scan in the negative (cathodic) direction from +0.5 V to −0.005V vs SCE. In an embodiment, the redox active substance is partially oxidised or reduced by chemical reaction. In an embodiment, there is provided a step of contacting the redox active substance with an oxidant or reductant. In an embodiment, there is provided a step of exposing the redox active substance to an oxidant or reductant.

In an embodiment, prior to the partially oxidising or reducing step, there is an additional scanning step, wherein the scanning step comprises scanning an applied potential at the substrate in both a positive (anodic) direction (i.e. from a first smaller value to a second larger value) and a negative (cathodic) direction (i.e. from a second larger value to a first smaller value). Relative to the potential of a saturated calomel electrode (SCE), the first value in the potential scan may be −2.5 V of more, optionally −2.0 V or more, optionally −1.5 V or more, optionally −1.25 or more, optionally −1.0 V or more, optionally −0.75V or more, optionally −0.5 V or more, optionally −0.2V or more, optionally −0.1V or more, optionally 0.0V or more, optionally 0.5 or more. In an embodiment, relative to the potential of a saturated calomel electrode, the second value in any potential scan may be +2.5 V or less, optionally +2.0 V or less, optionally +1.5 V or less, optionally +1.25 or less, optionally −+1.0 V or less, optionally +0.75 V or less, optionally +0.5 V or less, optionally +0.2 V or less, optionally +0.1 V or less, optionally 0.0V or less, optionally 0.5 V or less. In an embodiment, an applied potential is scanned in both a positive (anodic) and a negative (cathodic) direction at least once, optionally at least 3 times, optionally at least 5 times, optionally at least 10 times, optionally at least 15 times, optionally at least or equal to 20 times. This additional scanning step can be used to stabilise the coating.

The removing step may comprise isolating the coated substrate from solution or an electrochemical circuit. The removing step may comprise removing the substrate from exposure to an oxidant or reductant.

Apparatus

In a third aspect, there is provided an electrochemical apparatus comprising a sensing electrode and a reference electrode, wherein the reference electrode comprises a polymer and a redox active substance, wherein the polymer is a cation exchange polymer, and wherein the redox active substance is present in both an oxidised and reduced state.

The reference electrode may comprise a coated substrate, comprising a substrate that is at least partially coated with a layer comprising a polymer and a redox active substance. The coated substrate of the first aspect may be used as or part of the reference electrode of the third aspect.

The electrochemical apparatus herein may additionally comprise a counter electrode, and/or an operational amplifier, all of which may form all or part of an electrochemical cell or potentiostat. In use, an external voltage is applied between the reference and the sensing/working electrode, and the apparatus is such (e.g. via an operational amplifier, if present) that it allows electric current to be passed from the counter electrode to the sensing/working electrode, while ensuring that no or substantially no current flows between the reference and sensing/working electrode (and certainly less than the current flowing between the sensing/working electrode and the counter electrode). The sensing/working electrode may be placed in contact with a solution comprising the analyte of interest, which may be used to determine the concentration or activity of the analyte. In an embodiment, the concentration or activity of the analyte is determined (i.e. sensed) potentiometrically. In an embodiment, the concentration or activity of the analyte is determined (i.e. sensed) amperometrically, The electrochemical apparatus herein may comprise 3 or more electrodes comprising the sensing/working electrode, the reference electrode and a counter electrode. The electrochemical apparatus herein may alternatively consist of 2 electrodes, comprising the sensing/working electrode and the reference electrode (which functions as a joint counter and reference electrode). In an embodiment, the electrochemical apparatus does not comprise a standard hydrogen electrode, a normal hydrogen electrode, a silver/silver chloride electrode, a silver/silver sulfate electrode, a silver/silver nitrate electrode, a copper/copper sulfate electrode, a calomel electrode, a mercury/mercury oxide electrode or a mercury/mercury sulfate electrode. In an embodiment, the reference electrode and/or counter electrode has a larger surface area than the sensing/working electrode. In a 3-electrode system, the reference electrode has a smaller current running through the electrode, compared to the counter and working electrode. In an embodiment, the reference electrode has a smaller impedance than the sensing/working electrode. In an embodiment, the reference electrode has an impedance of less than 3 kohm, optionally less than 1 kohm.

The sensing/working electrode may comprise an electroactive species, different to the redox active substance present in the reference electrode. In an embodiment. the sensing/working electrode may comprise at least one compound capable of proton coupled electron transfer at the electrode surface, such that the electrode potential varies in response to proton concentration or proton activity (i.e. for pH-sensing). In an embodiment, the pH-sensing compound may comprise at least one metal oxide, for example, an iridium oxide. In an alternative embodiment, the pH-sensing compound may comprise a carbon material having at least one plane of carbon atoms, wherein the plane of carbon atoms has been oxidised at its edge, such that quinone structures or hydroquinone structures form part of the plane. In an embodiment, the sensing/working electrode may comprise at least one compound capable of sensing glucose oxidation or reduction at the electrode surface, such that the electrode potential values in response to glucose concentration. In an embodiment, the glucose-sensing compound is an enzyme such as glucose oxidase. In an embodiment, the glucose-sensing compound is a metal oxide, for example, ZnO, $CuO/Co_2O$, NiO, $Co_2O4$, $MnO_2$ and their nanocomposites.

The sensing/working electrode, and if present the counter electrode, may additionally comprise any suitable electrically conducting material, e.g. a metal, an alloy of metals and/or carbon. The sensing/working electrode, and if present the counter electrode, may comprise a transition metal, for example a transition metal selected from any of groups 9 to 11 of the Periodic Table. The sensing/working electrode, and if present the counter electrode, may comprise a material selected from, but not limited to, rhenium, iridium, palladium, platinum, copper, indium, rubidium, silver, gold and boron doped diamond.

The counter electrode may consist entirely of an inert material, for example, gold, silver, platinum or carbon.

The reference, counter and sensing/working electrodes may have any suitable shape or configuration. The shape and configuration of the electrodes is not particularly restricted. The electrodes may be in the form of points, lines, rings and/or flat planar surfaces. In an embodiment of a 3-electrode apparatus, the sensing/working electrode and the counter electrode are disposed opposite one another within a housing. In an alternative embodiment, the working and reference electrodes are disposed on the same face of a substrate. The electrodes may each be supported on a substrate, which may form part of a housing optionally enclosing the electrodes and any carrier medium or electrolyte that may be in contact with the electrodes. The substrate and/or housing may comprise any inert, non-conducting material, which may be selected from ceramic, plastic, glass and combinations thereof.

Use

According to the fourth aspect, there is the use of a substrate comprising a polymer and a redox active substance as, or as part of, a reference electrode, wherein the substrate comprises or is at least partially coated with a layer comprising, wherein the polymer is a cation-exchange polymer, and wherein the redox active substance is present in both an oxidised and reduced state.

In an embodiment, the reference electrode demonstrates no or substantially no potential drift 30 minutes after fabrication, optionally no potential drift 20 minutes after fabrication, optionally no potential drift 15 minutes after fabrication, optionally no potential drift 10 minutes after fabrication. Potential drift referred to herein refers to any deviation in measured electrode potential between two or more scans. Potential drift may be any drift in potential greater than 0.01 mV in a specified amount of time, optionally greater than 0.01 mV, optionally greater than 0.5 mV, optionally greater than 1 mV, optionally greater than 2 mV, optionally greater than 3 mV, optionally greater than 4 mV, optionally greater than 5 mV. The specified period of time may optionally be 1 minute, optionally 5 minutes, optionally 10 minutes, optionally 20 minutes, optionally 30 minutes, optionally 45 minutes, optionally 1 hour, optionally 3 hours, optionally 6 hours.

In a fifth aspect, there is provided a coated substrate according to the first aspect, or an electrochemical apparatus according to the third aspect, for use in electrochemical measurements, optionally as part of an electrochemical sensor, In use, the sensing/working electrodes is placed in contact with a substance, e.g. a solution, comprising the analyte of interest. In use, the apparatus may be used to determine the concentration or activity of an analyte, for example, $H^+$ (i.e. measuring of pH), glucose (i.e. for glucose sensing) a target gas, or other biological molecules.

The electrochemical measurements may be amperometric or potentiometric. In use (i.e. in potentiometric measurements), the potential may be measured between the sensing/working electrode and the reference electrode (i.e. which has a fixed potential). In use (i.e. in amperometric measurements), the potential may be applied at the working electrode, and the current is measured between the sensing/working electrode and the counter electrode. A variable potential may be applied at the sensing/working electrode as a function of time, and the current is measured between the sensing/working electrode and counter electrode. An operational amplifier may be used to maintain or control the potential between the sensing/working electrode and the reference electrode.

The electrochemical measurements described herein may utilise any suitable method, such as voltammetric methods. The voltammetric methods may be selected from cyclic voltammetry, sampled current polarography, differential pulse voltammetry, normal pulse voltammetry, sinusoidal alternating current voltammetry and square wave voltammetry, and the voltammetric methods may be carried out at any suitable frequency. In an embodiment, the electrochemical apparatus is suitable for use in electrochemical measurements, optionally as part of an electrochemical sensor, for any sample volume. In an embodiment, the volume of the sample is less than 1 ml, optionally less than 500 μL, optionally less than 250 μL, optionally less than 100 μL, optionally less than 75 μL, optionally less than 50 μL, optionally less than 30 μL, optionally less than 25 μL, optionally less than 10 μL.

In a sixth aspect, there is provided a coated substrate according to the first aspect or an electrochemical apparatus according to the third aspect, for use in microscopy. The microscopy may be used for electrochemical microscopy or scanning probe microscopy.

In a seventh aspect, there is provided a coated substrate according to the first aspect for use in microfluidics.

EXAMPLES

Chemical Reagents

All chemicals were used as received without further purification: ferrocenium hexafluorophosphate ($FcPF_6$, ≥97%, Aldrich), methyl viologen dichloride ($MVCl_2$, ≥98%, Aldrich), poly(vinylferrocene) (PVFc, number molecular weight of ca. 50,000, Polyscience Inc.), hexaammineruthenium(III) chloride ($[Ru(NH_3)_6]Cl_3$, Ru≥32.1%, Alfa Aesar), tris(2,2'-bipyridyl)dichlororuthenium(II) hexahydrate ($Ru(bpy)_3Cl_2.6H_2O$, ≥99.95%, Sigma-Aldrich), Nafion perfluorinated resin solution (5 wt % in lower aliphatic alcohol (45.0-51.0 wt % 1-propanol and <4% ethanol) and water with a water content of 45%, Sigma-Aldrich, equivalent weight 1100), potassium chloride (KCl, ≥99.0%, Sigma-Aldrich), sodium chloride (NaCl, ≥99.5%, Sigma-Aldrich), sodium phosphate dibasic ($Na_2HPO_4$, 99.0%, Sigma-Aldrich) and potassium phosphate monobasic ($KH_2PO_4$, ≥99.0%, Sigma-Aldrich). All solutions were prepared using ultrapure water (Millipore) with a resistivity of 18.2 MΩ cm at 298 K and degassed with Argon before use. Phosphate buffered saline buffer solution (PBS, pH=7.4) was composed of 137.0 mM NaCl, 2.7 mM KCl, 10.0 mM $Na_2HPO_4$ and 1.8 mM $KH_2PO_4$.

Electrochemical Measurements

Electrochemical experiments were performed using a μAutolab Type II potentiostat (Utrecht, Netherlands) inside a grounded and thermostatted (25.0±0.2° C.) Faraday cage. All measurements were conducted using standard three electrode setups employing different reference electrodes: saturated calomel electrode (SCE; BASi, Japan) or fabricated Nafion film reference electrodes (6.5 cm length×6 OD). A glassy carbon (GC) macroelectrode (3.0 mm diameter, CH Instrument) and a graphite rod were used as working and counter electrodes respectively.

1—FABRICATION OF THE NAFION FILM REFERENCE ELECTRODES

Four different reference electrodes were fabricated and studied in the examples. These were based on the following redox couples, $MV^{2+}/MV^{+}$, $Ru(bpy)_3^{2+}/Ru(bpy)_3^{3+}$, $Fc/Fc^{+}$ and $PVFc/PVFc^{+}$ immobilized in Nafion films. The reference electrodes were optimised by adjusting the doping ratio (of redox couple to Nafion), the film thickness and the film morphology.

1.1—Fabrication of the Fc/Fc+ Nafion Film Reference Electrode

Figure 1:
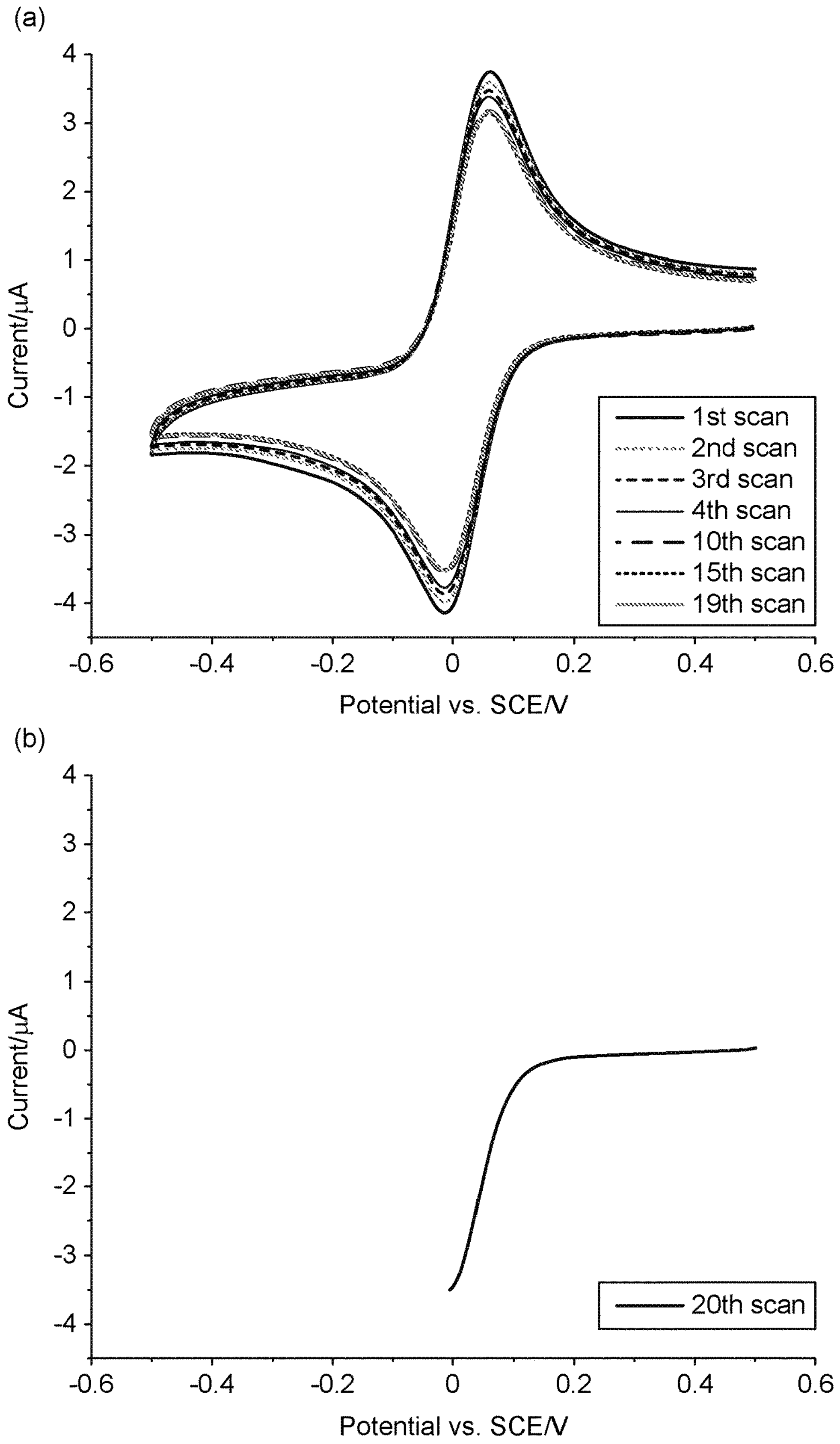
FIG. 1 shows voltammograms of a $Fc^+$-Nafion film (with the doping ratio of $Fc^+$:$SO_3^-$=1:30 and thickness of 35 μm) dropcasted glassy carbon electrode in pH 7.4 PBS buffer at a scan rate of 0.1 V $s^{-1}$ for 20 successive scans. (a) $1^{st}$ scan to $19^{th}$ scan (b) the $20^{th}$ scan

Preparation of the optimised $Fc/Fc^{+}$ Nafion film reference electrode was carried out electrochemically. The Fc+/Nafion stock samples (with the doping ratio of $Fc^{+}:SO_3^{-}$=1:30) were prepared by directly dissolving 0.6 mg of $Fc^{+}PF_6^{-}$ into 1.30 mL Nafion perfluorinated resin solution. The mixture was shaken on a vortex (Whirlmixer, Loughborough, UK) for 5 min. $Fc^{+}$/Nafion films were obtained by drop-casting 10 μL of $Fc^{+}$-Nafion solution on a bare glassy carbon (GC) macroelectrode and dried in a nitrogen environment at room temperature. Prior to use, the GC surface was cleaned by successively polishing with three grades of alumina (1.0, 0.3 and 0.05 μm, Buehler, UK) in a decreasing particle size order followed by sonication in water and drying with nitrogen. The $Fc/Fc^{+}$ Nafion film reference electrode was then obtained electrochemically by sweeping the potential first cathodically from 0.5 V to −0.5 V vs. SCE then reversing back to 0.5V at 0.1 V/s for 20 repetitive scans in degassed pH 7.4 PBS buffer and, in the final scan, the potential stopping at −0.005 V, (see FIG. 1). At this point, the $Fc^{+}$ was partially reduced and a Nafion film of $Fc/Fc^{+}PF_6^{-}$ was produced. The initial cycling helps to stabilize the coating; the final partial scan injects a net charge so that both Fc and $Fc^{+}$ are present in the film. The decrease in peak current after the $1^{st}$ scan is likely due to the slow mass transport of the electro-generated product within in the thick Nafion film, which can be easily misunderstood as the chemical depleting from the Nafion film, as detailed in previous work (Chen, L.; Lin, C.; Compton, R. G. *Physical Chemistry Chemical Physics* 2019, 21, 607-616, which is incorporated herein by reference). The current stops decreasing after a few scans confirming that current decrease is not caused by the redox depletion during the reaction. FIG. 1B shows the $20^{th}$ scan which is the final scan of the fabrication process, showing $Fc^{+}$ was partially reduced and a Nafion film of $Fc/Fc^{+}PF_6^{-}$ was produced.

The relative amount of Fc and $Fc^{+}$ in Nafion films after the final scan is estimated to be 1:548 (See—Section 1.6 below—'Estimation of the Relative amount of dopant redox species in Nafion film reference electrodes').

The dry thickness of this film was estimated to be 35 μm (See Section 1.5 below—'Estimation of Nafion film thickness'). The Nafion film prepared is uniform and homogeneous and its estimated thickness was verified by AFM microscopy (Krtil, P.; Trojánek, A.; Samec, Z. *The Journal of Physical Chemistry B* 2001, 105, 7979-7983, which is incorporated herein by reference).

1.2—Fabrication of the $MV^{2+}MV^{+}$ Nafion Film Reference Electrode

Figure 2:
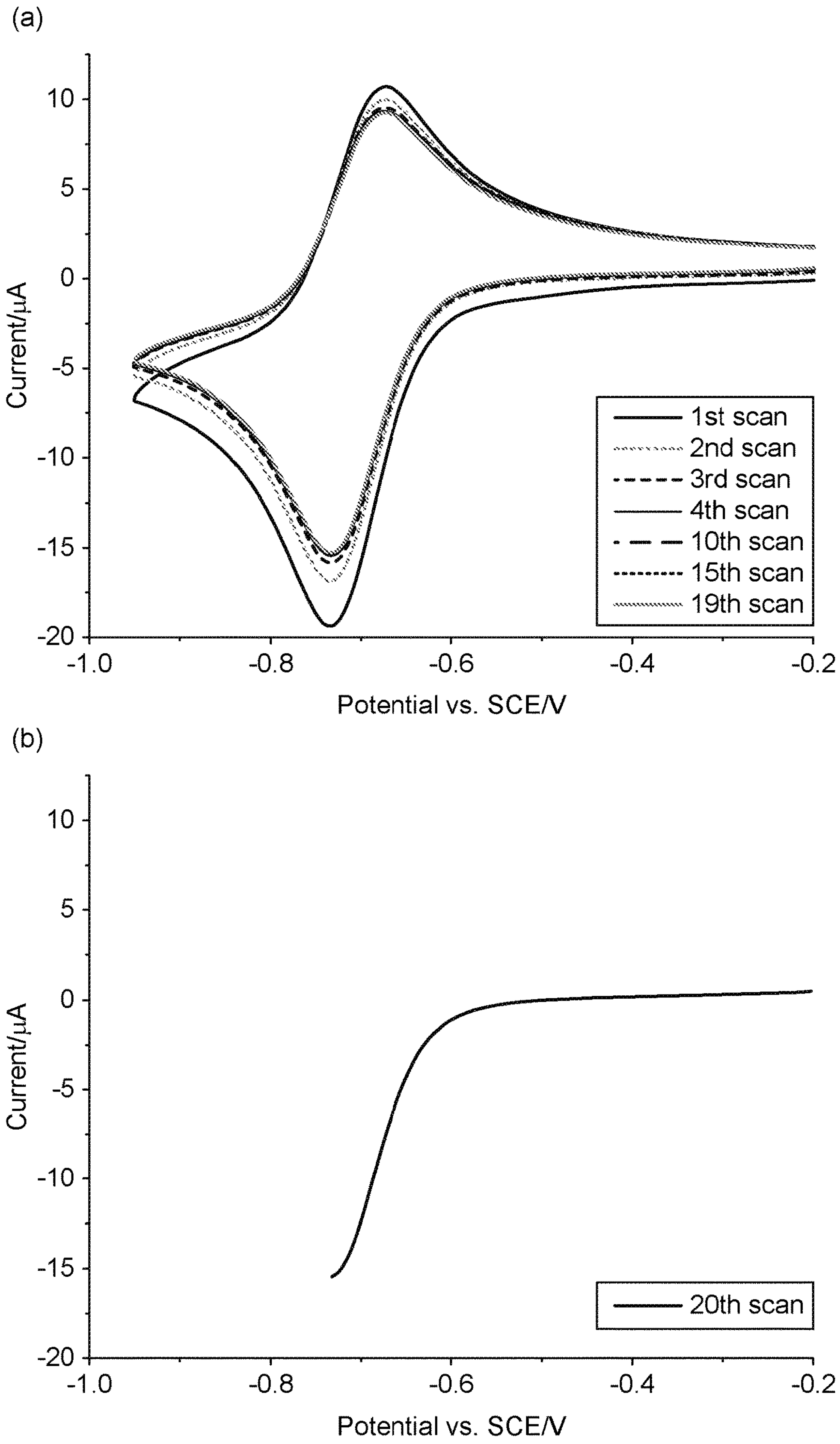
FIG. 2 shows Voltammograms of a $MV^{2+}$-Nafion film (with the doping ratio of $MV^{2+}$:$SO_3^-$=1:30 and thickness of 35 μm) dropcasted glassy carbon electrode in pH 7.4 PBS buffer at a scan rate of 0.1 V $s^{-1}$ for 20 successive scans. (a) $1^{st}$ scan to $19^{th}$ scan (b) the $20^{th}$ scan

The $MV^{2+}$/Nafion stock samples (with the doping ratio of $MV^{2+}:SO_3^{-}$=1:30) were prepared by directly dissolving 0.5 mg of $MVCl_2$ into 1.40 mL Nafion perfluorinated resin solution. The mixture was shaken on a vortex (Whirlmixer, Loughborough, UK) for 5 min. $MV^{2+}$/Nafion films with film thickness of 35 μm were obtained by drop-casting 10 μL of $MV^{2+}$-Nafion solution on a bare glassy carbon (GC) macroelectrode and dried in a nitrogen environment at room temperature. Prior to use, the GC surface was cleaned by successively polishing with three grades of alumina (1.0, 0.3 and 0.05 μm, Buehler, UK) in a decreasing particle size order followed by sonication in water and drying with nitrogen. The $MV^{2+}/MV^{+}$ Nafion film reference electrode was then obtained electrochemically by sweeping the potential first cathodically from −0.20 V to −0.95 V vs. SCE then reversing back to −0.20 Vat 0.1 V/s for 20 repetitive scans in degassed pH 7.4 PBS buffer and in the final scan, the potential stopping at −0.73 V, as shown in FIG. 2. At this point, the $MV^{2+}$ was partially reduced and a Nafion film of $MV^{2+}/MV^{+}Cl_2$ was produced. The relative amount of $MV^{+}$ and $MV^{2+}$ in Nafion films after fabrication is estimated to be 1:133, as shown in Section 1.6 below Note that for the doping ratio of $MV^{2+}:SO_3^{-}$=1:4, 1:50, 1:100 and 1:200, 0.5 mg of $MVCl_2$ were directly dissolved into 0.19 mL, 2.32 mL, 4.64 mL, 9.29 mL of Nafion perfluorinated resin solution respectively.

Nafion films with film thicknesses of 0.35 μm, 1.75 μm, 7.0 μm and 17.5 μm were obtained by dropcasting 0.1 μL, 0.5 μL, 2 μL and 5 μL of $MV^{2+}$-Nafion solution on the GC electrode, respectively.

Figure 3:
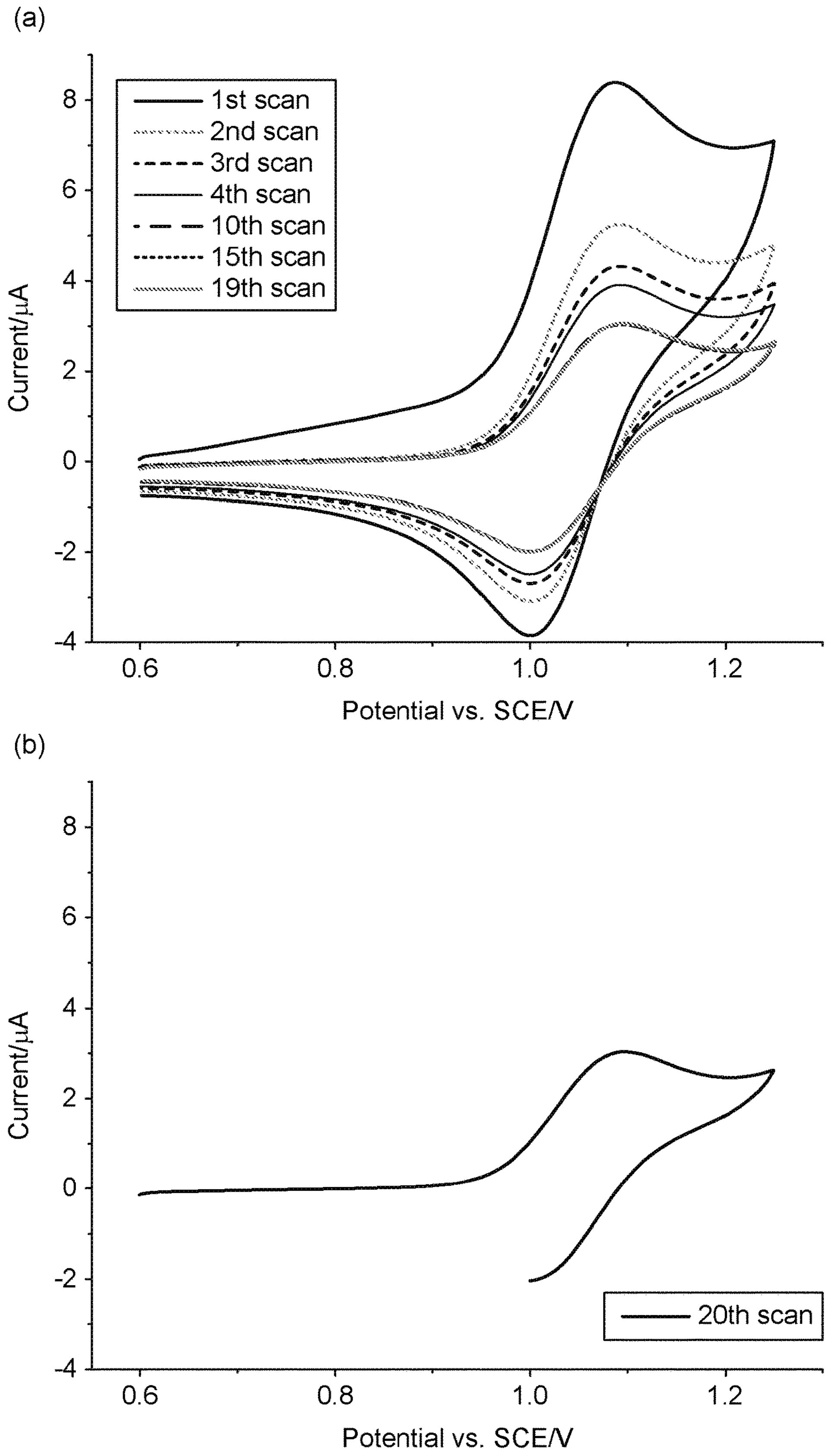
FIG. 3 shows voltammograms of a $Ru(bpy)_3^{2+}$-Nafion film (with the doping ratio of $Ru(bpy)_3^{2+}$:$SO_3^-$=1:30 and thickness of 35 μm) dropcasted glassy carbon electrode in pH 7.4 PBS buffer at a scan rate of 0.1 V $s^{-1}$ for 20 successive scans. (a) $1^{st}$ scan to $19^{th}$ scan (b) the $20^{th}$ scan.
Figure 4:
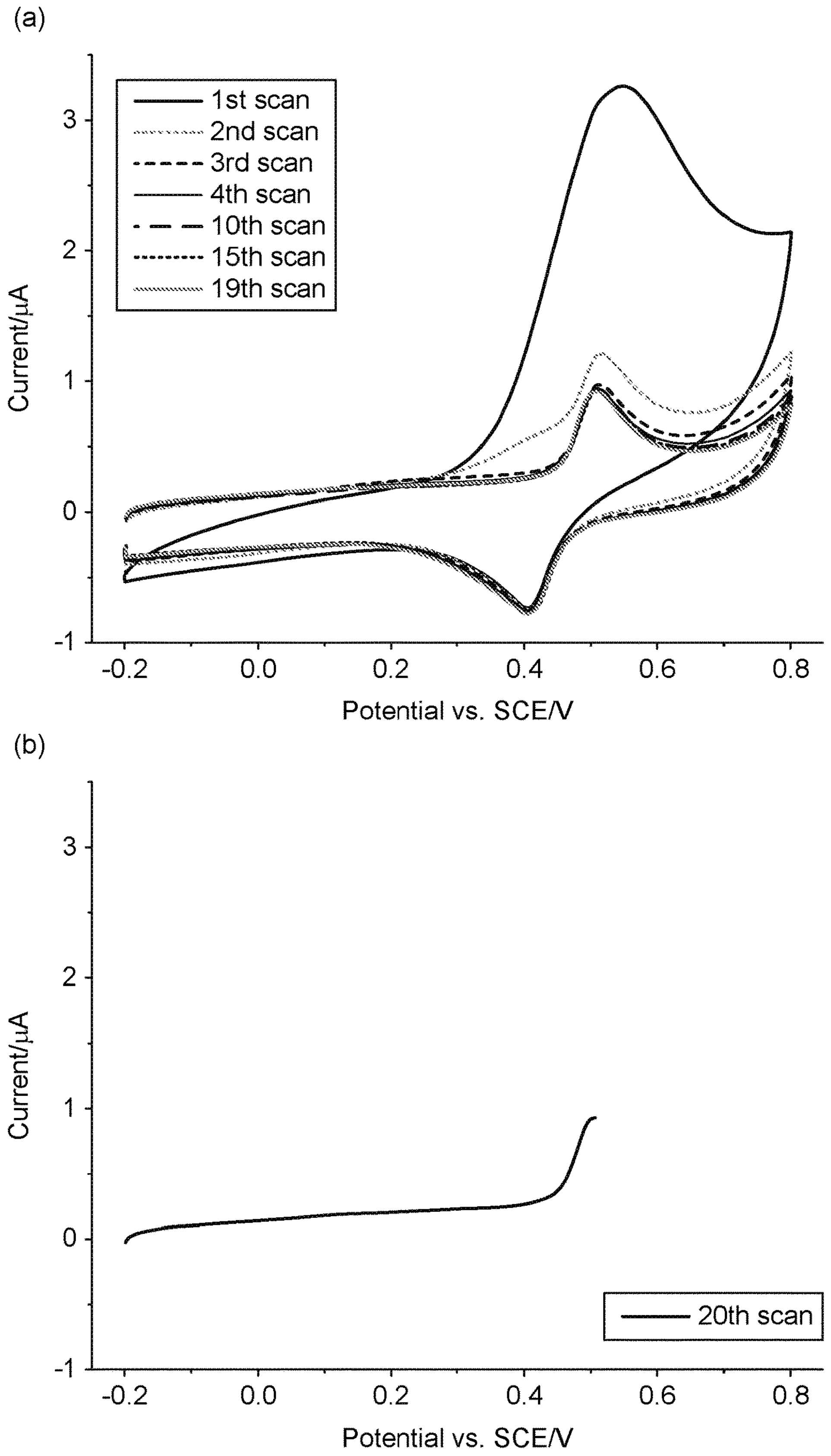
FIG. 4 shows voltammograms of a PVFc-Nafion film (with the doping ratio of PVFc:$SO_3^-$=1:30 and thickness of 35 μm) dropcasted glassy carbon electrode in pH 7.4 PBS buffer at a scan rate of 0.1 V $s^{-1}$ for 20 successive scans. (a) $1^{st}$ scan to $19^{th}$ scan (b) the $20^{th}$ scan

1.3—Fabrication of the $Ru(Bpy)_3^{2+}/Ru(Bpy)_3^{3+}$ Nafion Film Reference Electrodes The $Ru(bpy)_3^{2+}$/Nafion stock samples (with the doping ratio of $Ru(bpy)_3^{2+}:SO_3^{-}$=1:30) were prepared by directly dissolving 1.4 mg of $Ru(bpy)_3Cl_2.6H_2O$ into 1.34 mL Nafion perfluorinated resin solution. The mixture was then shaken on a vortex for 5 min. $Ru(bpy)_3^{2+}$/Nafion films with film thickness of 35 μm were obtained by drop-casting 10 μL of $Ru(bpy)_3^{2+}$/Nafion solution on a bare GC macroelectrode and dried in a nitrogen environment at room temperature. The $Ru(bpy)_3^{2+}/Ru(bpy)_3^{3+}$ Nafion film reference electrode was then obtained electrochemically by sweeping the potential first anodically from 0.60 V to 1.25 V vs. SCE then reversing back to 0.60 V at 0.1 V/s for 20 repetitive scans in degassed pH 7.4 PBS buffer and in the final scan, the potential stopping at 1.0 V, as shown in FIG. 3. At this point, the $Ru(bpy)_3^{2+}$ was partially oxidised and a Nafion film of $Ru(bpy)_3^{2+}/Ru(bpy)_3^{3+}Cl_2$ was produced. The relative amount of $Ru(bpy)_3^{3+}$ and $Ru(bpy)_3^{2+}$ in Nafion films after fabrication is estimated to be 1:174, as shown in Section 1.6 below 1.4—Fabrication of the $PVFc/PVFc^{+}$ Nafion Film Reference Electrodes The PVFc/Nafion stock samples (with the doping ratio of $VFc:SO_3^{-}$=1:30) were prepared by directly dissolving 0.8 mg of PVFc into 2.70 mL Nafion perfluorinated resin solution. The mixture was then shaken on a vortex for 5 min. PVFc/Nafion films with film thickness of 35 μm were obtained by drop-casting 10 μL of PVFc/Nafion solution on a bare GC macroelectrode and dried in a nitrogen environment at room temperature. The PVFc/PVFc$^+$ Nafion film reference electrode was then obtained electrochemically by sweeping the potential first anodically from −0.20 V to 0.80 V vs. SCE then reversing back to −0.20 V at 0.1 V/s for 20 repetitive scans in degassed pH 7.4 PBS buffer and in the final scan, the potential stopping at 0.51 V, as shown in FIG. 4. At this point, the PVFc was partially oxidised and a Nafion film of PVFc/PVFc$^+$ was produced. The relative amount of PVFc$^+$ and PVFc in Nafion films after fabrication is estimated to be 1:903, as shown in Section 1.6 below.

1.5—Estimation of the Nafion Film Thickness

The film dry thickness can be estimated as followed:

10 μL of doped Nafion stock mixture is drop-cast on the GC electrode

Mass of 10 μL Nafion is $$m=V\cdot\rho\cdot wt\ \%=10\ \mu L\times 0.921\ g/cm^3\times 5\%=4.61\times 10^{-4}\ g$$

where ρ is the density of Nafion perfluorinated resin solution, whose value obtained from the supplier Sigma-Aldrich.

The density of dry Nafion is relevant to its storage and drying conditions and in this case the dry density of Nafion, $\rho_{DryNafion}$, is 1.965 g $cm^{-3}$.[3]

Therefore the dry volume of Nafion is $$V=\frac{m}{\rho_{DryNafion}}=2.48\times 10^{-10}\ m^3$$

The diameter of GC electrode is 3 mm, hence the area is $A=D^2/4=7.07\times 10^{-6}\ m^2$ The dry thickness for 10 μL of MV-Nafion thin film on the GC electrode is $$h=\frac{V}{A}=\frac{2.48\times 10^{-10}\ m^3}{7.07\times 10^{-6}\ m^2}=35.1\ \mu m$$

Similarly, the thickness for 0.1 μL, 0.5 μL, 2 μL, 5 μL and 15 μL of Nafion film on the GC can be determined as 0.35 μm, 1.75 μm, 7.01 μm, 17.5 μm and 52.6 μm respectively.

1.6—Estimation of the Relative Amount of Dopant Redox Species in Nafion Film Reference Electrodes The relative amount of Fc and Fc$^+$ in Nafion films under optimized conditions (the doping ratio of $Fc^+:SO_3=1:30$ and thickness of 35 μm) can be estimated as followed:

Mass of 10 μL Nafion film (thickness of 35 μm) is $$m=V\cdot\rho\cdot wt\ \%=10\ \mu L\times 0.921\ g/cm^{-3}\times 5\%=4.61\times 10^{-4}\ g$$

where ρ is the density of Nafion perfluorinated resin solution, whose value obtained from the supplier Sigma-Aldrich.

Equivalent weight (EW) of Nafion is defined as the number of grams of dry Nafion per mole of sulfonic acid groups when the material is in the acid form (Mauritz et al, Chemical Reviews 2004, 201, 4535-4586). The Nafion used in the examples is 1100 EW.

The amount of $SO_3^-$ can be then estimated as $$n_{SO_3^-}=\frac{4.61\times 10^{-4}\ g}{1100\ g/mol}=4.19\times 10^{-7}\ mol$$

The doping ratio of $Fc^+:SO_3^-$ is 1:30 hence the total amount of $Fc^+$ in the film is $$n_{Fc^+}=\frac{4.19\times 10^{-7}\ mol}{30}=1.40\times 10^{8}\ mol$$

The Fc was electro-generated via partial reduction of $Fc^+$ as shown in FIG. 1 and the charge of this partial reduction can be estimated, with the aid of the software Origin, from FIG. 1*b* to be $2.46\times 10^{-6}$ C.

Hence the number and mole of Fc generated within the film is $$N_{Fc}=\frac{2.46\times 10^{-6}C}{1.60\times 10^{-19}C}=1.53\times 10^{13};\ n_{Fc}=2.54\times 10^{-11}\ mol$$

The relative amount of Fc and $Fc^+$ in Nafion films is $$\frac{n_{Fc}}{n_{Fc^+}}=\frac{2.54\times 10^{-11}\ mol}{1.40\times 10^{-8}\ mol-2.54\times 10^{-11}\ mol}=\frac{1}{548}$$

Similarly, the relative amount of dopant redox species in Nafion film of other three reference electrodes under optimized conditions are estimated to be:

For the $MV^{2+}/MV^+$ Nafion film reference electrodes, $MV^+:MV^{2+}=1:133$

For the $Ru(bpy)_3^{2+}/Ru(bpy)_3^{3+}$ Nafion film electrodes, $Ru(bpy)_3^{3+}:Ru(bpy)_3^{2+}=1:174$ For the PVFc/PVFc$^+$ Nafion film reference electrodes: PVFc$^+$:PVFc=1:903

2—CHARACTERIZATION AND STABILITY STUDY OF NAFION FILM REFERENCE ELECTRODES

The stability of the Nafion film references electrodes was assessed voltammetrically in aqueous solutions with $[Ru(NH_3)_6]Cl_3$ as an redox indicator using cyclic voltammetry. $[Ru(NH_3)_6]^{3+}/[Ru(NH_3)_6]^{2+}$ was chosen as the redox couple because the reduction of $Ru(NH_3)_6^{3+}$ is fully reversible and well-characterized (Wang, Y.; Limon-Petersen, J. G.; Compton, R. G. *Journal of Electroanalytical Chemistry* 2011, 652, 13-17, which is incorporated herein by reference) Cyclic voltammetry of 1.0 mM $[Ru(NH_3)_6]Cl_3$ in the presence of 0.1 M KCl supporting electrolyte was performed at a GC macroelectrode as sensing/working electrode with the fabricated reference electrode and a graphite counter electrode at 0.1 V $s^{-1}$ and the peak potentials of the voltammograms were monitored to give an indication of any drift or instability of the reference electrodes.

2.1 Introduction and Electrode Performance Optimisation

Three main parameters of the films, namely doping ratio, film thickness and morphology were investigated to optimise the performance and stability for all four Nafion film reference electrodes. In particular, the stability and robustness of the Fc/Fc$^+$ Nafion film reference electrodes fabricated under optimized conditions are shown to be optimal amongst the different systems investigated.

Studies on a series of redox couples doped in Nafion film reference electrodes are reported below. In particular, we first studied the electrochemistry of $MV^{2+}/MV^+$ and $Ru(bpy)_3^{2+}/Ru(bpy)_3^{3+}$ doped in Nafion, since both cations of the couples are reported to have strong affinity with $SO_3^-$ group of Nafion. (Yang, H.; Li, X.; Batchelor-McAuley, C.; Sokolov, S. V.; Kätelhön, E.; Compton, R. G. 2017, 23, 17605-1761 and Chen, L.; Lin, C.; Compton, R. G. *Physical Chemistry Chemical Physics* 2018, 20, 15795-15806, both of which are incorporated heron by reference). The ion transport behaviour in Nafion film was then investigated experimentally and theoretically, (Chen, L.; Lin, C.; Compton, R. G. *Physical Chemistry Chemical Physics* 2019, 21, 607-616, which is incorporated herein by reference) and both cations were proved to fully be confined within both thin and thick Nafion films. Consequently at least in principle they can be applied as reference electrodes showing a good stability. The fabrication procedure of $MV^{2+}/MV^+$ and $Ru(bpy)_3^{2+}/Ru(bpy)_3^{3+}$ Nafion film reference electrodes was similar to that of $Fc/Fc^+$ In the following experiments, the reversible one-electron transfer redox couple of $[Ru(NH_3)_6]^{3+}/[Ru(NH_3)_6]^{2+}$ is used to determine the potential of Nafion film reference electrodes and their stability. In essence a cyclic voltammogram of $[Ru(NH_3)_6]^{3+}$ in fully supported aqueous media at a carbon sensing/working electrode is recorded using the candidate Nafion-film reference electrodes as the reference electrode in a conventional three-electrode voltammetric measurement. Any change in the potential of the Ru(III)/Ru(II) couple is used to infer changes of potential in the reference electrode. Two important parameters of the film, namely doping ratio (initial doped species:$SO_3^-$) and thickness of the film, were initially investigated to optimise the performance and stability of the reference electrodes.

2.1.1 Effect of Doping Ratio

Figure 5:
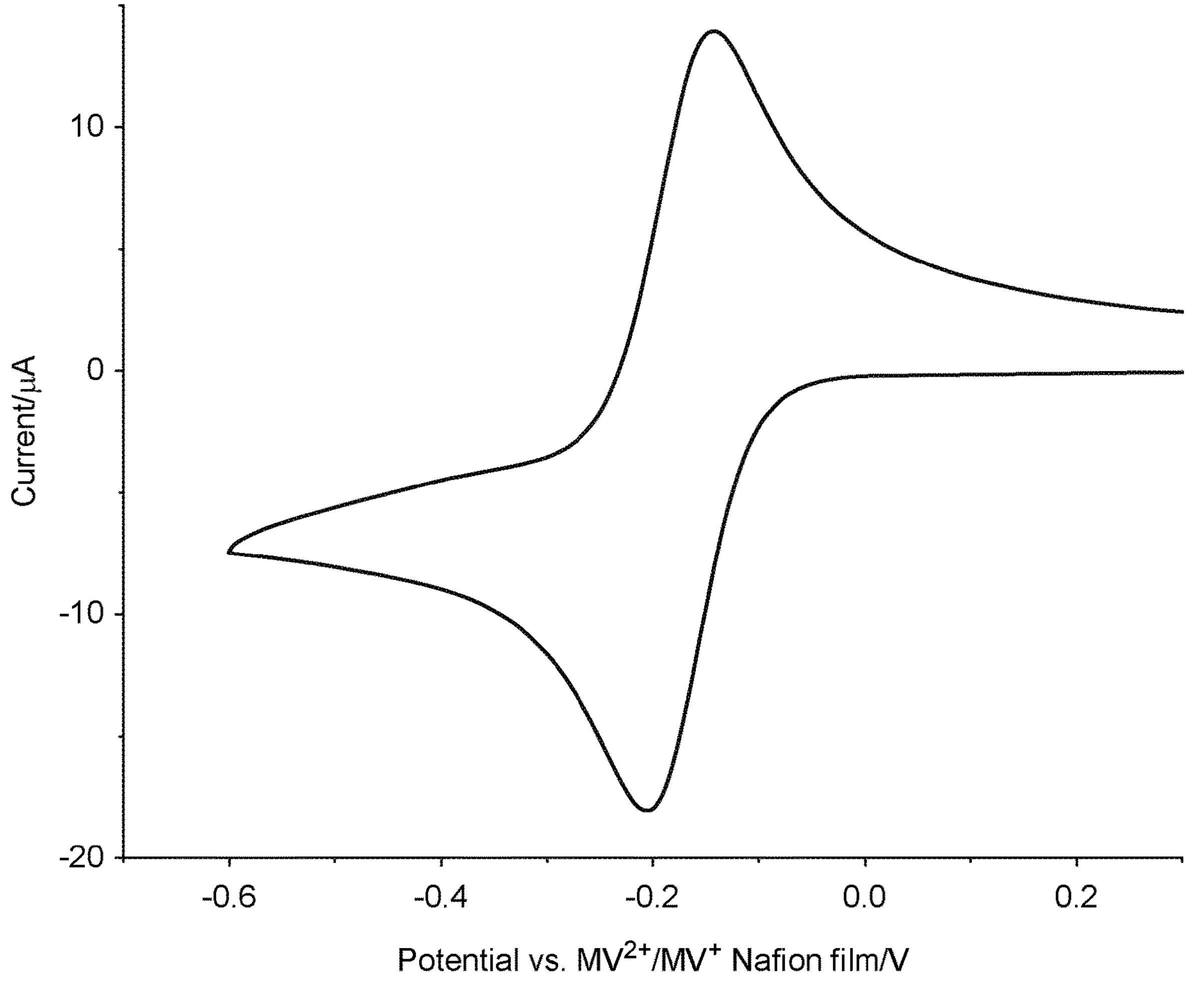
FIG. 5 shows voltammograms of a glassy carbon sensing/working electrode with a freshly prepared $MV^{2+}$/$MV^+$ Nafion film reference electrode in 0.1 M KCl aqueous solution containing 1 mM $[Ru(NH_3)_6]Cl_3$ at a scan rate of 0.1 V $s^{-1}$.
Figure 6:
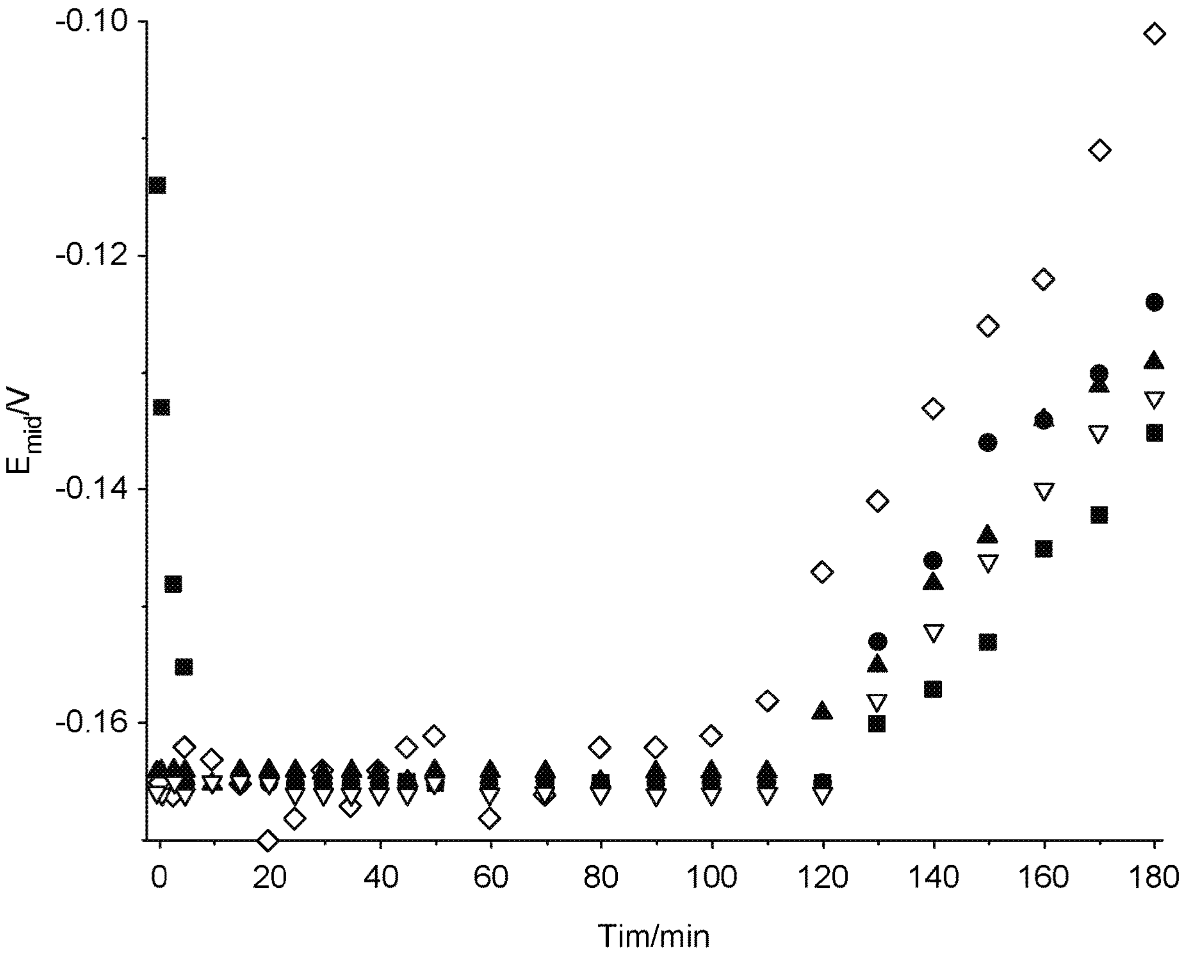
FIG. 6 shows the midpoint potential, $E_{mid}$, of $[Ru(NH_3)_6]^{3+}$ reduction vs. $MV^{2+}$/$MV^+$ Nafion film (with the film thickness of 0.35 μm) reference electrodes with different doping ratios recorded over three hours (doping ratio=1:4, square data points; doping ratio=1:30, circle data points; doping ratio=1:50, ▼ data points; doping ratio=1:100, ▲ data points; doping ratio=1:200, diamond data points).

Five $MV^{2+}/MV^+$ Nafion films with same thickness (0.35 μm) but different initial doping ratios (the ratio of $MV^{2+}$:$SO_3^-$) were fabricated. Note that the relative amount of $MV^+$ and $MV^{2+}$ within Nafion film after fabrication is estimated as 1:133 (See Section 1.6 for details). FIG. 5 shows a typical cyclic voltammogram (CV) of hexaammineruthenium(III) chloride recorded on a GC electrode with a freshly fabricated $MV^{2+}/MV^+$ Nafion film reference electrode (with the initial doping ratio of $MV^{2+}$:$SO_3^-$=1:30) and graphite counter electrode in a solution containing 1 mM $[Ru(NH_3)_6]Cl_3$ supported with 0.1M KCl. The midpoint potential ($E_{mid}$; taken as the average of the cathodic and anodic peak potentials) of the mediator was −0.165 V vs. $MV^{2+}/MV^+$ Nafion film. The CVs of $[Ru(NH_3)_6]^{3+}$ were recorded over three hours after the electrode was immersed in the solution, and the $E_n$d was determined and plotted as a function of time, as shown in FIG. 6. At a very high initial doping ratio ($MV^{2+}$:$SO_3^-$=1:4), the potential of the $MV^{2+}/MV^+$ Nafion films drifts in the first 10 min before it stabilizes. Without wishing to be bound by theory, this may reflect the depletion of doped redox species in the film when the doping ratio is too high and when the level of $SO_3^-$ in Nafion is insufficient to retain the excess dopant chemicals. Instead, for doping ratios ranging from 1:30 to 1:100, a very stable potential with no deviation of the thin Nafion film electrodes over two hours was obtained. For the films with a doping ratio of 1:200, a fluctuating $E_{mid}$ potential (±4 mv) was observed. This is thought to result from an inhomogeneous distribution of the redox species, $MV^{2+}$ and $MV^+$, within the Nafion film at extreme low doping ratios. As a result of these studies, a doping ratio (initial doped species:$SO_3^-$) of 1:30 was chosen for the subsequent study.

2.1.2 Effect of Film Thickness

Of note, it was observed that for all five different Nafion films reference electrodes of thickness 0.35 μm, the potential started to drift after ca. 120 min in the solution. This suggests that the Nafion films at this thickness (0.35 μm) have ca. two hour lifetime in aqueous solution before degradation. As a result, Nafion film reference electrodes with different thicknesses were investigated to determine which reference electrodes have longer lifetime and better stability.

Figure 7:
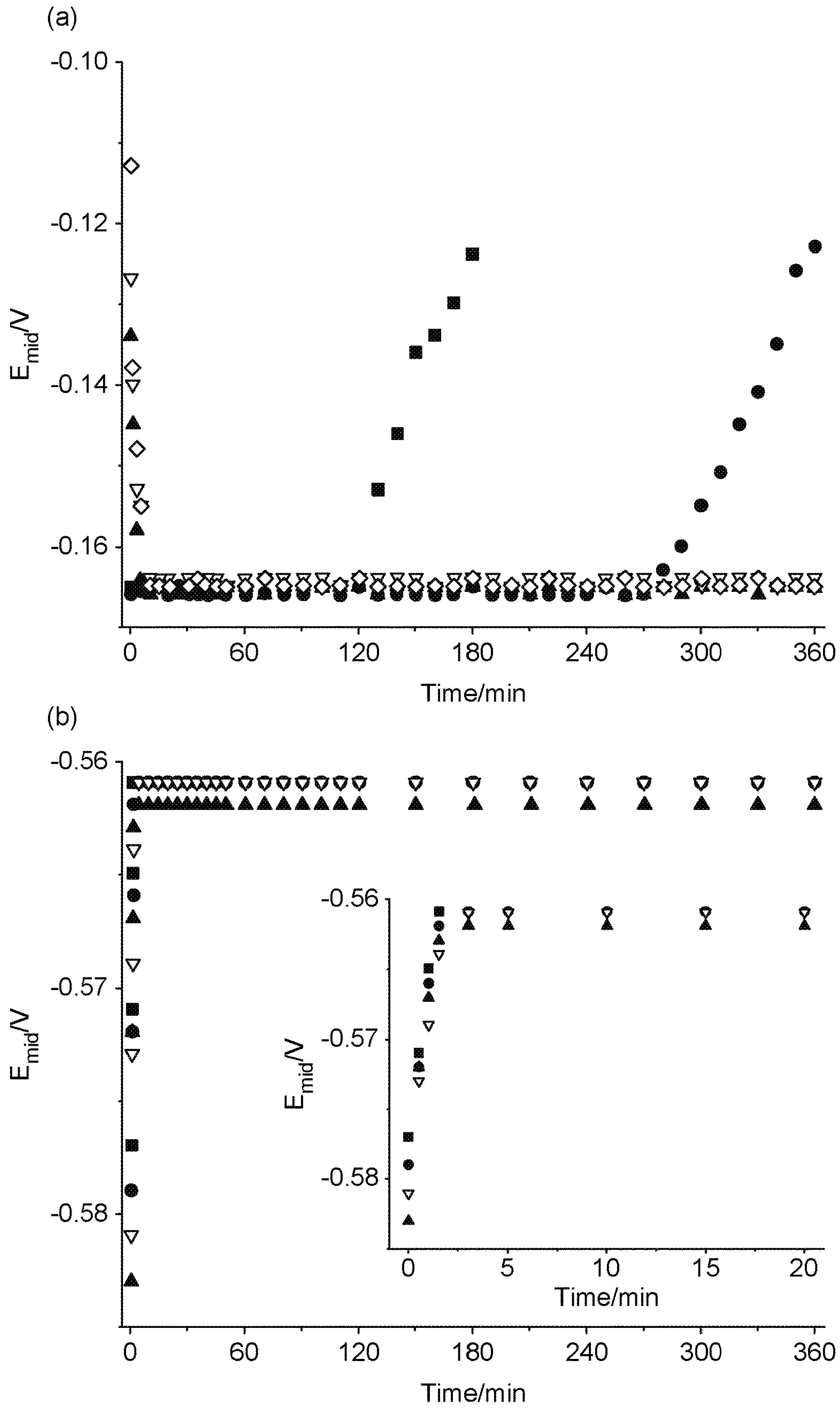
FIG. 7 shows (a) the midpoint potential, $E_{mid}$, of $[Ru(NH_3)_6]^{3+}$ reduction vs. $MV^{2+}$/$MV^+$ Nafion film (with a doping ratio of 1:30) reference electrodes with different film thickness recorded over six hours (0.35 μm film thickness, square data points; 1.75 μm film thickness, circle data points; 7.0 μm film thickness, ▼ data points; 17.5 μm film thickness, ▲ data points; 35 μm film thickness, diamond data points). (b) $E_{mid}$ of $[Ru(NH_3)_6]^{3+}$ reduction vs. $Ru(bpy)_3^{2+}$/$Ru(bpy)_3^{3+}$ Nafion film (with a doping ratio of 1:30) reference electrodes with different film thickness recorded over six hours (7.0 μm film thickness, square data points; 17.5 μm film thickness, circle data points; 35 μm film thickness, ▼ data points; 52.6 μm film thickness, ▲ data points). Inset is the zoom-in of the first 20 min.

In a similar way to the above, we investigated the stability of Nafion film reference electrodes with different film thicknesses by examining via CV the potential for the $[Ru(NH_3)_6]^{3+}$ reduction in aqueous solution. As depicted in FIG. 7*a*, the $E_{mid}$ potential of the Ru(III)/Ru(II) couple using five $MV^{2+}/MV^+$ Nafion film reference electrodes at a same initial doping ratio ($MV^{2+}$:$SO_3^-$=1:30) but with different film thickness was recorded over 6 hours. The $E_{mid}$ potential of the redox couple measured with films with 0.35 μm and 1.75 μm thickness was stable for 2 hours and 4.5 hours respectively before it started to drift. In contrast, the potential of the three thicker films (7 μm, 17.5 μm, 35 μm) did not drift at all within 6 hours. Notably, this suggests an enhanced stability of the Nafion film reference electrodes in aqueous solution with a thicker film thickness. Without wishing to be bound by theory, it is thought that the drift in potential of the Nafion films with film thickness of 0.35 μm and 1.75 μm after 2 to 5 hours was most likely due to a relatively fast chemical or mechanical degradation or aging of the very thin Nafion films. (Borup, R et al. *Chemical Reviews* 2007, 107, 3904-3951 and Rodgers, M et al *Chemical Reviews* 2012, 112, 6075-6103, which are both incorporated herein by reference).

In contrast, the three thicker films have little potential drift (±0.5 my) in the whole 6-hour measurements and good stability.

Four $Ru(bpy)_3^{2+}/Ru(bpy)_3^{3+}$ Nafion film reference electrodes with a doping ratio of 1:30 and a thick film thickness (from 7.0 to 52.6 μm) were fabricated and examined. The relative amount of $Ru(bpy)_3^{2+}$ and $Ru(bpy)_3^{3+}$ in Nafion films was estimated to be 1:174 (see Section 1.6 above). As shown in FIG. 7*b*, all four Nafion film electrodes exhibited good stability over six hours This indicates that Nafion films thicker than 7 μm have at least 6 hours lifetime and good stability in aqueous solution.

Figure 8:
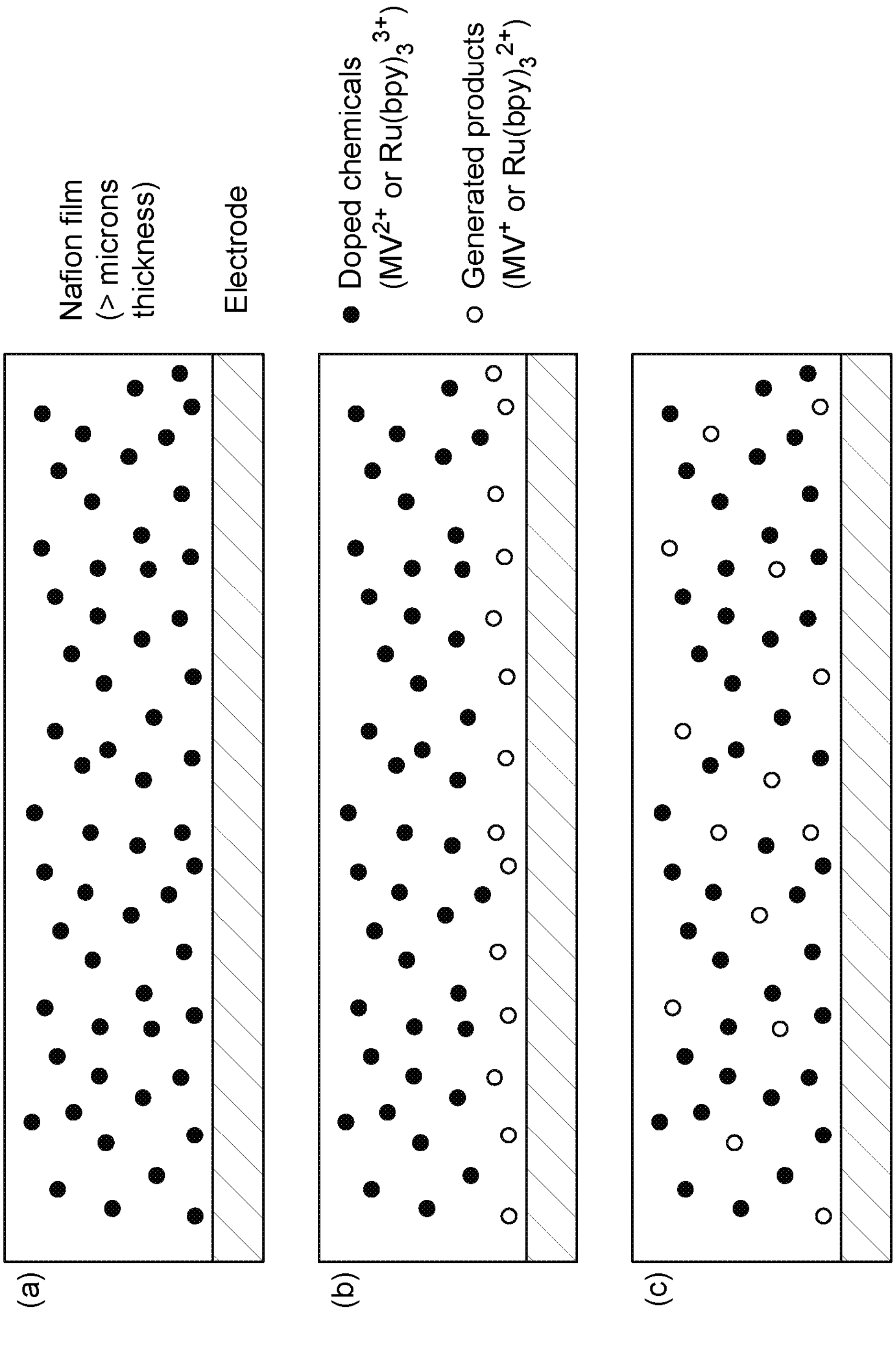
FIG. 8 shows the illustration of initial potential drift of the Nafion films (a) fresh prepared Nafion films via dropcasting: the doped chemicals ($MV^{2+}$ or $Ru(bpy)_3^{2+}$) are homogeneous within the film. (b) the films during electrochemically fabrication: generated products ($MV^+$ or $Ru(bpy)_3^{3+}$) are formed in the film near the electrode surface side leading concentration and charge gradients within the film consequently causing the initial potential drift. (c) after a few minutes the redox couples are homogeneous within the films via diffusion and the potential of the films are stabilized.

It was also found that there was an initial potential drift within the first few minutes after fabrication for three thicker $MV^{2+}/MV^+$ Nafion films (7.0 to 35 μm) and four $Ru(bpy)_3^{2+}/Ru(bpy)_3^{3+}$ Nafion film (7.0 to 52.6 μm) reference electrodes, before the potential was stable for at least the next 6 hours. A larger initial potential drift and a longer drift time was also observed for the thickest film (ca. 52 mV initial potential drift within 5 min for 35 μm $MV^{2+}/MV^+$ film whilst 31 mV drift within 1.5 min for 7 μm film in FIG. 7*a*). As discussed in the previous section, both cations are fully confined inside Nafion at this doping ratio, hence this potential drift does not result from depletion of doped redox species. Without wishing to be bound by theory, it was therefore inferred that this initial potential deviation was most likely due to the redistribution of the redox couples via diffusion within the Nafion films during/after the fabrication process. This may be driven by concentration gradients or/and charge gradients within the thicker Nafion films (several microns or above) since $MV^+$ or $Ru(bpy)_3^{2+}$ is only generated in the film near the electrode surface (i.e. during the electrochemical oxidation/reduction of the film in its preparation). This leads to the concentration and charge gradients across the films and consequently the diffusion of both redox species inside the films, as illustrated in FIG. 8. This was also consistent with the fact that a thicker film requires a longer initial potential drift time to obtain a homogenous distribution within the film and hence a stable potential.

Figure 9:
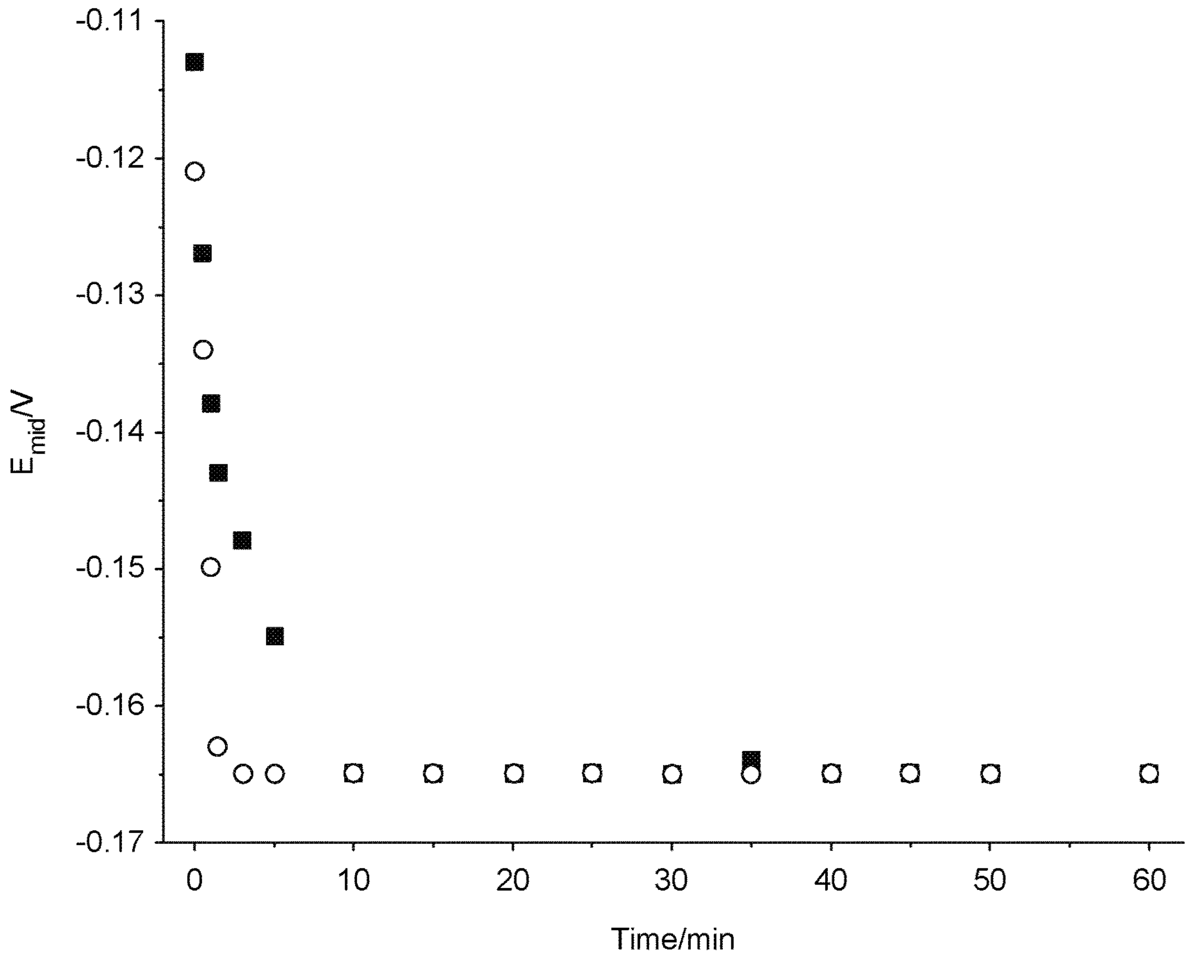
FIG. 9 shows the midpoint potential, $E_{mid}$, of $[Ru(NH_3)_6]^{3+}$ reduction vs. $MV^{2+}$/$MV^+$ Nafion (with a doping ratio of 1:30) reference electrodes. Square data points: Nafion film with film thickness of 35.1 μm; Circle data points: Nafion particles with 38.7 μm particle layers thickness.

Previously, the diffusional transport of $MV^{2+}$ and $MV^{+}$ in Nafion films and particles has been systematically investigated and compared and it was found that the transport in particles was significantly faster than in films of similar thickness. (Chen, L.; Lin, C.; Compton, R. G. *Physical Chemistry Chemical Physics* 2019, 21, 607-616, which is incorporated herein by reference) An experiment was therefore conducted using MV doped Nafion particles to fabricate $MV^{2+}/MV^{+}$ Nafion particle based reference electrodes. As depicted in FIG. 9, the initial potential stabilization of $MV^{2+}/MV^{+}$ Nafion particles reference electrode was completed much faster than that of Nafion films of similar thickness (ca. 45 mV drift within 1.5 min for 38.7 μm particle layers vs. 52 mV drift within 5 min for 35.1 μm film). This suggests faster diffusional transport of both cations inside the particles and consequently a short stabilization time for a homogeneous distribution in Nafion.

2.1.3 Effect of Film Morphology

Further experiments were designed to determine whether it is the generated product during fabrication or the initial doped reactant which predominantly causes this initial potential drift. It was speculated that the product more likely has a significant effect, as it is likely generated in the film near the electrode surface side and then diffuse cross over the whole film to reach homogeneous state whilst the doped reactant is more like 'bulk' species within the entire film. The diffusion coefficient of $MV^{2+}$ and $MV^{+}$ within a Nafion film of several micron thickness has been reported previously as $3\times10^{-9}$ $cm^2$ $s^{-1}$ and $3\times10^{-10}$ $cm^2$ $s^{-1}$ whilst the diffusion coefficient of $Ru(bpy)_3{}^{3+}$ and $Ru(bpy)_3{}^{2+}$ in Nafion film is $1.2\times10^{-9}$ $cm^2$ $s^{-1}$ and $2.7\times10^{-9}$ $cm^2$ $s^{-1}$ respectively (Chen, L.; Lin, C.; Compton, R. G. *Physical Chemistry Chemical Physics* 2019, 21, 607-616; Rubinstein, I.; Bard, A. J. *Journal of the American Chemical Society* 1980, 102, 6641-6642; and Rubinstein, I.; Bard, A. J. *Journal of the American Chemical Society* 1981, 103, 5007-5013, all of which are incorporated herein by reference). As shown above, the $Ru(bpy)_3{}^{2+}/Ru(bpy)_3{}^{3+}$ Nafion films exhibit a faster initial potential stabilization compared with $MV^{2+}/MV^{+}$ Nafion films at a same doping ratio and film thickness in FIG. 7; suggesting the inhomogeneous distribution of generated product ($Ru(bpy)_3{}^{2+}$ and $MV^{+}$) during the fabrication for a thick film is predominant to cause observed initial potential drift, as $Ru(bpy)_3{}^{2+}$ diffuses faster than $MV^{+}$ in Nafion film whereas $Ru(bpy)_3{}^{3+}$ diffuses slower than $MV^{2+}$. This hypothesis was therefore further investigated.

In subsequent studies, a film thickness of 35 μm was chosen as films of this thickness demonstrated a good stability without significantly compromising their performance once the initial potential drift is stabilized within ca. 5 minutes. The influence of morphology of the film on this process was then investigated.

The morphology of a Nafion film itself is an extremely complicated topic as has been reviewed (see Gebel, G.; Diat, O. *Fuel Cells* 2005, 5, 261-276; Hickner, M. A.; Pivovar, B. S. *Fuel Cells* 2005, 5, 213-229; and Duncan, A. J.; Leo, D. J.; Long, T. E. *Macromolecules* 2008, 41, 7765-7775, all of which are incorporated herein by reference) It was therefore qualitatively investigated how morphology might affect the performance and stability of the film. The Nafion films prepared via dropcasting has been proved to be uniform and homogeneous and its estimated thickness is accurate, as verified by AFM microscopy (see Krtil, P.; Trojánek, A.; Samec, Z. *The Journal of Physical Chemistry B* 2001, 105, 7979-7983, which is incorporated herein by reference). In order to obtain a film with higher roughness but similar thickness, the same amount of Nafion stock mixture was dropcasted on electrode surface not once but casting five times the same overall amount of material. In this way, a film with an obvious surface roughness as judged microscopically was obtained.

Figure 10:
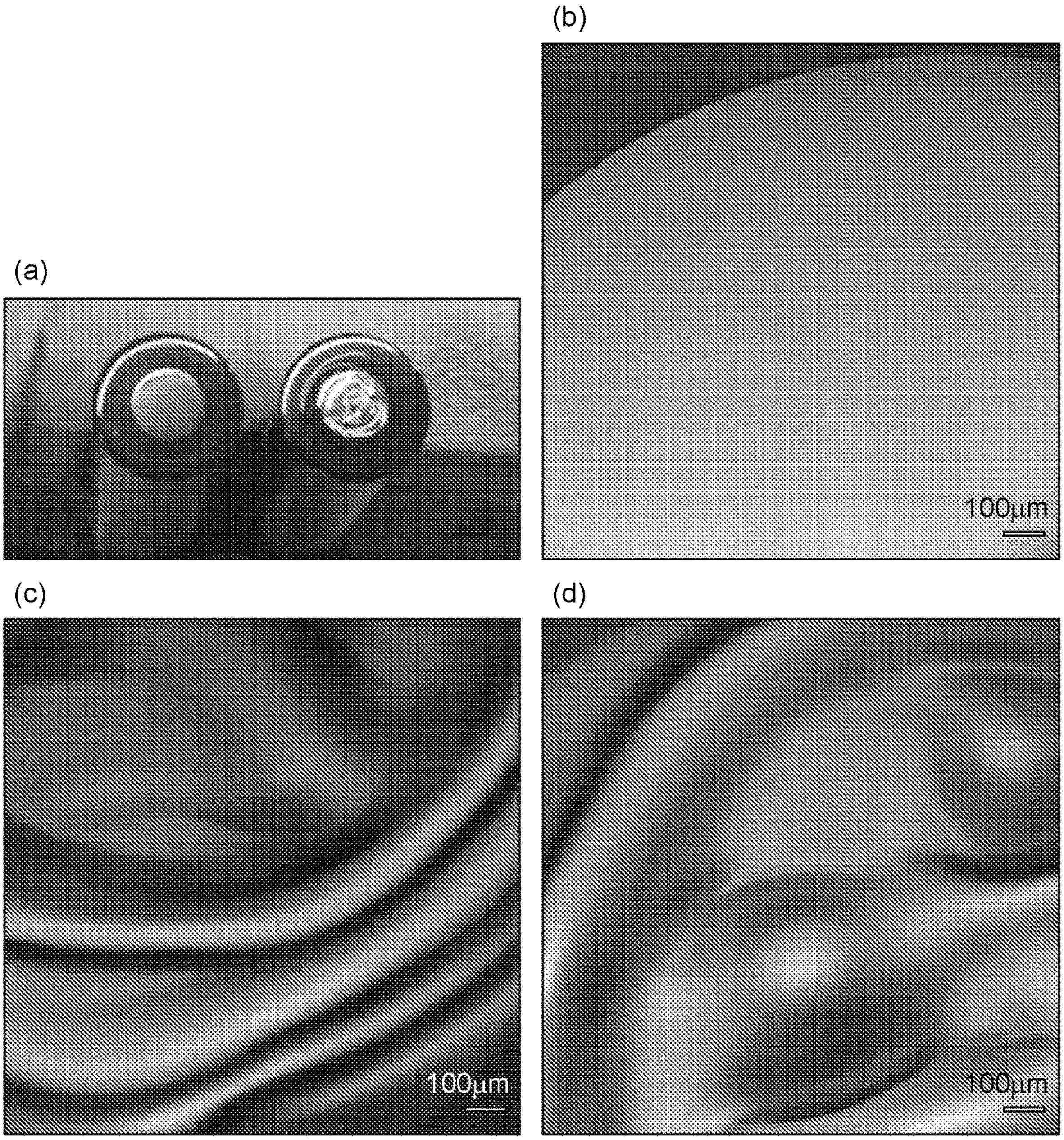
FIG. 10 shows (a) Photo of a uniform Nafion film prepared by dropcasting (left) and a film with an obvious surface roughness as judged visually (right); (b) Optical microscope images of a uniform Nafion film; (c) and (d) Optical microscope images of a film with an obvious surface roughness. The scale in bottom left corner of (b), (c) and (d) is 100 μm

FIG. 10 shows the morphology of uniform Nafion films and films with an obvious surface roughness. The uniform film was prepared via dropcasting and a very homogeneous and uniform film obtained both visually and microscopically in FIG. 10*b*. Literature also confirms via AFM that a film prepared in this way is highly uniform (Krtil, P.; Trojánek, A.; Samec, Z. *The Journal of Physical Chemistry B* 2001, 105, 7979-7983, which is incorporated herein by reference) The Nafion films with an obvious surface roughness were prepared by dropcasting same amount of Nafion stock mixture not once but five times (2 μL each time). A highly rough film surface at visual level was obtained. Microscope images show the big difference in morphology between the uniform and rough films).

Figure 11:
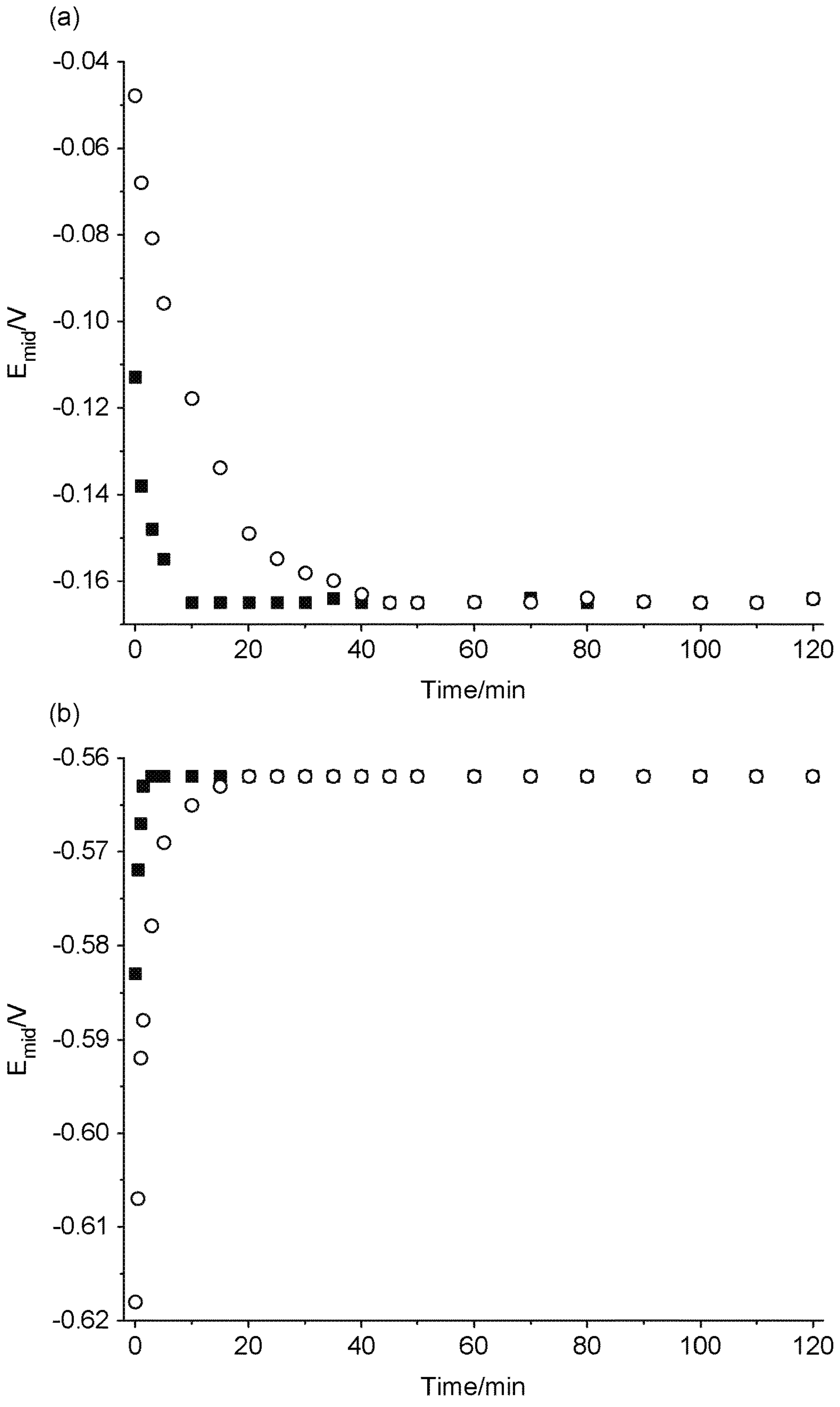
FIG. 11 shows. (a) The midpoint potential, $E_{mid}$, of $[Ru(NH_3)_6]^{3+}$ reduction vs. $MV^{2+}$/$MV^+$ Nafion film (with a doping ratio of 1:30 and film thickness of 35.1 μm) reference recorded over two hours (uniform film surface, square data points; rough film surface, circle data points). (b) $E_{mid}$ of $[Ru(NH_3)_6]^{3+}$ reduction vs. $Ru(bpy)_3^{2+}$/$Ru(bpy)_3^{3+}$ Nafion film (with a doping ratio of 1:30 and film thickness of 35.1

Both $MV^{2+}/MV^{+}$ and $Ru(bpy)_3{}^{2+}/Ru(bpy)_3{}^{3+}$ Nafion film reference electrodes with high film surface roughness were fabricated and examined. The $E_{mid}$ potential was recorded and compared with that of uniform films as shown in FIG. 11. A large initial potential deviation from the ultimate stable reading and a much longer stabilisation time for rough films were observed in both cases. This is consistent with the insight that the homogenization of generated $MV^{+}$ or $Ru(bpy)_3{}^{2+}$ within an nonuniform film is probably diffusionally more difficult and requires a longer time, and consequently a stable potential is achieved more slowly. The potentials of both uniform and rough films were then tested over three days after their stabilization with the same film electrode after washing with water and kept in air without any protection, as depicted in FIG. 12. There was no significant difference. These results suggest that the morphology of Nafion films has a significant effect on initial performance (an initial potential drift) of the reference electrode, but plays a negligible role in terms of stability.

It was next considered if the initial potential drift of fresh fabricated films could be mitigated or fully eliminated.

In the previous section, we inferred this drift was due to inhomogeneous distribution of generated product within the films during the fabrication process. To examine this hypothesis, two more types of Nafion film reference electrodes, $Fc/Fc^{+}$ and $PVFc/PVFc^{+}$, were fabricated and examined. These two couples were chosen as Fc and PVFc are insoluble in water. To prepare $Fc/Fc^{+}$ Nafion film reference electrodes (initial doping ratio of $Fc^{+}:SO_3=1:30$ and thickness of 35 μm), the soluble salt, $Fc^{+}PF_6{}^{-}$, was initially doped into Nafion and insoluble Fc was generated via partial electro-reduction of the film as described in Section 1.1. Notably, the $Fc/Fc^{+}$ Nafion film reference electrodes demonstrated a superior stability without any initial drift, as shown in FIG. 13 and discussed in detail in next section. Since the initial potential drift was successfully and fully eliminated, this indicates that the above hypothesis is correct, namely that an inhomogeneous distribution of the generated product within the film plays a predominant role to cause an initial potential drift. Importantly, these results demonstrate that this drift could be fully eliminated if the generated product is water-insoluble. The electrode demonstrated a good stability with the $E_{mid}$ potential stabilized at 235±0.5 mV over one hour. Another $Fc/Fc^{+}$ Nafion film reference electrode with a high surface roughness was also fabricated and examined. As shown in FIG. 14, there is no initial potential drift for a $Fc/Fc^+$ Nafion film reference electrode with a high surface roughness, which contrasts with the behaviour of $MV^{2+}/MV^+$ Nafion film and $Ru(bpy)_3^{2+}/Ru(bpy)_3^{3+}$ Nafion film reference electrodes as shown in FIG. 11. This further confirms the hypothesis that the inhomogeneous distribution of generated product within the film plays a predominant role to cause an initial potential drift. The electrode with a high film surface roughness demonstrates a good stability with the $E_{mid}$ potential stabilized at 234±0.5 mV over one hour.

$PVFc/PVFc^+$ Nafion film reference electrodes (initial doping ratio of VFc moiety:$SO_3^-$=1:30, thickness of 35 μm and the relative amount of $PVFc^+$ and PVFc in Nafion films is 1:903) were fabricated in a contrasting way to the $Fc/Fc^+$ Nafion film, where the insoluble PVFc was initially doped into Nafion and water-soluble $PVFc^+$ was electrochemically generated (see Section 1.4). The film reference electrodes were examined as a function of time, as depicted FIG. 15. These electrodes showed good stability but demonstrated an initial potential drift (ca. 15 mV) within the first 15 minutes. Without wishing to be bound by theory, it is thought that the initial potential drift of $PVFc/PVFc^+$ Nafion film reference electrode may reflect re-arrangement or homogenization of the freshly generated $PVFc^+$ within the film. This observation is consistent with that of $MV^{2+}/MV^+$ and $Ru(bpy)_3^{2+}/Ru(bpy)_3^{3+}$, confirming again this hypothesis.

3—STABILITY AND/OR REPRODUCIBILITY OF NAFION-FILM REFERENCE ELECTRODES

The stability and/or reproducibility of all four types of Nafion film reference electrode generated under optimized conditions (doping ratio of 1:30, film thickness of 35 μm and uniform film surface) were next examined.

3.1 Stability of the $Fc/Fc^+$ Nafion Film Reference Electrodes

The potential of optimized $Fc/Fc^+$ Nafion film reference electrodes and their stability were also assessed voltammetrically. FIG. 16 black line shows a CV of reduction of $[Ru(NH_3)_6]^{3+}$ against a freshly fabricated $Fc/Fc^+$ Nafion film reference electrode. The midpoint potential, $E_{mid}$, of the mediator was −0.235 V vs. $Fc/Fc^+$ Nafion film. The $E_{mid}$ of reduction of $[Ru(NH_3)_6]^{3+}$ vs. SCE is −0.176 V±0.001 V, as shown in FIG. 17. The potential of fabricated $Fc/Fc^+$ Nafion film reference electrode in aqueous solution was determined as −0.059 V vs. SCE or +0.182 V vs. normal hydrogen electrode (NHE), as illustrated in FIG. 18.

As demonstrated in FIG. 16*a* and Table 1, the CVs of $[Ru(NH_3)_6]^{3+}$ were recorded over a 24-h period after the electrodes had remained in the cell under the same conditions to check the stability of the $Fc/Fc^+$ Nafion film reference electrode. The peak potentials were very stable with no deviation for the first 6 hours after the $Fc/Fc^+$ Nafion film was immersed in the solution. The variation of $E_{mid}$ with experimental time was within an average deviation of 2 mV over 12 hours and less than 5 my after 24 hours in solution. Moreover, additional voltammograms were recorded every one or two days over a period of 10 days, with the same $Fc/Fc^+$ Nafion film electrode after washing with water and kept in air without any protection, as shown in FIG. 19. This shows again a good stability of the $Fc/Fc^+$ film with no significant drift of the $E_{mid}$ within 10 mV over 10 days and no deviation in the first 4 days. Moreover, there was no visible degradation of the film over 10 days. There results clearly demonstrate the high stability and strong robustness of $Fc/Fc^+$ Nafion film used as reference electrode in aqueous solution.

TABLE 1

Raw data for the inset of FIG. 16a—the midpoint potential, $E_{mid}$, of a freshly fabricated $Fc/Fc^+$ Nafion films over 24 h immersing in solution.

| Time/h | $E_{mid}$ potential/V |
|---|---|
| 0 | −0.233 |
| 1 | −0.233 |
| 2 | −0.233 |
| 4 | −0.233 |
| 6 | −0.233 |
| 8 | −0.234 |
| 10 | −0.234 |
| 12 | −0.235 |
| 16 | −0.236 |
| 20 | −0.237 |
| 24 | −0.238 |

To test the stability of the $Fc/Fc^+$ Nafion film after a series of measurements, the cyclic voltammetry was conducted over 1000 successive scans in the same conditions with a fresh fabricated $Fc/Fc^+$ Nafion film reference electrode. As shown in FIG. 16*b* and Table 2, there was no drift of the peak potential or $E_{mid}$ between the first and $600^{th}$ cycle and only 2 mV drift after 1000 cycles, demonstrating a superior stability of the $Fc/Fc^+$ Nafion films.

TABLE 2

Raw data for the inset of FIG. 16b—the midpoint potential, $E_{mid}$, of a freshly fabricated $Fc/Fc^+$ Nafion films over 1000 successive scans.

| No. of cycles | $E_{mid}$ potential/V |
|---|---|
| 1 | −0.233 |
| 100 | −0.233 |
| 200 | −0.233 |
| 300 | −0.233 |
| 400 | −0.233 |
| 500 | −0.233 |
| 600 | −0.233 |
| 700 | −0.234 |
| 800 | −0.234 |
| 900 | −0.235 |
| 1000 | −0.236 |

Both Tables 1 and 2 show a superior stability of the fabricated reference electrodes in aqueous solution and over a series of measurements.

3.2—Stability of $MV^{2+}/MV^+$ Nafion Film Electrodes

The potential of the optimized $MV^{2+}/MV^+$ Nafion film reference electrode and its stability were also assessed electrochemically. The midpoint potential, $E_{mid}$, of the mediator was −0.165 V vs. $MV^{2+}/MV^+$ Nafion film. The $E_{mid}$ of reduction of $[Ru(NH_3)_6]^{3+}$ vs. SCE is −0.176 V, as shown in FIG. 17. Therefore, the potential of fabricated $MV^{2+}/MV^+$ Nafion film reference electrode in aqueous solution was determined as +0.011 V vs. SCE or +0.252 V vs. HNE. FIG. 20 depicts a good stability of $MV^{2+}/MV^+$ Nafion film reference electrode at optimized conditions (doping ratio of 1:30, film thickness of 35 μm and uniform film surface). The varication of $E_{mid}$ with experimental time was within an average deviation of 4 mV over 12 hours and less than 9 my after 24 hours in solution. The $MV^{2+}/MV^+$ Nafion films also shows high stability over a series of measurements with only 1 mV drift after 600 successive cycles and 4 mV drift after 1000 successive cycles.

3.3—Stability of $Ru(Bpy)_3^{2+}/Ru(Bpy)_3^{3+}$ Nafion Film Electrodes

The potential of the optimized $Ru(bpy)_3^{2+}/Ru(bpy)_3^{3+}$ Nafion film reference electrode and its stability were also assessed electrochemically. The midpoint potential, $E_{mid}$, of the mediator was −0.561 V vs. $Ru(bpy)_3^{2+}/Ru(bpy)_3^{3+}$ Nafion film. The $E_{mid}$ of reduction of $[Ru(NH_3)_6]^{3+}$ vs. SCE is −0.176 V, as shown in FIG. 17. Therefore, the potential of fabricated $Ru(bpy)_3^{2+}/Ru(bpy)_3^{3+}$ Nafion film reference electrode in aqueous solution was determined as −0.385 V vs. SCE or −0.144 V vs. HNE. FIG. 21 depicts a good stability of the $Ru(bpy)_3^{2+}/Ru(bpy)_3^{3+}$ Nafion film reference electrode at optimized conditions (doping ratio of 1:30, film thickness of 35 μm and uniform film surface). The varication of $E_{mid}$ with experimental time was within an average deviation of 3 mV over 12 hours and less than 8 my after 24 hours in solution. The $Ru(bpy)_3^{2+}/Ru(bpy)_3^{3+}$ Nafion films also shows high stability over a series of measurements with only 1 mV drift after 600 successive cycles and 4 mV drift after 1000 successive cycles.

3.4—Stability of PVFc/PVFc+ Nafion Film Electrodes

The potential of optimized $PVFc/PVFc^+$ Nafion film reference electrode and its stability were also assessed electrochemically. The midpoint potential, $E_{mid}$, of the mediator was −0.233 V vs. $PVFc/PVFc^+$ Nafion film. The $E_{mid}$ of reduction of $[Ru(NH_3)_6]^{3+}$ vs. SCE is −0.176 V, as shown in FIG. 17. Therefore, the potential of fabricated $PVFc/PVFc^+$ Nafion film reference electrode in aqueous solution was determined as −0.057 V vs. SCE or +0.184 V vs. HNE. FIG. S22 depicts a good stability of $PVFc/PVFc^+$ Nafion film reference electrode at optimized conditions (doping ratio of 1:30, film thickness of 35 μm and uniform film surface). The varication of $E_{mid}$ with experimental time was within an average deviation of 2 mV over 12 hours and less than 5 my after 24 hours in solution. The $PVFc/PVFc^+$ Nafion films also shows high stability over a series of measurements with no drift after 600 successive cycles and only 3 mV drift after 1000 successive cycles.

3.5—Reproducibility of the $Fc/Fc^+$ Nafion Films

The above results reveal a highly stable $Fc/Fc^+$ Nafion film reference electrode. Next, we assessed the reproducibility of this film electrode. Three $Fc^+$/Nafion stock samples were prepared and used to dropcast on three different glassy carbon electrodes. Cyclic voltammetry of 1.0 mM $[Ru(NH_3)_6]^{3+}$ (in 0.1 M KCl) at the scan rate of 0.1 mV $s^{-1}$ was recorded to examined each film reference electrodes. The midpoint potential, $E_{mid}$, remained at −0.235±0.002 V vs. $Fc/Fc^+$ Nafion film in all cases, showing excellent reproducibility of the electrodes; see Table 3& 4 for raw data below.

TABLE 3

Summary of the midpoint potential, $E_{mid}$, of 3 freshly fabricated $Fc/Fc^+$ Nation films

| | $Fc^+$/Nafion 1 | $Fc^+$/Nafion 2 | $Fc^+$/Nafion 3 |
|---|---|---|---|
| GC substrate 1 | −0.235 V | −0.233 V | −0.236 V |
| GC substrate 2 | −0.236 V | −0.234 V | −0.235 V |
| GC substrate 3 | −0.235 V | −0.235 V | −0.237 V |

TABLE 4

$E_{mid}$ potential drift between 1st scan and the 1000th scan of the $Fc/Fc^+$ Nafion films listed in Table S1 after 1000 successive scans

| | $Fc^+$/Nafion 1 | $Fc^+$/Nafion 2 | $Fc^+$/Nafion 3 |
|---|---|---|---|
| GC substrate 1 | 2 mV | 4 mV | −1 mV |
| GC substrate 2 | 3 mV | −2 mV | 1 mV |
| GC substrate 3 | −1 mV | 2 mV | 3 mV |

Table 3 and 4 show the excellent reproducibility of the fabricated reference electrodes. In addition, all the Nafion film electrodes exhibit superior stability over a series of measurements (1000 successive scans).

4. CONCLUSIONS

Example Nafion films have been developed for use as reference electrodes in aqueous solutions. Four redox couples, namely $MV^{2+}/MV^+$, $Ru(bpy)_3^{2+}/Ru(bpy)_3^{3+}$, $Fc/Fc^+$ and $PVFc/PVFc^+$ Nafion film reference electrodes were fabricated and optimised, which exhibited good stability over 10 days. Notably, it was found that the $Fc/Fc^+$ Nafion films in particular demonstrated good performance. This was attributed in part to the strong binding of the cationic species Fe within the Nafion films and the water insolubility of Fc. Other fabricated Nafion films were also tested. $MV^{2+}/MV^+$, $Ru(bpy)_3^{2+}/Ru(bpy)_3^{3+}$ and $PVFc/PVFc^+$ Nafion films all demonstrated a small initial potential drift (<30 mV) after the first few minutes of fabrication, before the potential is fully stabilized. This drift likely results from the inhomogeneous distribution of generated product within the film during the fabrication process, however this drift can be fully eliminated by careful dopant couple selection. Comparing with conventional reference electrodes such as the Ag/AgCl electrode, or the saturated calomel electrode (SCE), the proposed Nafion film reference electrode has several advantages: i) first, the film electrode is a solid-state liquid-free reference electrode, and contamination of the test solution due to leaching is avoided; ii) second, the electrode is easy and simple to fabricate, and the film can be dropcasted on different substrates, such as cheap graphite rods, and; iii) third, the substrate can be very small and the electrode can be miniaturized. The example substrates and reference electrodes herein may be useful—for application in analytical devices at nanoscales, such as scanning electrochemical microscopy (SECM) and scanning probe microscopy (SPM).

The invention claimed is:

1. A coated, isolated substrate for use as an electrode, the coated isolated substrate comprising a substrate that is at least partially coated with a layer comprising a polymer and a redox active substance, wherein the polymer is a cation exchange polymer, wherein the redox active substance is present in both an oxidised and reduced state, and wherein the maximum dimension of the substrate is less than 1 mm.

2. The substrate according to claim 1, wherein the substrate is isolated from an electrochemical circuit.

3. The substrate according to claim 1, wherein a) the layer comprises a film of the polymer with the redox active substance dispersed in the polymer, or b) the layer comprises a plurality of particles comprising the polymer and the redox active substance.

4. The substrate according to claim 1, wherein the layer comprising a polymer and redox active substance has a thickness of from 3 μm to 100 μm.

5. The substrate according to claim 1, wherein both the reduced redox active substance and the oxidised redox active substance are distributed homogenously in the polymer.

6. The substrate according to claim 1, wherein the cation exchange polymer is formed from a perfluorinated monomer and a monomer having sulfonate groups.

7. The substrate according to claim 6, wherein the molar ratio of redox active substance to cation exchange sites in the polymer is from 10:1 to 150:1.

8. The substrate according to claim 1, wherein the molar ratio of the oxidised redox active substance to the reduced redox active substance is from 1:1500 to 1500:1.

9. The substrate according to claim 1, wherein at least one of the reduced redox active substance or the oxidised redox active substance is positively charged or insoluble in water.

10. The substrate according to claim 1, wherein at least one of the reduced redox active substance or the oxidised redox active substance has a diffusion coefficient in the polymer of greater than $1\times10^{-10}$ $cm^2$ $s^{-1}$.

11. The substrate according to claim 1, wherein the redox active substance comprises a species selected from a metallocene, an organic cation, or a metal complex.

12. The substrate according claim 11, wherein the reduced redox active substance comprises a ferrocene and the oxidised redox active substance comprises a ferrocenium ion.

13. The substrate according to claim 11, wherein the redox active substance comprises a bipyridinium compound, wherein the reduced redox active substance has a charge of +1 and the oxidised redox active substance has a charge of +2.

14. The substrate according to claim 11, wherein the redox active substance comprises a metal complex, wherein the metal complex comprises a metal and one or more ligands of the formula $[M(L)_n]$, wherein M is Co, Ru or Os with an oxidation state of +2 in its reduced state and an oxidation state of +3 in its oxidised state, and L is a nitrogen-containing heterocycle.

* * * * *